US006161093A

United States Patent [19]

Watari et al.

[11] Patent Number: 6,161,093

[45] Date of Patent: Dec. 12, 2000

[54] INFORMATION ACCESS SYSTEM AND RECORDING MEDIUM

[75] Inventors: Masao Watari, Ibaragi; Makoto Akabane, Tokyo; Tetsuya Kagami, Chiba; Kazuo Ishii, Kanagawa; Yusuke Iwahashi, Kanagawa; Yasuhiko Kato, Kanagawa; Hiroaki Ogawa, Kanagawa; Masanori Omote, Kanagawa; Kazuo Watanabe; Katsuki Minamino, both of Tokyo; Yasuharu Asano, Kanagawa, all of Japan

[73] Assignee: Sony Corporation, Tokyo, Japan

[21] Appl. No.: 09/164,316

[22] Filed: Oct. 1, 1998

Related U.S. Application Data

[63] Continuation of application No. 08/344,843, Nov. 23, 1994, Pat. No. 5,903,867.

[30] Foreign Application Priority Data

Nov. 30, 1993 [JP] Japan .................................... 5-325980

[51] Int. Cl.[7] .................................................... G10L 21/00

[52] U.S. Cl. ............................................ 704/270; 704/260

[58] Field of Search .................................... 704/260, 270, 704/275, 276

[56] References Cited

U.S. PATENT DOCUMENTS

| | | | |
|---|---|---|---|
| 4,570,227 | 2/1986 | Tachi et al. | 364/444 |
| 4,884,972 | 12/1989 | Gasper et al. | 434/185 |
| 4,907,274 | 3/1990 | Nomura et al. | 380/30 |
| 4,985,697 | 1/1991 | Boulton | 340/750 |
| 5,010,495 | 4/1991 | Willets | 364/513.5 |
| 5,010,581 | 4/1991 | Kanno | 382/56 |
| 5,111,409 | 5/1992 | Gasper et al. | 395/152 |
| 5,136,655 | 8/1992 | Bronson | 381/41 |
| 5,187,735 | 2/1993 | Garcia et al. | 379/88 |
| 5,222,234 | 6/1993 | Wang et al. | 395/600 |
| 5,278,943 | 1/1994 | Gasper et al. | 395/2 |
| 5,283,819 | 2/1994 | Glick et al. | 379/90 |
| 5,297,249 | 3/1994 | Bernstein et al. | 395/156 |
| 5,307,456 | 4/1994 | MacKay | 395/154 |
| 5,369,577 | 11/1994 | Kadashevich et al. | 364/419.13 |
| 5,388,183 | 2/1995 | Lynch et al. | 395/2.51 |
| 5,517,652 | 5/1996 | Miyamoto et al. | 395/800 |
| 5,539,658 | 7/1996 | McCullough | 364/514 |
| 5,673,362 | 9/1997 | Matsumoto | 704/260 |
| 5,704,013 | 12/1997 | Watari et al. | 395/23 |
| 5,764,853 | 6/1998 | Watari et al. | 395/2.52 |
| 5,796,921 | 8/1998 | Minamino et al. | 395/22 |
| 5,832,478 | 11/1998 | George | 707/3 |
| 5,848,389 | 12/1998 | Asano et al. | 704/239 |
| 5,940,795 | 8/1999 | Matsumoto | 704/258 |
| 5,940,796 | 8/1999 | Matsumoto | 704/260 |
| 5,950,163 | 9/1999 | Matsumoto | 704/260 |

FOREIGN PATENT DOCUMENTS

| | | | |
|---|---|---|---|
| 0505304 A2 | 9/1992 | European Pat. Off. | G06F 3/16 |
| 88/09540 | 12/1988 | WIPO | G06K 11/00 |
| 91/15818 | 10/1991 | WIPO | G06F 3/02 |

*Primary Examiner*—Krista Zele
*Assistant Examiner*—Michael N. Opsasnick
*Attorney, Agent, or Firm*—Limbach & Limbach L.L.P.; Seong-kun Oh

[57] ABSTRACT

A book database stores at least phonetic signal information including phoneme information and rhythm information as document data, a central system transmits phonetic signal information stored on the book database to a terminal and the terminal receives the phonetic signal information is then carried out at the terminal and the document is then recited via synthesized sounds.

57 Claims, 42 Drawing Sheets

6-1
6-2
6-3
6-4
database controller
CPU
communications controller
book ID database
book database 5
other central system central controller
2-1
speech synthesis apparatus
2-2
keyboard
2-3
button part
2-4
jog shuttle part
2-5
speech synthesis apparatus
2-6
display
2-7
printer
2-8
communications apparatus
2-9
broadcast receiving apparatus
2-10
timer
2-11
information recording/playback apparatus
2-12
speech recording/playback apparatus
2-13
terminal 2

2-1
central controller
sound parameters
recognition control
recognition results
speech recognition apparatus 2-2
2-21
micro-computer
2-22
A/D
2-23
analyzer
2-24
recognition part
memory
2-25 button part 2-4
2-31
Yes
Decide
2-32
No
2-33
left
2-34
right
2-35
2-36
word recognition
dictation
2-37
recite
2-38
decide
2-39
display
2-40
set up
2-41
output
jog shattle 2-5
playback button 2-52
pause button 2-53
shattle ring 2-51

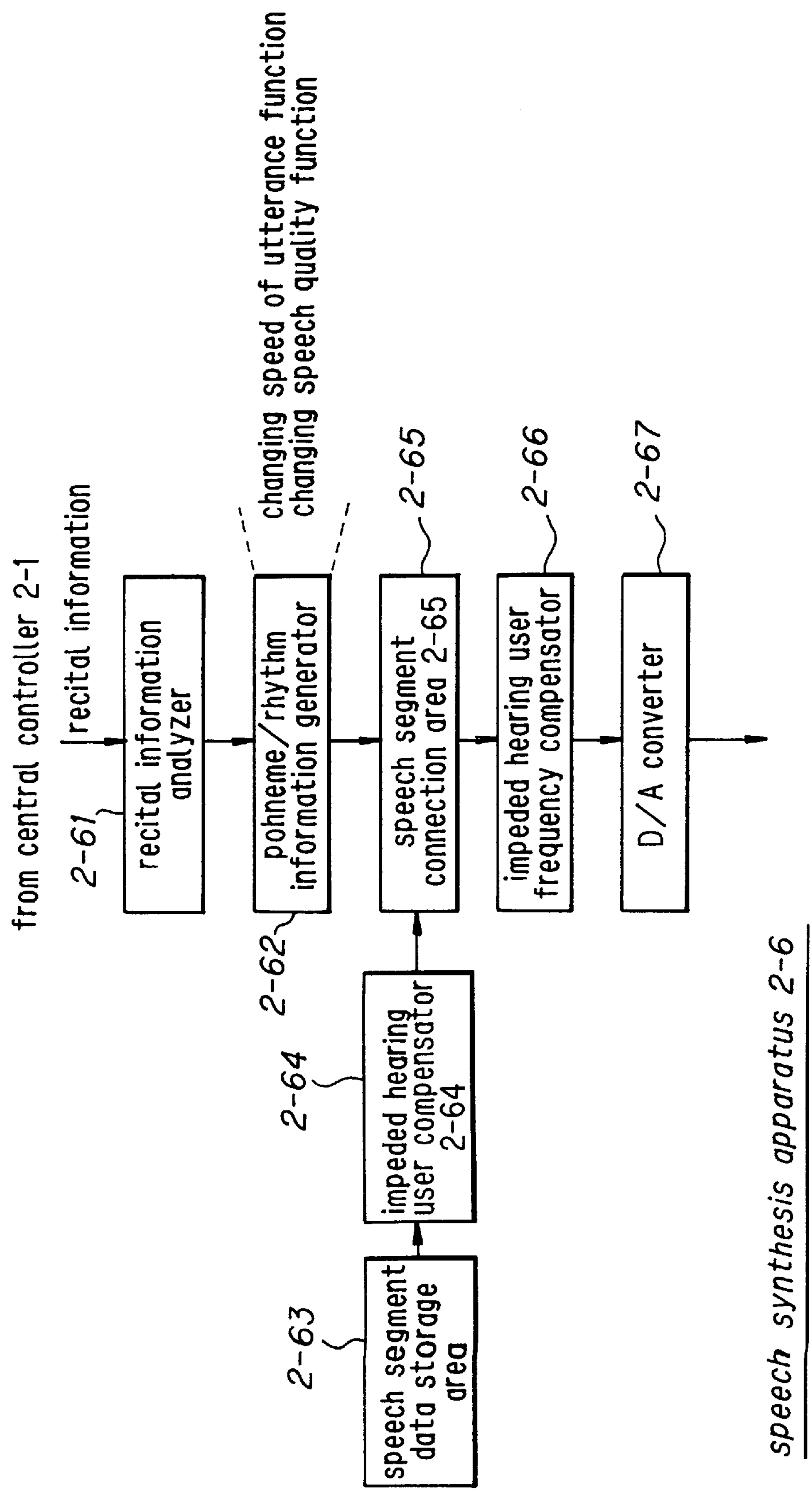
FIG. 8
from central controller 2-1
recital information
2-61
recital information analyzer
changing speed of utterance function
changing speech quality function
2-62
pohneme/rhythm information generator
2-65
speech segment connection area 2-65
2-66
impeded hearing user frequency compensator
2-67
D/A converter
2-64
impeded hearing user compensator 2-64
2-63
speech segment data storage area
speech synthesis apparatus 2-6

START
S2-41
install DAT (tape)
S2-42
press playback button
S2-43
say "play back"
S2-44
input playback command
END 3-1
communi-cations controller
communications lines
3-2
a
b
speech
3-3
system controller
control
speech
3-4
recognition part
control
sound parameters
recognition result
3-5
recognition database
3-6
search part
search instruction
search results
to book database 5
3-7
speech synthesis part
3-8
speech synthesis database
3-9
a
b
to operator sound parameter
control signal
recognition results (word and score)
word recognition part 3-12
3-21
word recognizer
3-23
word recognition controller
3-22
recognition target vocabulary selector
recognition target vocabulary
vocabulary group 1
vocabulary group 2
vocabulary group N
recognition database 3-5 dictation part 3-13

(for when "asahishinbun" is mitakenly recognized as "asahisanbun")

FIG. 30A

| | publisher | |
|---|---|---|
| 1 | P | 0.7 |
| 2 | Q | 0.2 |
| 3 | R | 0.01 |
| 4 | ------- | 0.01 |
| 5 | ------- | --- |
| ⋮ | ⋮ | ⋮ |
| n | | |

FIG. 30B

| | publisher | | title | | author | | overall likelihood |
|---|---|---|---|---|---|---|---|
| 1 | P | 0.7 | X | 0.8 | A | 0.6 | 2.1 |
| 2 | Q | 0.2 | X | 0.8 | B | 0.3 | 1.3 |
| 3 | P | 0.7 | Y | 0.1 | B | 0.3 | 1.1 |
| 4 | R | 0.1 | Y | 0.1 | A | 0.6 | 0.8 |
| 5 | ------- | --- | ------ | --- | ------ | --- | ----- |
| ⋮ | ⋮ | ⋮ | ⋮ | ⋮ | ⋮ | ⋮ | ⋮ |
| n | | | | | | | |

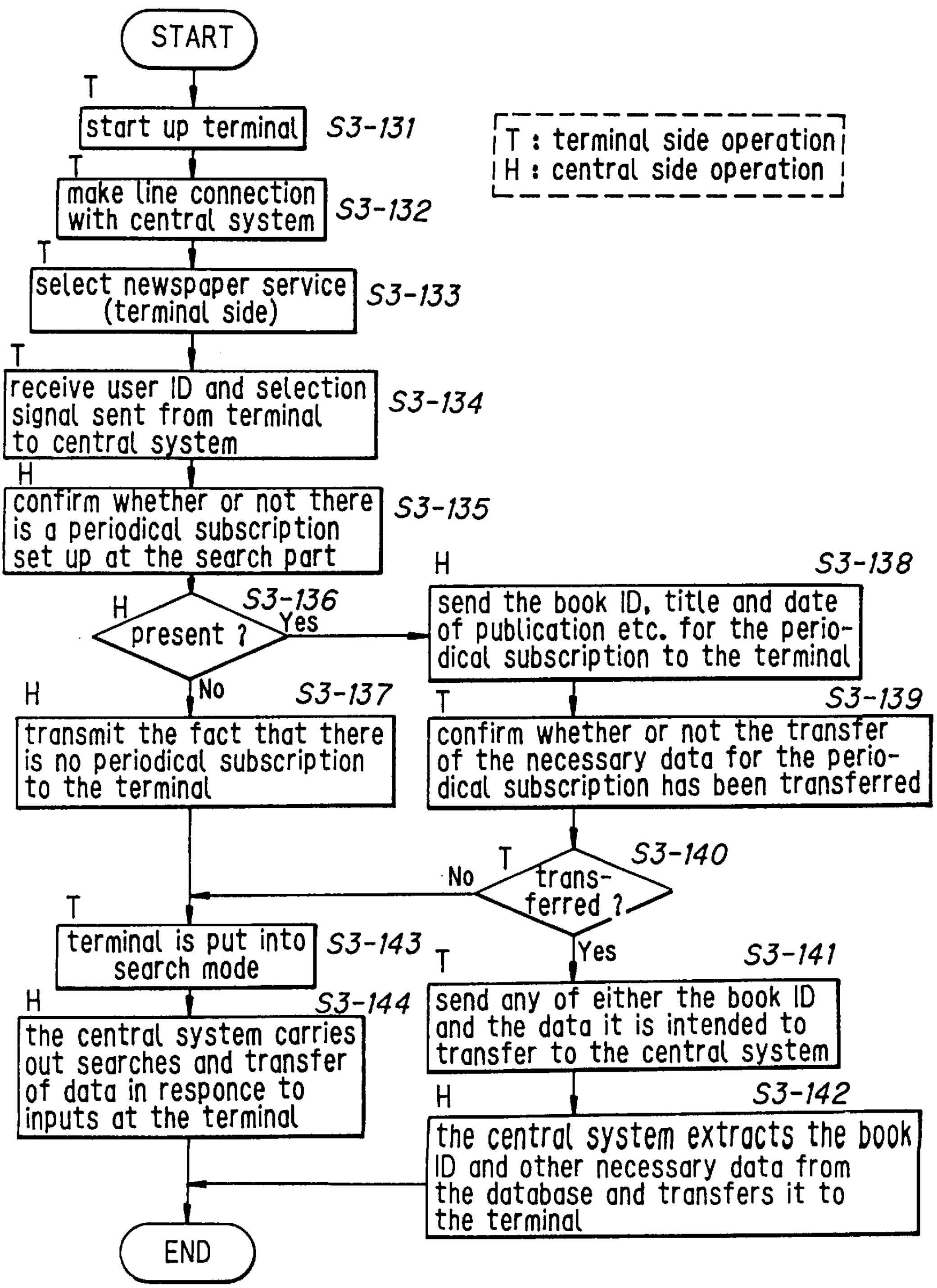
FIG.31
START
T
start up terminal
S3-131
T : terminal side operation
H : central side operation
T
make line connection with central system
S3-132
T
select newspaper service (terminal side)
S3-133
T
receive user ID and selection signal sent from terminal to central system
S3-134
H
confirm whether or not there is a periodical subscription set up at the search part
S3-135
H
present ?
S3-136
Yes
No
H
send the book ID, title and date of publication etc. for the periodical subscription to the terminal
S3-138
H
transmit the fact that there is no periodical subscription to the terminal
S3-137
T
confirm whether or not the transfer of the necessary data for the periodical subscription has been transferred
S3-139
T
trans-ferred ?
S3-140
No
Yes
T
terminal is put into search mode
S3-143
T
send any of either the book ID and the data it is intended to transfer to the central system
S3-141
H
the central system carries out searches and transfer of data in responce to inputs at the terminal
S3-144
H
the central system extracts the book ID and other necessary data from the database and transfers it to the terminal
S3-142
END

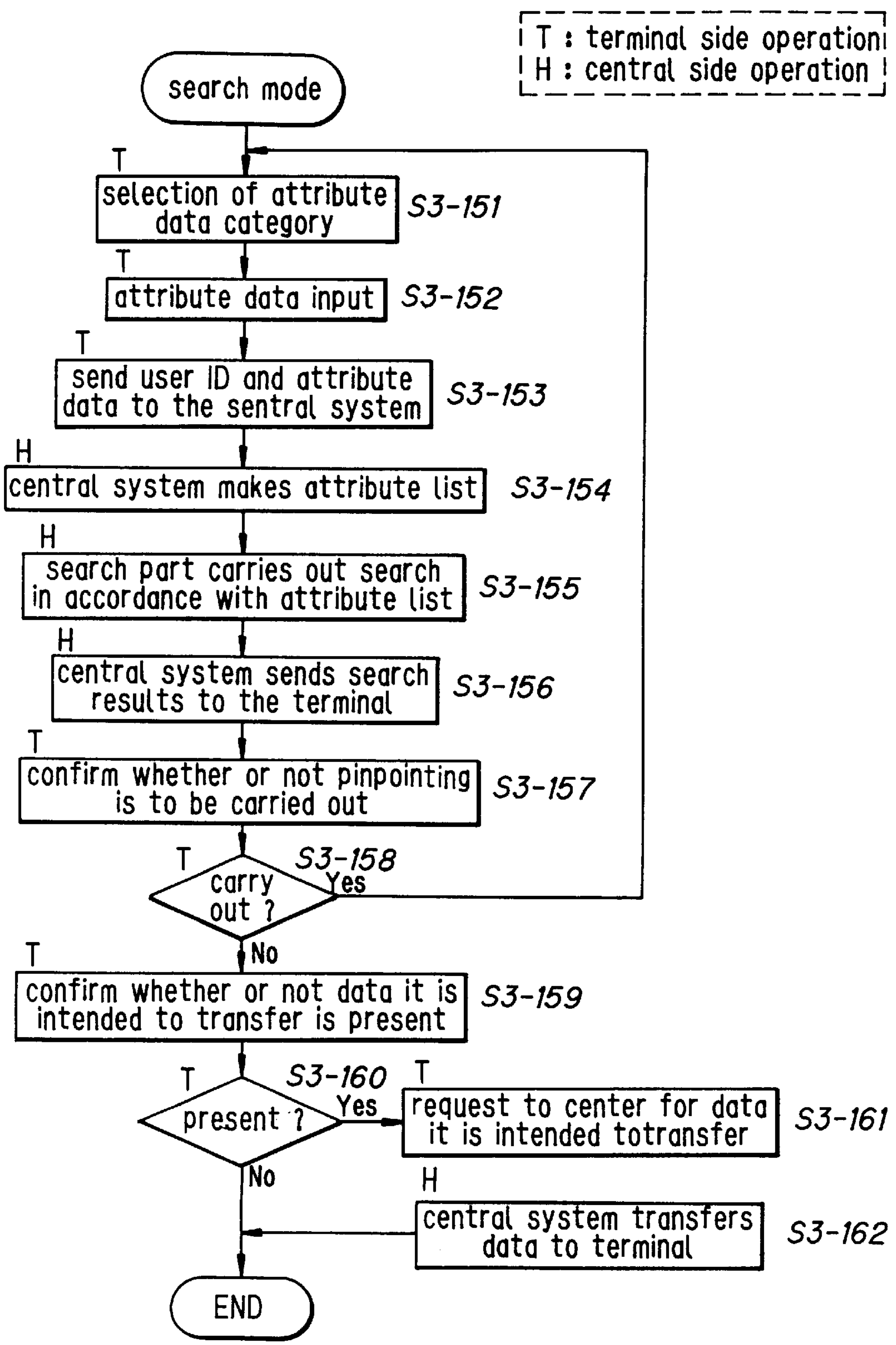
FIG.32
T : terminal side operation
H : central side operation
search mode
T
selection of attribute data category
S3-151
T
attribute data input
S3-152
T
send user ID and attribute data to the sentral system
S3-153
H
central system makes attribute list
S3-154
H
search part carries out search in accordance with attribute list
S3-155
H
central system sends search results to the terminal
S3-156
T
confirm whether or not pinpointing is to be carried out
S3-157
T
carry out ?
S3-158
Yes
No
T
confirm whether or not data it is intended to transfer is present
S3-159
T
present ?
S3-160
Yes
No
T
request to center for data it is intended totransfer
S3-161
H
central system transfers data to terminal
S3-162
END 4-1
text input part
4-11
electronic text media input part
4-12
OCR
4-13
communications line
text data
publisher
newspaper etc.
books
newspapers
magazines etc.
personal computer network
database service etc.

Figures 37A, 37B, 37C, 37D, 37E, 37F, 37G:
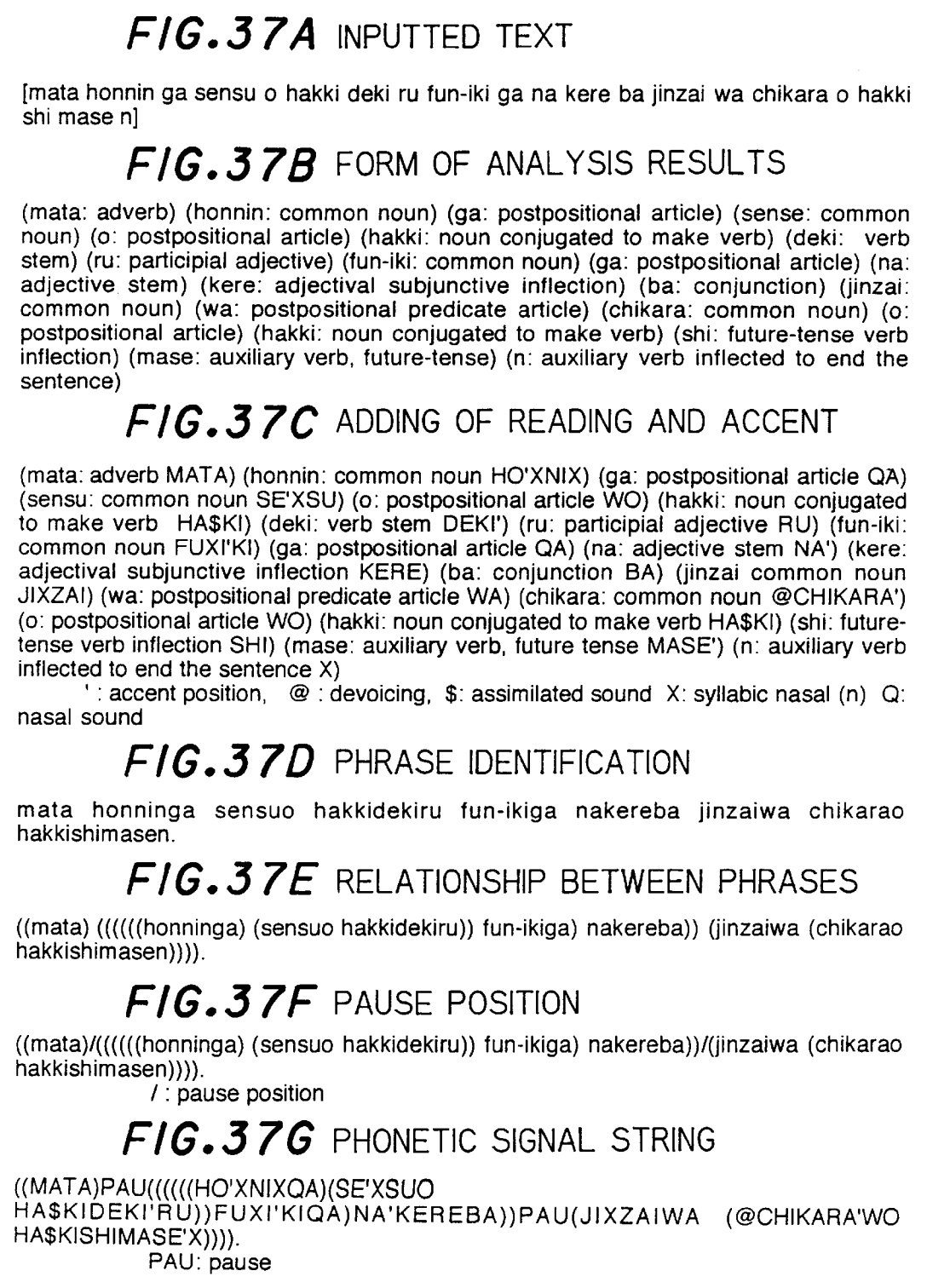

FIG. 37A INPUTTED TEXT

[mata honnin ga sensu o hakki deki ru fun-iki ga na kere ba jinzai wa chikara o hakki shi mase n]

FIG. 37B FORM OF ANALYSIS RESULTS (mata: adverb) (honnin: common noun) (ga: postpositional article) (sense: common noun) (o: postpositional article) (hakki: noun conjugated to make verb) (deki: verb stem) (ru: participial adjective) (fun-iki: common noun) (ga: postpositional article) (na: adjective stem) (kere: adjectival subjunctive inflection) (ba: conjunction) (jinzai: common noun) (wa: postpositional predicate article) (chikara: common noun) (o: postpositional article) (hakki: noun conjugated to make verb) (shi: future-tense verb inflection) (mase: auxiliary verb, future-tense) (n: auxiliary verb inflected to end the sentence)

FIG. 37C ADDING OF READING AND ACCENT (mata: adverb MATA) (honnin: common noun HO'XNIX) (ga: postpositional article QA) (sensu: common noun SE'XSU) (o: postpositional article WO) (hakki: noun conjugated to make verb HA$KI) (deki: verb stem DEKI') (ru: participial adjective RU) (fun-iki: common noun FUXI'KI) (ga: postpositional article QA) (na: adjective stem NA') (kere: adjectival subjunctive inflection KERE) (ba: conjunction BA) (jinzai common noun JIXZAI) (wa: postpositional predicate article WA) (chikara: common noun @CHIKARA') (o: postpositional article WO) (hakki: noun conjugated to make verb HA$KI) (shi: future-tense verb inflection SHI) (mase: auxiliary verb, future tense MASE') (n: auxiliary verb inflected to end the sentence X)

' : accent position, @ : devoicing, $: assimilated sound X: syllabic nasal (n) Q: nasal sound

FIG. 37D PHRASE IDENTIFICATION mata honninga sensuo hakkidekiru fun-ikiga nakereba jinzaiwa chikarao hakkishimasen.

FIG. 37E RELATIONSHIP BETWEEN PHRASES ((mata) ((((((honninga) (sensuo hakkidekiru)) fun-ikiga) nakereba)) (jinzaiwa (chikarao hakkishimasen)))).

FIG. 37F PAUSE POSITION ((mata)/((((((honninga) (sensuo hakkidekiru)) fun-ikiga) nakereba))/(jinzaiwa (chikarao hakkishimasen)))).

/ : pause position

FIG. 37G PHONETIC SIGNAL STRING ((MATA)PAU((((((HO'XNIXQA)(SE'XSUO HA$KIDEKI'RU))FUXI'KIQA)NA'KEREBA))PAU(JIXZAIWA (@CHIKARA'WO HA$KISHIMASE'X)))).

PAU: pause 4-5
phonetic signal string editor
phonetic signal string data
editing area
4-70
4-71
word reading corrector
4-72
vowel voice length corrector
4-73
phoneme voicing/de-voicing corrector
4-74
pause corrector
4-75
accent corrector
4-76
phrase corrector
4-6
display
4-7
keyboard
speech input
4-78
speech analyzer
4-79
rhythm information analyzer
4-77
synthesis regulator
synthesizied speech output

FIG. 41

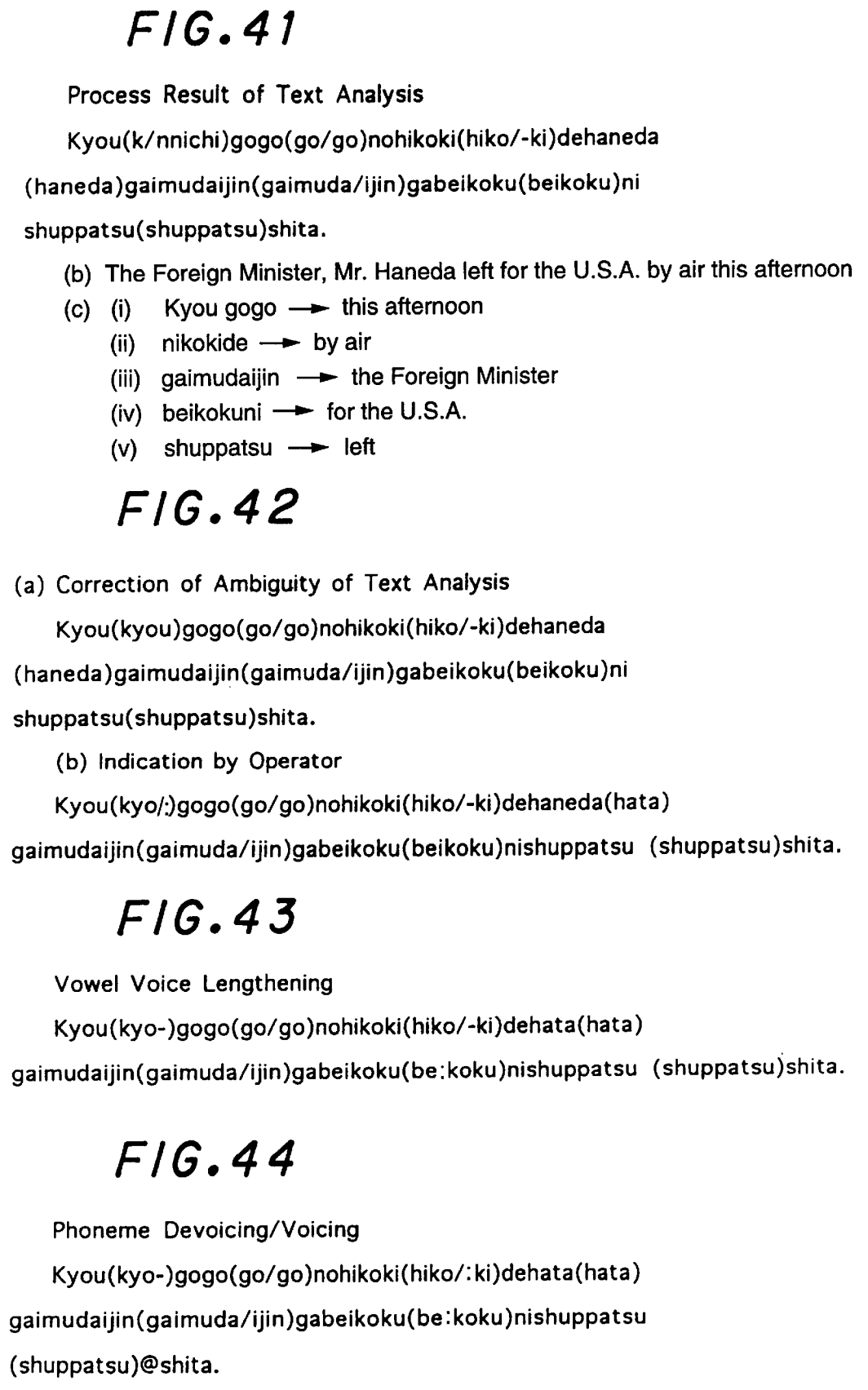

Process Result of Text Analysis

Kyou(k/nnichi)gogo(go/go)nohikoki(hiko/-ki)dehaneda (haneda)gaimudaijin(gaimuda/ijin)gabeikoku(beikoku)ni shuppatsu(shuppatsu)shita.

(b) The Foreign Minister, Mr. Haneda left for the U.S.A. by air this afternoon (c) (i) Kyou gogo → this afternoon
(ii) nikokide → by air
(iii) gaimudaijin → the Foreign Minister
(iv) beikokuni → for the U.S.A.
(v) shuppatsu → left

FIG. 42

(a) Correction of Ambiguity of Text Analysis

Kyou(kyou)gogo(go/go)nohikoki(hiko/-ki)dehaneda (haneda)gaimudaijin(gaimuda/ijin)gabeikoku(beikoku)ni shuppatsu(shuppatsu)shita.

(b) Indication by Operator

Kyou(kyo/:)gogo(go/go)nohikoki(hiko/-ki)dehaneda(hata) gaimudaijin(gaimuda/ijin)gabeikoku(beikoku)nishuppatsu (shuppatsu)shita.

FIG. 43

Vowel Voice Lengthening

Kyou(kyo-)gogo(go/go)nohikoki(hiko/-ki)dehata(hata) gaimudaijin(gaimuda/ijin)gabeikoku(be:koku)nishuppatsu (shuppatsu)shita.

FIG. 44

Phoneme Devoicing/Voicing

Kyou(kyo-)gogo(go/go)nohikoki(hiko/:ki)dehata(hata) gaimudaijin(gaimuda/ijin)gabeikoku(be:koku)nishuppatsu (shuppatsu)@shita.

FIG. 45

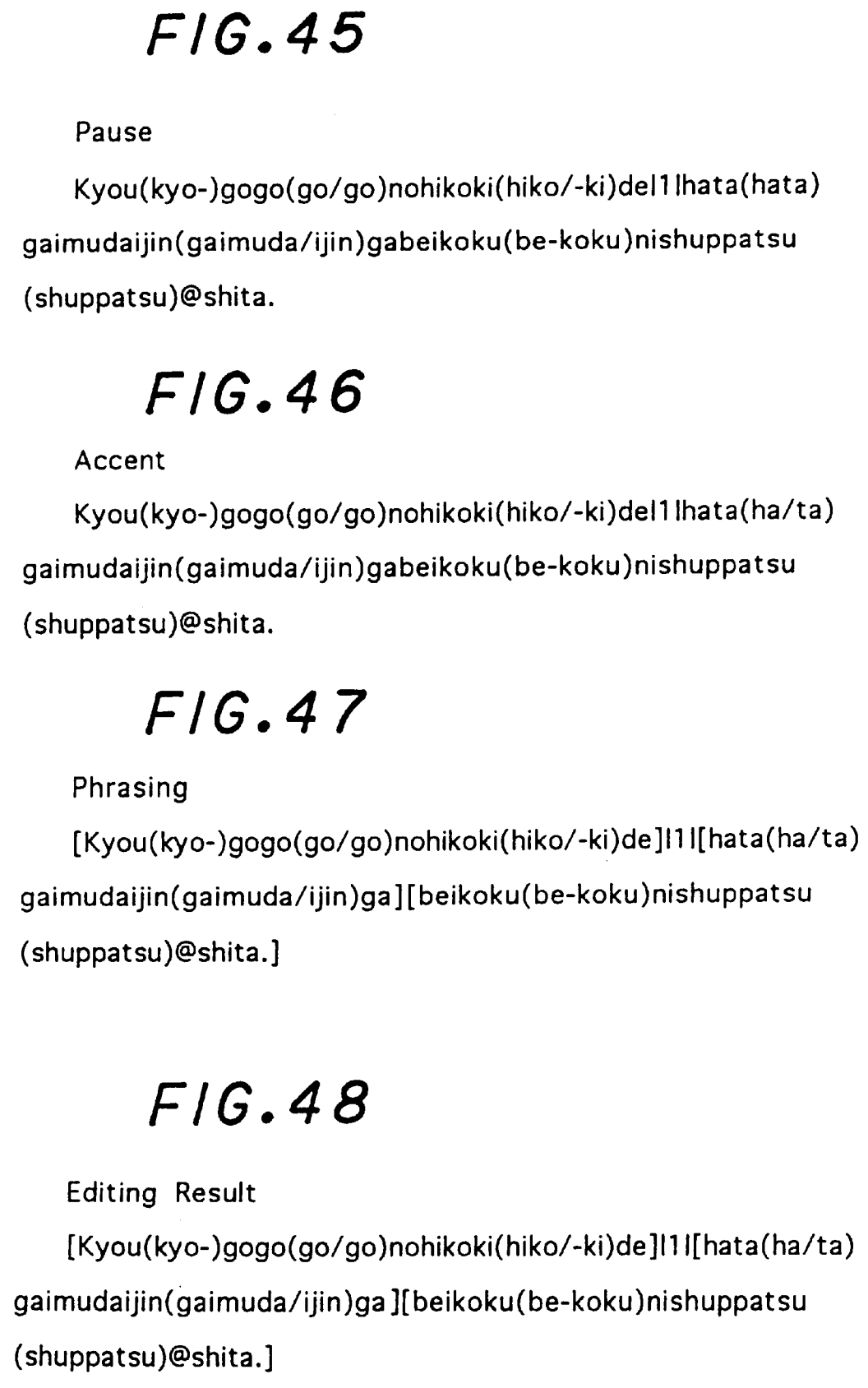

Pause

Kyou(kyo-)gogo(go/go)nohikoki(hiko/-ki)de|1|hata(hata) gaimudaijin(gaimuda/ijin)gabeikoku(be-koku)nishuppatsu (shuppatsu)@shita.

FIG. 46

Accent

Kyou(kyo-)gogo(go/go)nohikoki(hiko/-ki)de|1|hata(ha/ta) gaimudaijin(gaimuda/ijin)gabeikoku(be-koku)nishuppatsu (shuppatsu)@shita.

FIG. 47

Phrasing

[Kyou(kyo-)gogo(go/go)nohikoki(hiko/-ki)de]|1|[hata(ha/ta) gaimudaijin(gaimuda/ijin)ga][beikoku(be-koku)nishuppatsu (shuppatsu)@shita.]

FIG. 48

Editing Result

[Kyou(kyo-)gogo(go/go)nohikoki(hiko/-ki)de]|1|[hata(ha/ta) gaimudaijin(gaimuda/ijin)ga][beikoku(be-koku)nishuppatsu (shuppatsu)@shita.]

INFORMATION ACCESS SYSTEM AND RECORDING MEDIUM

This is a continuation of application Ser. No. 08/344,843 filed on Nov. 23, 1994 now issued on May 11, 1999 as U.S. Pat. No. 5,903,867.

BACKGROUND OF THE INVENTION

1. Field of the Invention

The present invention relates to an information access system suitable for use when accessing, from a terminal, a central system having a database on which information relating to documents such as, for example, newspapers, magazines and books etc., musical information or housing information etc. is stored.

2. Description of the Related Art

Conventionally, information access systems where the user can access a central system database from their own homes have consisted of systems, such as home information facsimile services, made up of home rental information and transaction information etc. In this kind of system, details of house information recorded on house information notes are recorded on the central system database. The user then accesses this central system via, for example, a telephone line. By operating a push button etc., an information number for the desired house information may be inputted and the details of the desired house information can be obtained from a facsimile having a particular telephone number.

Also, with this information access system, a depositor etc. of, for example, a bank, accesses the central system of the bank by telephone (via a telephone line) and a balance inquiry can then be made by the person operating push buttons to input their personal account number.

By inputting, for example, a date of issue, writer, publisher or keyword, a desired book may then be searched for using the information access system.

In the aforementioned kind of access system, the desired information is obtained by operating a terminal i.e. by operating the push-buttons on a telephone or facsimile or by operating a keyboard.

However, the operation of a push button or keyboard is very difficult for users who are physically disabled in some way, particularly people whose vision is impaired or who are unable to move their hands or legs freely.

SUMMARY OF THE INVENTION

As the present invention set out to resolve these kinds of problems, it is an object of this invention to provide an information access system having improved operability which is easier for people having physical disabilities to use.

Also, it is a further object of this invention to provide an information access system where the information which is sent and received is phonetic signal information, so that speech which is sent and received can be compared, the volume of data sent and received and therefore communications expenses can be reduced, and searches can be carried out quickly.

According to the present invention, an information access system comprises a central system having a data base such as, for example, a book database, in which information is stored and a terminal connected to the central system via a communications line which can access the information on the book database. The book database stores at least phonetic signal information including phoneme information and rhythm information. The central system transmits phonetic signal information stored on the book database to the terminal which receives the phonetic signal information transmitted from the central system.

In this information system, the terminal is further equipped with a speech synthesizer taken as the speech synthesizing means for synthesizing speech from the phonetic signal information.

With this information access system, the phonetic signal information is represented by items related to publications.

Also, the terminal for this information access system is further equipped with a speech recognizer, a keyboard, buttons, or jog shuttle taken as the input means for inputting keywords from desired documents and sending key words outputted by the speech recognizer, keyboard, buttons, or jog shuttle which constitute the input means to the central system. Also, the central system is further equipped with a searcher taken as the searching means for searching the book database for phonetic signal information relating to the publications corresponding to the keywords sent from the terminal and the search results from the searcher are transmitted to the terminal.

Further, according to the present invention, an information access system comprises a central system and a terminal which is connected to the central system by a communications line. The terminal is equipped with a microphone taken as the speech inputting means for inputting speech and an analyzer take as the sound analyzing means for analyzing speech inputted to the speech inputting means, with the sound analysis results for the analyzer being transmitted to the central system. The central system is equipped with a recognizer taken as the central speech recognition means for recognizing speech using the sound analysis results for the analyzer sent from the terminal, and a system controller taken as the central side control means for carrying out prescribed processing in accordance with the speech recognition results from the recognizer.

The system controller in this information access system sends the speech recognition results from the recognizer to the terminal.

The recognizer in this information access system recognizes speech by dictation. The terminal is further equipped with a speech recognizer, keyboard, buttons, and jog shuttle taken as the speech recognition result correction means for correcting a mistakenly recognized portion of the recognition results from the recognizer and the correction results from the speech recognizer, keyboard, buttons, and jog shuttle are sent to the central system.

With the information access system in this invention, the book database stores at least phonetic signal information including phoneme information and rhythm information. The central system sends phonetic signal information stored on the book database to the terminal. The terminal then receives the phonetic signal information sent from the central system. Information may then be provided to the user via synthesized sounds for speech synthesis which is carried out based on phonetic signal information. Speech which is sent and received va therefore be compared, the volume of data sent and received and therefore communications expenses can be reduced so that searches can be carried out quickly.

The keywords are constituted by attribute data expressing the attributes of the document. A relationship table expressing the relationship between the attribute data and the document corresponding to the attribute data is stored on the book database. The searcher then carries out searches with reference to the relationship table. Searches can therefore be carried out quickly.

BRIEF DESCRIPTION OF THE DRAWINGS

FIG. 8 is a view describing the detailed structure of the speech synthesizer 2-6 in FIG. 5.

FIGS. 30A and 30B are diagrams showing an attribute list.

FIG. 31 is a flowchart describing an operation in a case where a newspaper service in provided in the central system 1.

FIG. 32 is a flowchart describing in further detail the processes of steps S3-143 and S3-144 in the flowchart of FIG. 31.

FIGS. 37A–37G are diagrams for explaining the operations of the text analyzer 4-3 in FIG. 34.

FIG. 41 is a diagram for explaining the operation of the phonetic signal string editor 4-5 in FIG. 34.

FIG. 42 is a diagram for explaining the operation of the phonetic signal string editor 4-5 in FIG. 34.

FIG. 43 is a diagram for explaining the operation of the phonetic signal string editor 4-5 in FIG. 34.

FIG. 44 is a diagram for explaining the operation of the phonetic signal string editor 4-5 in FIG. 34.

FIG. 45 is a diagram for explaining the operation of the phonetic signal string editor 4-5 in FIG. 34.

FIG. 46 is a diagram for explaining the operation of the phonetic signal string editor 4-5 in FIG. 34.

FIG. 47 is a diagram for explaining the operation of the phonetic signal string editor 4-5 in FIG. 34.

FIG. 48 is a diagram for explaining the operation of the phonetic signal string editor 4-5 in FIG. 34.

DETAILED DESCRIPTION OF THE PREFERRED EMBODIMENTS

FIRST EMBODIMENT

The following is a description, with reference to the diagrams, of the embodiments of the present invention.

Figure 1:
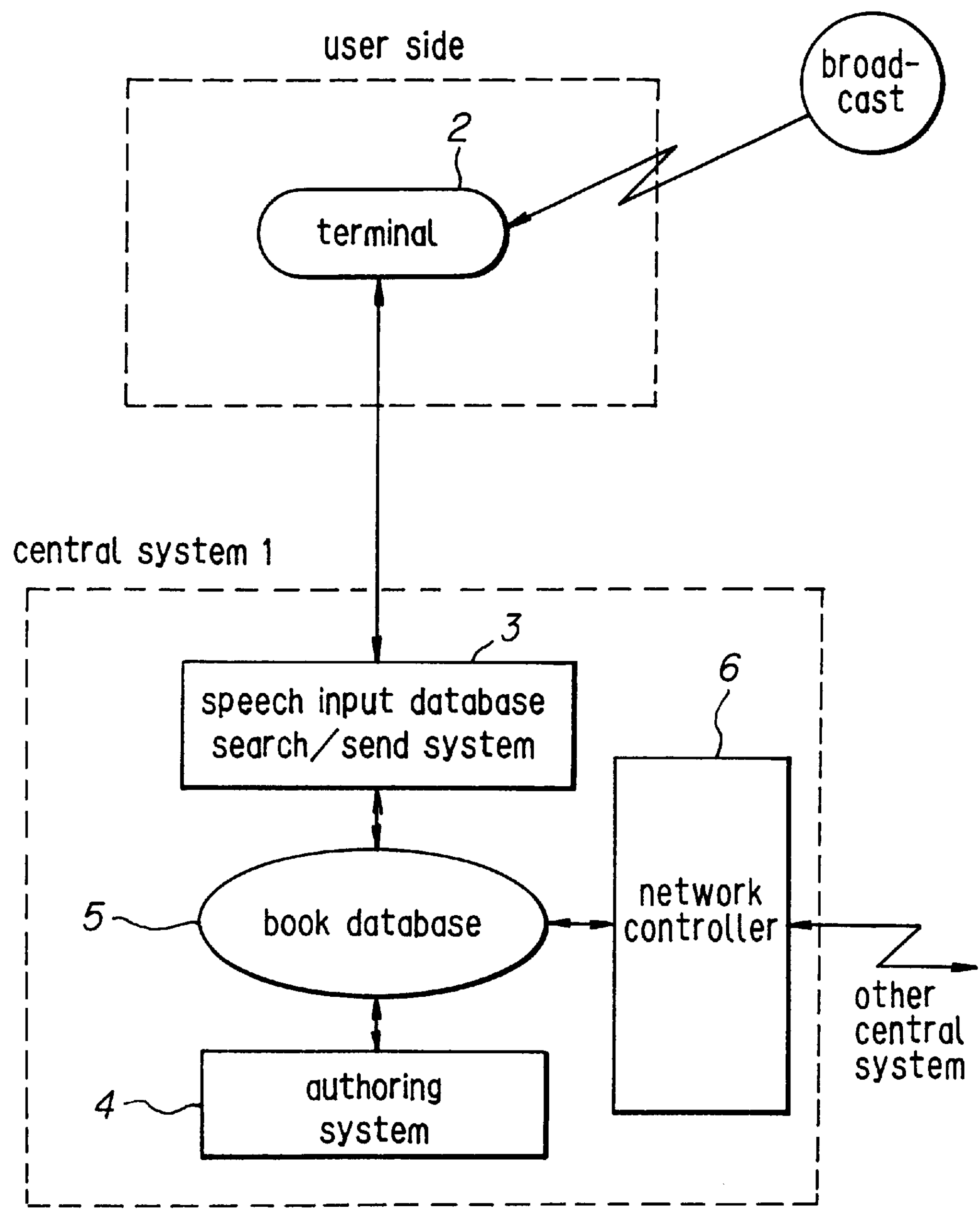
FIG. 1 is a block drawing showing the structure of an information access system of a first embodiment of the present invention.

FIG. 1 is a block diagram showing the structure of an information access system for a first embodiment of the present invention. This information access system consists of a central system 1 and a terminal 2 which is capable of communicating with the central system 1 and is connected to the central system 1 via a PSTN or ISDN telephone line etc.

The central system 1 and the terminal 2 may also communicate with each other wirelessly. Also, in FIG. 1, only one terminal is connected to the central system 1 but it is also possible to have a number of terminals connected to the system 1. Also, terminal 2 may be battery driven rather than just being operated from the mains so that it becomes possible to use the terminal 2 outdoors as well as in the home.

The terminal 2 acts as an interface with the speech input type search/send system 3 of the central system 1, and can be used to access information such as, for example, library information, newspaper information, magazine information and new book information etc. stored on the book database 5. In addition to storing text data etc. as document information, the book database 5 also stores phonetic signal information which is made up of phoneme information and rhythm information. In addition to receiving this information, displaying the document text data and carrying out printing, the terminal 2 generates synthesized sounds from the phonetic signal information and obtains recited speech for these documents.

The central system 1 is made up from the speech input-type database search/send system 3, an authoring system 4, the book database 5 and a network controller 6. The authoring system 4 stores the document information on the book database 5, puts the document information into database form and edits information stored on the book database 5. The network controller 6 controls communications between the central system 1 and other central systems, so that the book database 5 for the central system 1 and databases for other central systems can be used together.

The following is an explanation of the details of each block.

Figure 2:
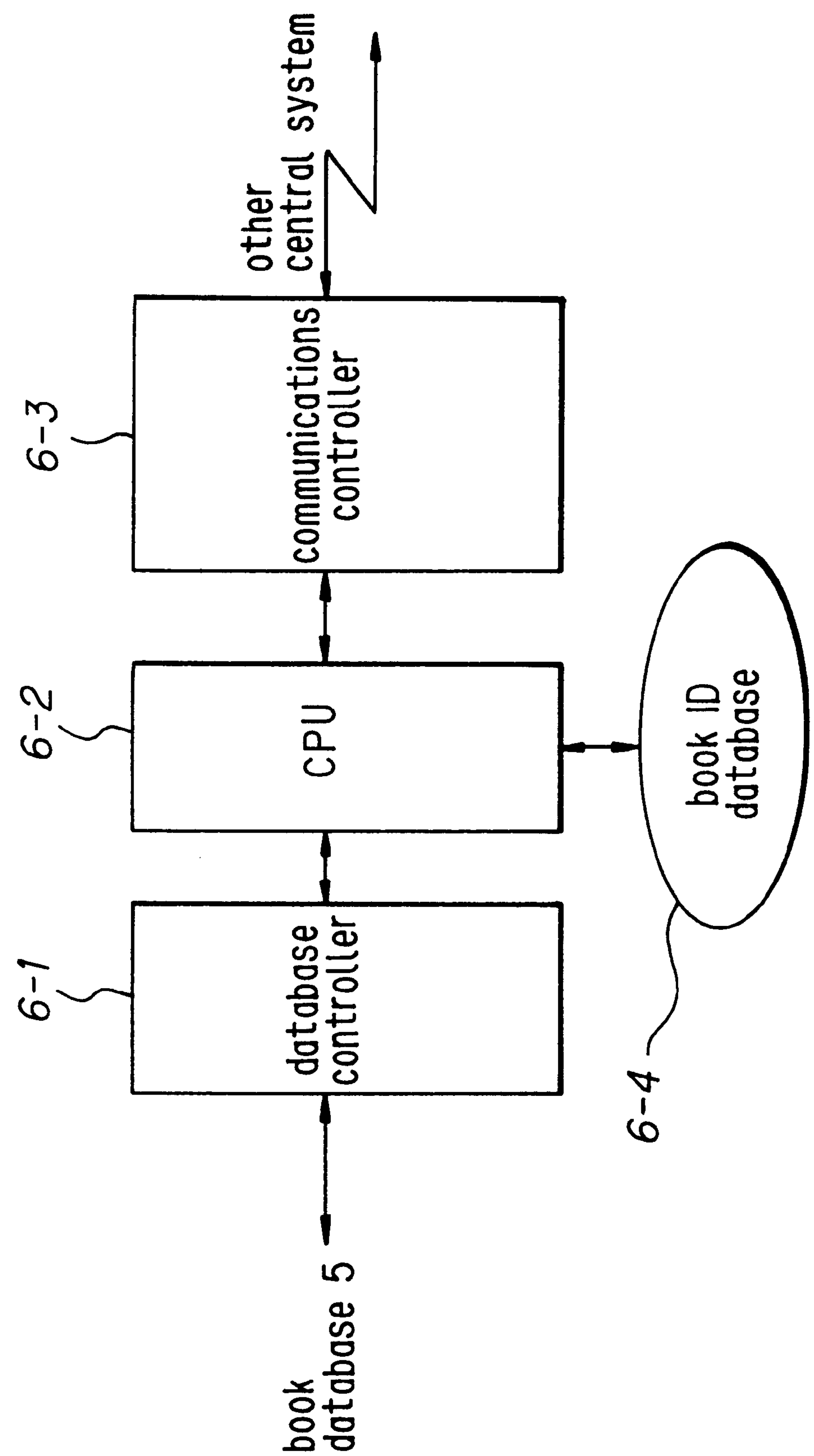
FIG. 2 is a view showing the detailed structure of the network controller 6 shown in FIG. 1.

First, FIG. 2 shows the details of the structure of the network controller 6. The network controller 6 is made up of a database controller 6-1 for controlling the exchange of data with the book database 5, a CPU 6-2 for carrying out the control operations for the network controller 6, a communications controller 6-3 for controlling the exchange of data with other central systems, and a book ID database 6-4 for storing the book IDs (described in detail later) as unique numbers attached to the documents stored in the book database 5.

Figure 3:
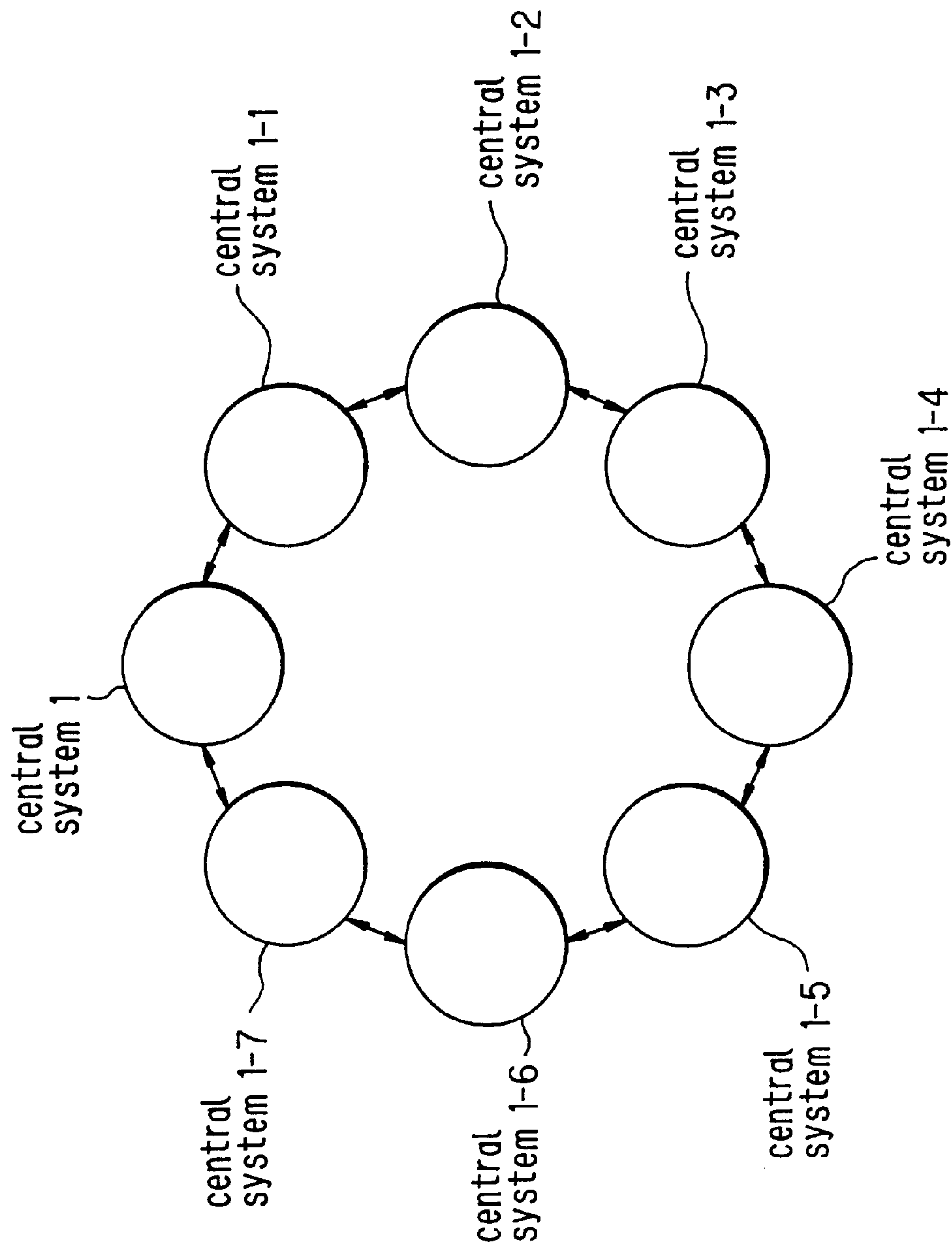
FIG. 3 is a view showing a network formed of the central system 1 of FIG. 1 and other central systems 1-1 through 1-7.
Figure 4:
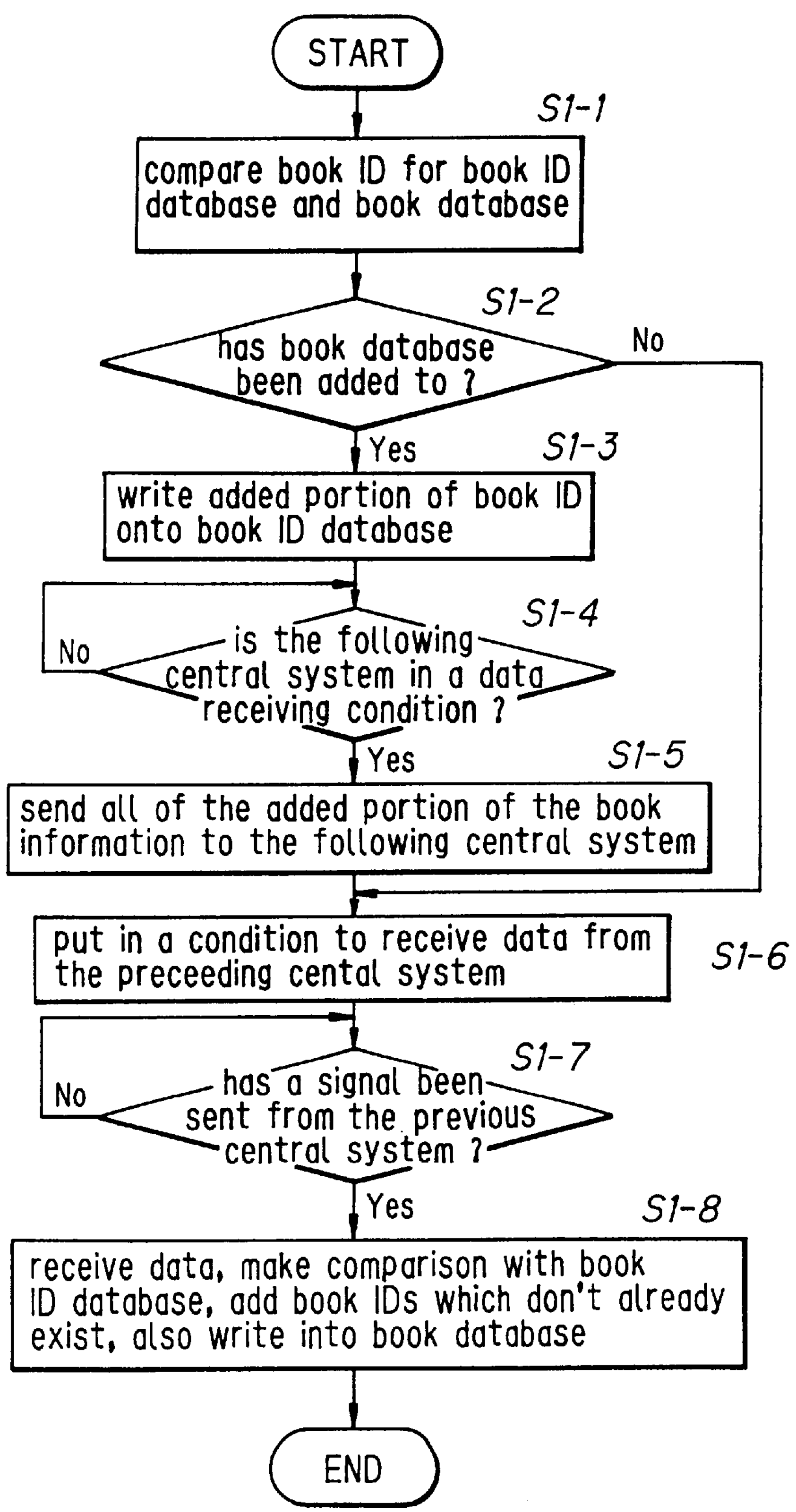
FIG. 4 is a flowchart explaining the operations of a CPU 6-2 in the network controller 6 in FIG. 2.

Now, for example, the kind of network system shown in FIG. 3, where the central system 1 is connected with other central systems 1-1 to 1-7 in a ring shape will be considered. In this case, the CPU 6-2 carries out the process shown, for example, in the flowchart in FIG. 4 each time a prescribed period of time elapses (for example, every week) so that the book database for the central system 1 can be used in common with the databases for the other central systems from 1-1 to 1-7.

In the first step S1-1, the book ID attached to the document stored in the book database 5 is read out via the database controller 6-1 and compared with the book ID stored in the book ID database 6-4. Step S1-1 is then gone onto and it is determined whether or not the book ID stored in the book ID database 6-4 and the book ID attached to the document stored in the book database 5 coincide. If the book ID stored in the book ID database 6-4 and the book ID attached to the document stored in the book database 5 coincide, the steps from S1 -3 to S1-5 are skipped and the process goes on to step S1-6.

Also, in step S1-2, if the book ID stored in the book ID database 6-4 and the book ID attached to the document stored in the book database 5 do not coincide, i.e. if, for example, the document information has been put into database form anew by the authoring system 4 (FIG. 1), if the book database 5 has been supplemented with this information, step S1-3 is gone onto and the book ID for the document stored as a supplement to the book database 5 (hereinafter referred to as the supplemented document) is stored as a supplement to the book ID database 6-4.

It is then determined in step S1-4 whether or not the central system which follows is capable of receiving data or not via the communications controller 6-3 (In this case this means the central system 1-1 which is adjacent to the central system 1 when going, for example, in a clockwise direction). If it is determined in step S1-4 that the proceeding central system (central system 1-1) is not capable of receiving data, step S1-4 is returned to. If, however, it is determined in step S1-4 that the following central system is capable of receiving data, the process goes on to step S1-5, the supplemented document information is sent to the following central system via the communications controller 6-3 and step S1-6 is gone onto.

In step S1-6, a state in which data from the previous central system (with respect to the central system 1 this is the central system 1-7 (FIG. 3) which is adjacent to the central system 1 going in, for example, an anti-clockwise direction) can be received is attained. Then, in step S1-7, it is determined whether or not data is being sent from the previous central system (central system 1-7).

If data is not being sent from the previous central system, step S1-7 is repeated. If data is being sent from the previous system, the process goes on to step S1-8. The data sent from the previous central system is then received via the communications controller 6-3 and the book ID for this data is compared with the book ID stored in the book database 6-4.

Items in the comparison results which are not stored on the book ID database 6-4 amongst the data for the book IDs from the previous central system are written as supplements to the book ID database 6-4. The data corresponding to the supplemented book IDs are sent to and stored on the book database 5 via the database controller 6-1 to complete the process.

On the other hand, at central systems other than the central system 1 i.e. the central systems 1-1 to 1-7 (FIG. 3), the process is started from step S1-6. Then, after the process in step S1-8 has been carried out, the processes in step S1-1 through to S1-5 are executed in sequence.

In the above way, information stored in the book database 5 can be updated every week, for example, so that the databases can be used together.

This common data process can also be used for removing information rather than just for supplementing information.

It would be preferable for this updating process to take place, for example, on a holiday evening, when usage of the book database 5 is low.

Figure 5:
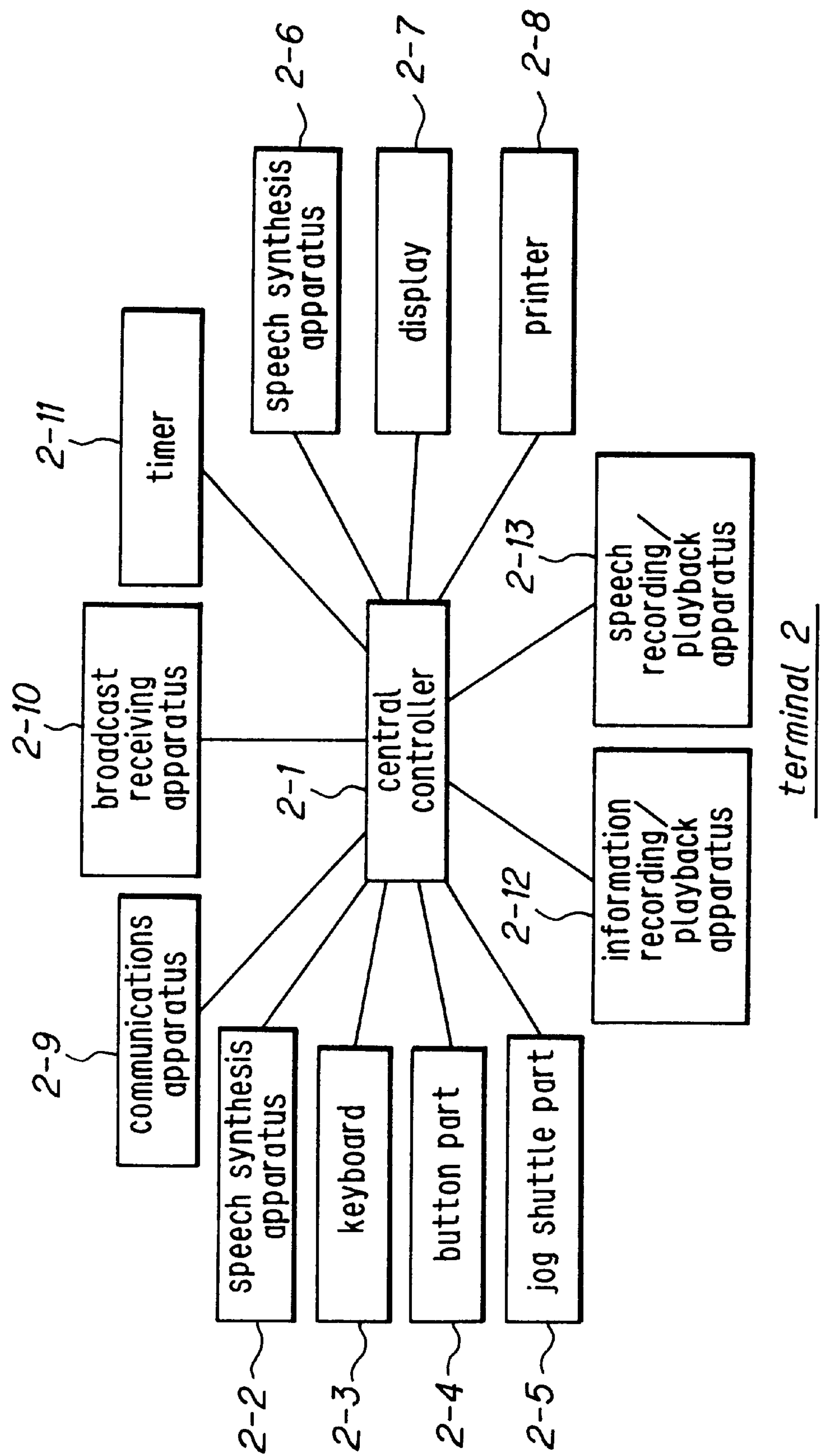
FIG. 5 is a view showing the detailed structure of a terminal 2 in FIG. 1.

Next, the details of the structure of the terminal shown in FIG. 1 are shown in FIG. 5. In addition to controlling each of the blocks which make up the terminal 2, the central controller 2-1 also carries out prescribed processes in accordance with output signals from the speech recognizer 2-2, the keyboard 2-3, the buttons 2-4 and the jog shuttle 2-5. The speech recognizer 2-2 is made up from, for example, a microphone 2-21, an A/D converter 2-22, an analyzer 2-23, a recognition area 2-24 and a memory 2-25. The speech recognizer 2-2 then performs sound analysis on commands and other necessary information inputted as speech information via the microphone 2-21 under the control of the central controller 2-1, and performs speech recognition as necessary.

This is to say that the microphone 2-21 changes the inputted speech into an electrical signal which is outputted to the A/D converter 2-22. The A/D converter then performs an A/D conversion on the speech signal from the microphone 2-21 at a prescribed sampling frequency and outputs this to the analyzer 2-23. The analyzer 2-23 then performs sound analysis on the speech signal from the A/D converter 2-22 so as to extract characteristic speech parameters (sound parameters) such as, for example, linear prediction coefficients and Cepstrum coefficients etc. The sound parameters extracted from the speech signal at the analyzer 2-23 under the control of the central controller 2-1 are then sent to the central system 1 or, for example, undergo vectoral quantization before being sent to the recognition area 2-24.

Sound parameters sent to the central system 1 are recognized at the speech input type database search/send system for the central system 1 in the way described below.

The central controller 2-1 is capable of compressing the speech parameters when the sound parameters are sent to the central system 1. In this case, the compressed sound parameters are processed at the central system 1 after having been expanded.

When the central controller 2-1 sends the sound parameters to the central system 1 and performs speech recognition, limiting information which defines the range of the vocabulary to be targeted for recognition is sent together with the sound parameters. Speech recognition is then carried out at the central system 1 within a vocabulary range defined by the limiting information.

Dictionaries containing words (word dictionaries) as, for example, phoneme unit models or lists of phonemes which were learned beforehand are stored in the memory 2-25. The recognition unit 2-24 then recognizes the speech inputted at the microphone 2-21 as phoneme units from the models stored in the memory 2-25 by observing the sound parameter list outputted from the analyzer 2-23 based on a method such as, for example, HMM (Hidden Markov Models) and carrying out probability calculations.

Here, speech will usually be inputted at the microphone 2-21 in the form of a response to an interrogation (question) from the central controller 2-1. The speech inputted at the central controller 2-1 can then be estimated at the central controller 2-1.

At the time of speech recognition, a recognition control signal for controlling the range of the words taken as the recognition target is outputted to the recognition area 2-24 from the central controller 2-1. The recognition area 2-24 then refers to the words within the words listed in the word dictionary stored in the memory 2-25 which are within the range indicated by the recognition control signal. The list of recognition results for the phoneme units i.e. the words obtained are then outputted to the central controller 2-1 together with the plausibility.

It is also possible to carry out the speech recognition using speech recognition algorithms other than the HMM method.

In the above way, settled selections are made at the central controller 2-1 from the words (or lists of words) provided from the speech recognizer 2-2 as speech recognition results based on the aforementioned prediction response and word plausibility until the final remainder is understood to be the speech inputted at the microphone 2-21.

Returning to FIG. 5, the keyboard 2-3, buttons 2-4 and the jog shuttle 2-5 are operated in order to input commands and other necessary information. The buttons 2-4 and the jog shuttle 2-5 may be formed together as a single item, as shown, for example, in FIG. 7.

The buttons 2-4 are made up of a Yes/Decide button 2-31, a No button 2-32, a left button 2-33, a right button 2-34, a recognition method changeover switch 2-36, a recital button 2-37, a decide button 2-38, a display button 2-39, a set up button 2-40 and an output button 2-41. The jog shuttle 2-5 is made up of a shuttle ring 2-51 and a playback button 2-52 and a stop button 2-53 arranged together within the shuttle ring 2-51. It is also possible to replace the shuttle ring 2-51 in the jog shuttle 2-5 with a jog dial or have the jog shuttle consist of both the shuttle ring 2-51 and a jog dial.

Figure 6:
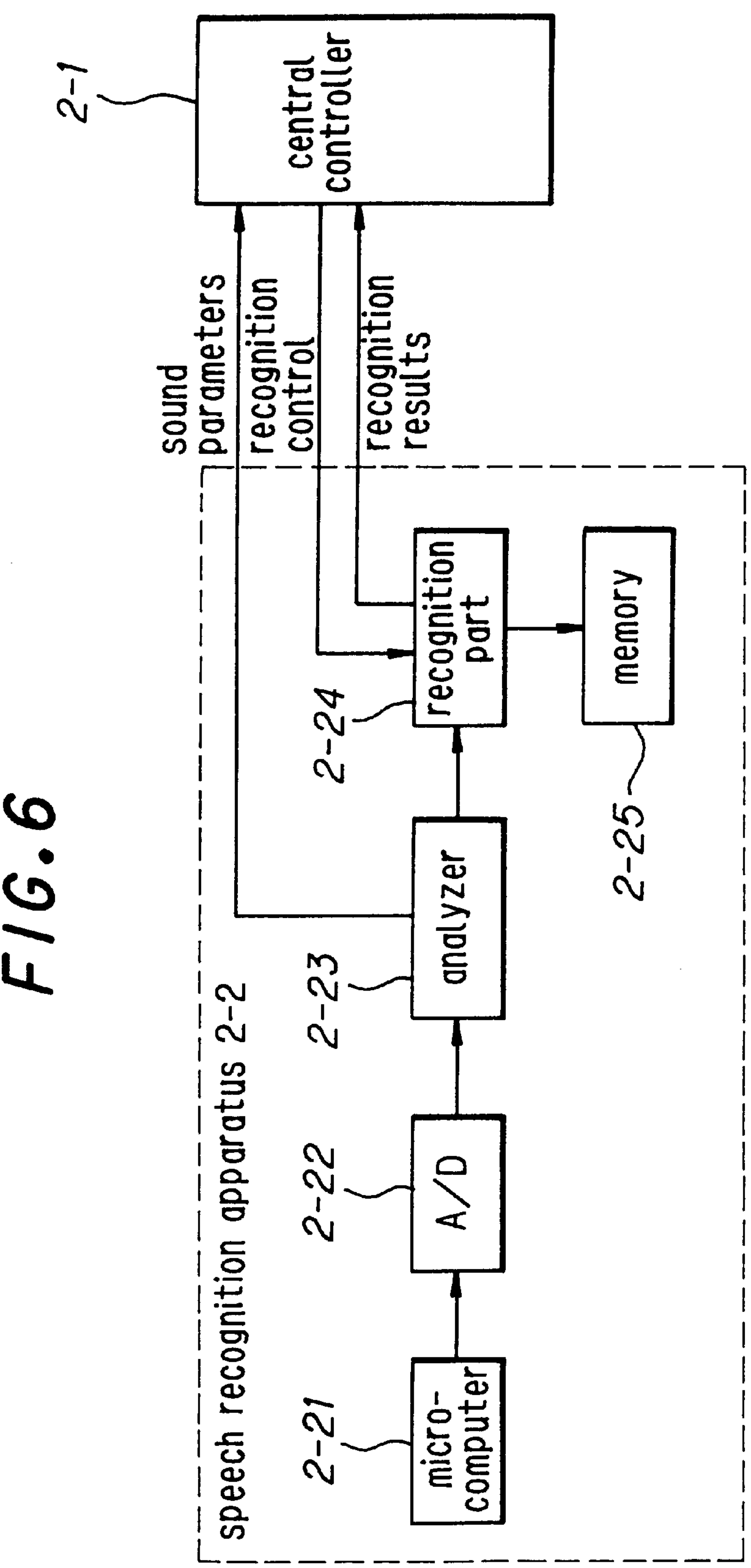
FIG. 6 is a view showing the detailed structure of the speech recognizer 2-2 in FIG. 5.

Here, at the terminal 2, the inputting of information for the central controller 2-1 necessary in addition to the commands can not just be carried out by operating the keyboard 2-3, buttons 2-4 and jog shuttle 2-5. Speech corresponding to commands and other necessary information can also be inputted via the microphone 2-21 built into the speech recognition apparatus (FIG. 6).

The speech synthesizer 2-6 constructed in the terminal 2 (FIG. 5) has the kind of construction shown, for example, in FIG. 8. Phonetic signal information from the central system 1 and information relating to the way in which the document was recited (for example, the tonal quality at the time of recitation and information relating to the speed, hereinafter referred to as recital information) is provided to the recited information analyzer 2-61 via the central controller 2-1. The recited information analyzer then separates the phonetic signal information into phoneme information and rhythm information, analyzes the recital information and outputs the phoneme information and rhythm information together to the phoneme/rhythm information generator 2-62.

At the phoneme/rhythm information generator 2-62, the speech segment connection area 2-65 is controlled using the phoneme and rhythm information, together with the recital information analysis results. When text data, rather than phonetic signal information, is inputted into this speech synthesizer 2-6, this text data is outputted without modification from the recital information analyzer 2-61 to the phoneme/rhythm information generator 2-62. The phoneme/rhythm information generator 2-62 then generates phoneme information and rhythm information from this text data.

On the other hand, speech segment data (for example, digitized waveform data) necessary for estimation speech synthesis using, for example, speech units such as Consonant-Vowel or Consonant-Vowel/Vowel-Consonant etc. is stored in the speech segment data storage area 2-63. This speech segment data is read by the speech segment connection area 2-65 via the impeded hearing user compensator 2-64.

The impeded hearing user compensator 2-64 then puts stress on the formants for the speech segment data as necessary so that the synthesized sounds outputted by the D/A converter 2-67 become easy to hear.

At the speech segment connection area, the necessary speech segment data is read out from the speech segment data storage area 2-63 via the impeded hearing user compensator 2-64 under the control of the phoneme/rhythm information generator 2-62. The speech segment data read out is then connected together so as to form continuous speech waveforms. These speech waveforms (composite speech signals) are then outputted to the impeded hearing user frequency compensator 2-66. This impeded hearing user frequency compensator 2-66 is, for example, constructed from low band or high band-emphasizing digital filters having a prescribed number of taps. The composite speech signal outputted from the speech segment connection area 2-65 then undergoes spectral emphasis so as to become easy to hear before being outputted to the D/A converter 2-67. The composite speech signal from the impeded hearing user frequency compensator 2-66 is then converted from a digital to an analog signal at the D/A converter 2-67 and is outputted from, for example, a speaker taken as the speech output apparatus, which is not shown in the diagram, as synthesized sounds.

Figure 7:
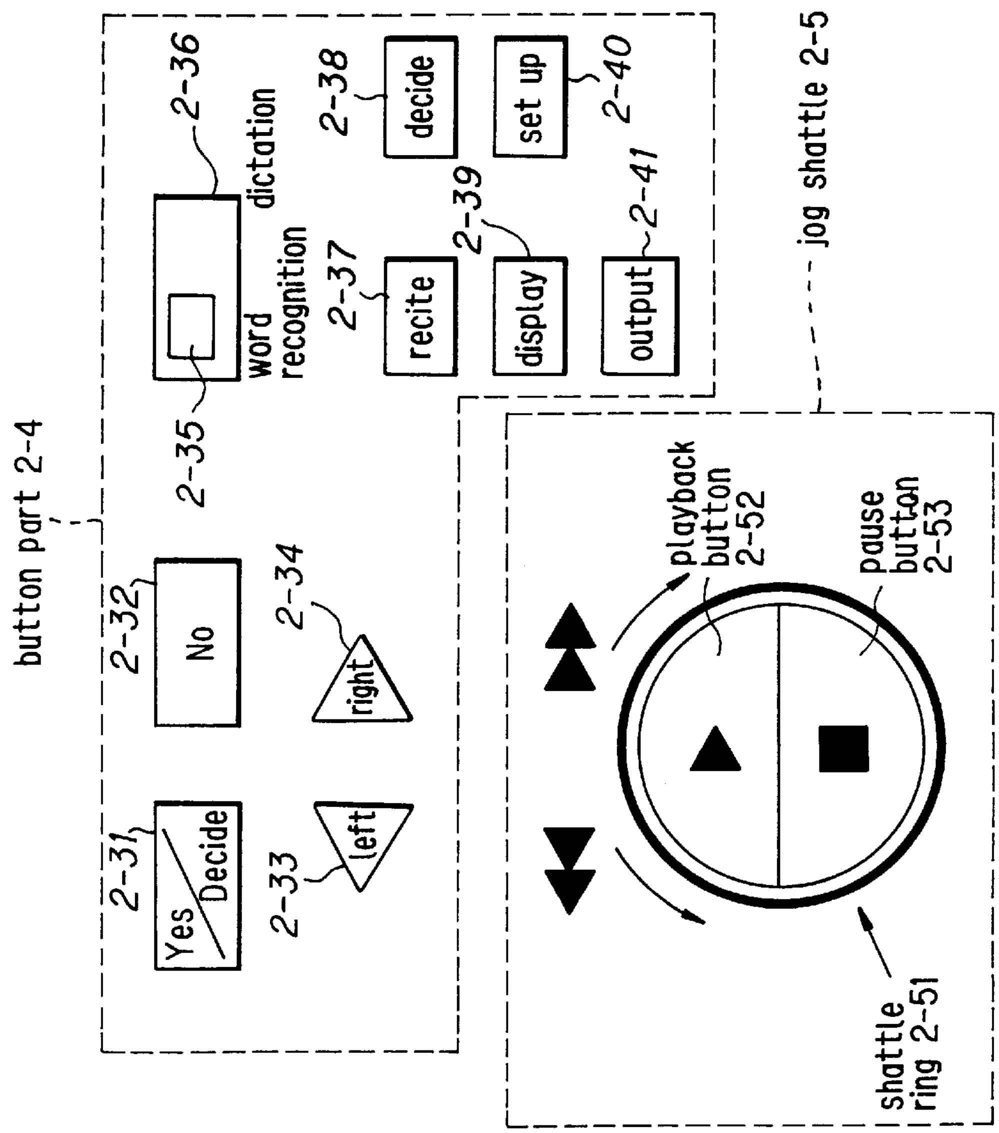
FIG. 7 is a view describing the detailed structure of the buttons 2-4 and the jog shuttle 2-5 in FIG. 5.

The tonal quality and the speed of utterance (speaking speed) of the synthesized sounds which are taken as the recital information, the characteristics of the emphasis of the formants occurring at the impeded hearing user compensator 2-64 and the characteristics for the emphasis of the frequencies occurring at the impeded hearing user frequency compensator 2-66 can be varied by, for example, operating the keyboard 2-3, the left button 2-33 and the right button 2-34 of the buttons 2-4 (FIG. 7) or the shuffle ring of the jog shuttle 2-5 (FIG. 7).

These can also be used to make changes to speech inputted from the speech recognizer 2-2 (for example, UTTERANCE, the speed at which the synthesized sounds are uttered, may be speeded up by saying [speak more quickly]).

Returning to FIG. 5, the display 2-7 shows information sent from the central system 1 under the control of the central controller 2-1 along with showing operation prompt information (interrogations or questions) to the user. This display 2-7 may be a Braille display. The printer 2-8 prints out information sent from the central system 1 under the control of the central controller 2-1 and this may also be a Braille printer.

The communications apparatus 2-9 serves as an interface which controls communications between the central system 1 and the central controller 2-1 and may be, for example, a modem. The broadcast receiving apparatus 2-10 may have the same structure as, for example, a radio or television receiver which usually receives radio programs (radio transmissions) or television programs (television transmissions) and output these received transmissions from the display 2-7 or from speakers. Further, the transmission receiving apparatus should always be capable of receiving urgent transmissions so that when an urgent transmission is received, the contents of this urgent transmission may be displayed on the screen and/or outputted from speakers even if the power supply switch (not shown in the diagrams) for the terminal 2 is off.

The timer 2-11 keeps track of the amount of time which has passed. The central controller 2-1 then refers to the amount of time which has passed and, for example, accesses the central system 1 at a time when the communications charges are cheap (for example, at night) and receives information searched from the book database 5 (FIG. 1) at the time of accesses during the day.

The information recording/playback apparatus 2-12 may be, for example, a semiconductor memory apparatus, a magnetic disc apparatus (floppy disc apparatus, hard disc apparatus), a magneto-optical disc apparatus (mini-disc apparatus) or an optical disc apparatus (CD-ROM apparatus) which records, for example, information sent from the central system 1 or information necessary for operating other apparatus etc. on a recording medium (for example, a semiconductor memory, magnetic disc, magneto-optical disc or optical disc etc.). The information recording/playback apparatus 2-12 also plays back information recorded on the recording medium.

The speech recording/playback apparatus 2-13 may be, for example, an audio cassette tape recorder, digital audio tape (DAT) equipment or mini-disc equipment etc. This then records the speech (synthesized sounds) synthesized by the speech synthesizer 2-6 on a recording medium (for example, a cassette tape, digital audio tape or mini-disc etc.). The speech recording/playback apparatus 2-13, under the control of the central controller, also plays back or plays back in reverse the synthesized sounds recorded on the recording medium. The playing back of the synthesized sounds, halting of playback, along with the fast forward (including double speed playback) and rewind (including reverse playback) operations are carried out by operating the playback button 2-52 of the jog shuttle (FIG. 7), the stop button 2-53 or the shuttle ring 2-51 respectively.

Figure 9:
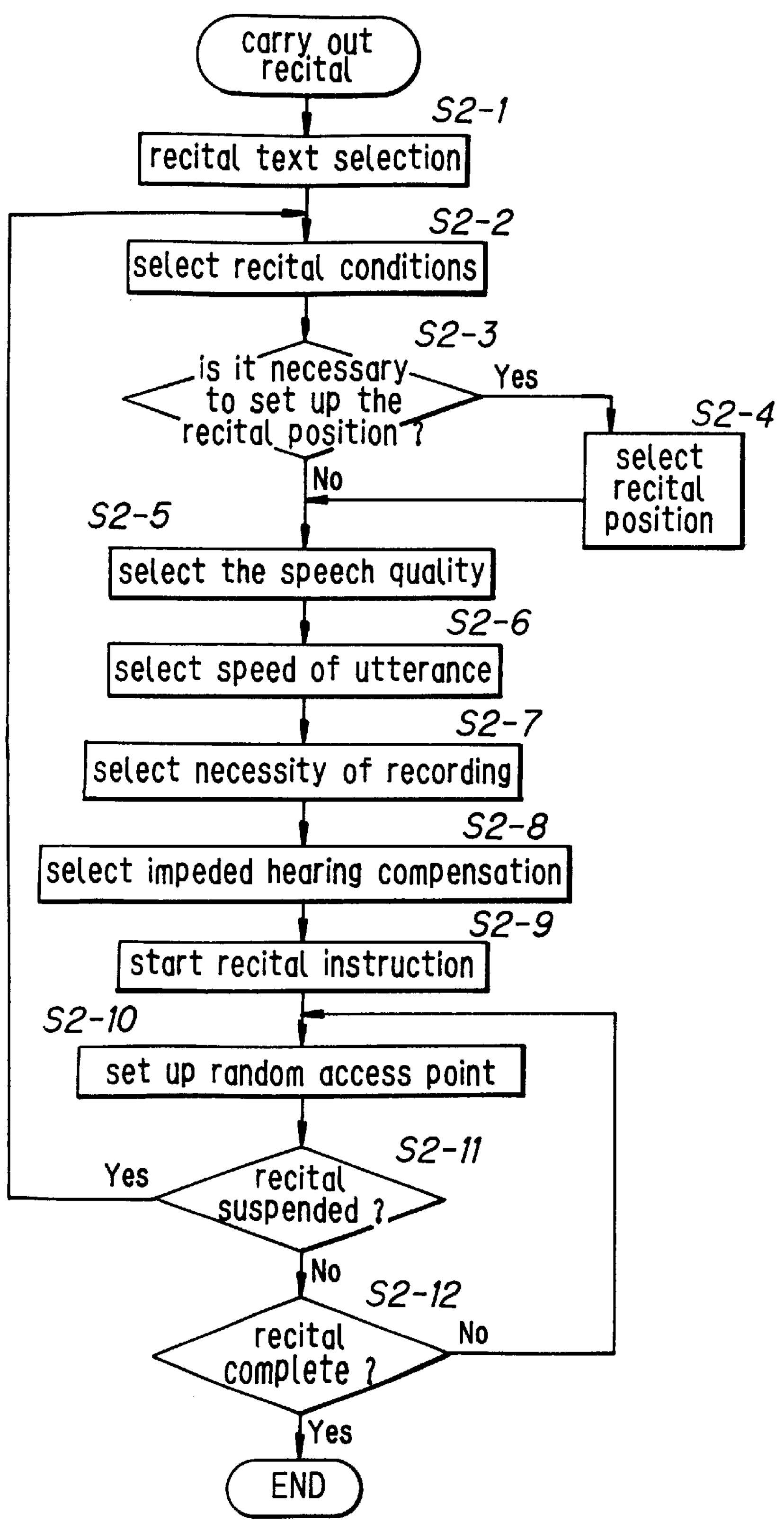
FIG. 9 is a flowchart for explaining operations in a case where recitation of a publication is performed in the terminal 2 in FIG. 5.

Next, operations where phonetic signal information for a document recorded on the recording medium (for example, a recording medium on which phonetic signal information for the document sent from the central system is pre-recorded) is played back by the information recording/playback apparatus 2-12 and speech synthesis which uses this played back information is carried out i.e. operations where document recital is carried out, are described with reference to the flowchart in FIG. 9.

Upon turning the power supply switch for the central controller 2-1 (FIG. 5) on, the display 2-7 is controlled by the central controller 2-1 and as a result of this, a prescribed menu is shown on the display 2-7. Alternatively, the speech synthesizer 2-6 may be controlled by the central controller 2-1 so that the contents of the menu may be outputted from the speech synthesizer 2-6 as synthesized sounds.

Next, the user selects the document to be recited from the menu. This selection may be carried out by inputting speech corresponding to the menu for reciting the document via the microphone 2-21 for the speech recognition apparatus (FIG. 6). Alternatively, this may be carried out by operating the keyboard 23, the buttons 2-4 or the jog shuttle 2-5 (this may be referred to in the following as the operation of the speech recognizer 2-2, the keyboard 2-3, the buttons 2-4 or the jog shuttle 2-5).

If the keyboard 2-3 is used, selecting may be carried out by typing a character corresponding to the menu for carrying out the document recital, or by making a selection by operating a cursor key (not shown in the diagrams) so as to correspond with a portion corresponding to the menu for carrying out the recital which is displayed on the display 2-7. If any of the buttons 2-4 (FIG. 7) are used, a portion corresponding to the menu for carrying out the document recital displayed on the display 2-7 is selected by operating the left button 2-33 and the right button 2-34 and by then confirming this by pressing the Yes/decide button 2-31 or the decide button 2-38. Further, if the jog shuffle 2-5 (FIG. 7) is used, a portion displayed on the display 2-7 corresponding to the menu for carrying out the document recital is selected by operating the shuttle ring 2-51 and a decision is then made by operating the Yes/decide button 2-31 of the buttons 2-4 or the decide button 2-38.

When the central controller 2-1 is made to select the menu for carrying out a document recital in the above way, the process goes into the operating mode for carrying out the document recital (hereinafter referred to as "recital mode"). Then, the process for selecting the document to be recited (document text) is first carried out in step S2-1 shown in FIG. 9. i.e. the central controller 2-1 displays the title of the document recorded in the phonetic signal information recorded at the information recording/playback apparatus 2-12 (a recording medium incorporated into the information recording/playback apparatus 2-12) on the screen. Alternatively, output may be provided from the speech synthesizer 2-6 in the form of synthesized sounds (Hereinafter this shall be referred to as "display output" or "speech synthesizer 2-6 output").

The user selects the title desired for recital from the titles outputted by the display 2-7 or the speech synthesizer 2-6. The title selection can be made either by inputting speech corresponding to the document title via the microphone 2-21 for the speech recognizer 2-2 or by operating the keyboard 2-3, the buttons 2-4 or the jog shuttle 2-5, in the same way as for the menu selection mentioned previously.

When the title of the document to be recited is selected, the process goes on to step S2-2 and the recital conditions are selected. These recital conditions may be, for example, the conditions for reciting from the start of the body of the document, the conditions for starting from a discontinued portion of the previous recital or the conditions for reciting only the contents of the document.

A menu for the recital conditions are also outputted on the display 2-7 or an output is also sent from the speech synthesizer 26 while the recital conditions are being selected, in the same way as the case for the selection of text to be recited in step S2-1. The desired items are then selected by the user by operating the speech recognizer 2-2, the keyboard 2-3, the buttons 2-4 or the jog shuttle 2-5.

After the process in step S2-2, the process moves on to step S2-3 and a question menu for determining (questioning) whether or not recital position set up is necessary is outputted via the display 2-7 or the speech synthesizer 2-6. A selection is then made as to whether or not recital position set up is necessary by the user via the speech recognizer 2-2, the keyboard 2-3, the buttons 2-4 or the jog shuttle 2-5. In doing so, a selection signal corresponding to the operations carried out by the user is outputted from the speech recognizer 2-2, the keyboard 2-3, the buttons 2-4 or the jog shuttle 2-5 to the central controller 2-1, which then determines whether or not recital position set up is necessary based on the selection signal.

If it is determined by the central controller 2-1 that recital position set up is not necessary, the process misses out step S2-4 and goes on to step S2-5. If, on the other hand, the central controller 2-1 determines that recital position set up is necessary, the process goes on to step S24 and the recital position selection menu is displayed on the display 2-7 or outputted via the speech synthesizer 2-6. The user then selects the recital position by operating the speech recognizer 2-2, the keyboard 2-3, the buttons 2-4 or the jog shuttle 2-5.

The chapters and paragraphs which it is wished to have recited are selected during the selection of the recital position in step S2-4. It is also possible to select the recital of the document to start from the beginning of this paragraph or chapter, to have only a few sentences from this starting place recited, to just have a preset keyword for fast reading (to be described in detail later) recited or to just have that in the region of a random access point set by the user in step S2-10, to be described later, recited.

After this, steps S5 to S8 are gone through sequentially, so that the tonal quality of the synthesized sounds recited as the document and the speed at which the speaking takes place are selected for the output from the speech synthesizer 2-6, it is selected whether or not to record the synthesized sounds at the speech recording playback apparatus 2-13 (select necessity of recording) and the frequency characteristics of the synthesized sounds are selected (hearing difficulty correction selection). i.e. in step S2-5 to step S2-8, the respective selection menus are outputted on the display 2-7 or from the speech synthesizer 26. The desired tonal quality and speed of utterance of the synthesized sounds, whether or not the synthesized sounds are recorded and the frequency characteristics of the desired synthesized sounds are then all selected by the user operating the speech recognizer 2-2, the keyboard 2-3, the buttons 2-4 or the jog shuttle 2-5.

Here, in the case where a low tonal quality is selected by the selection menu for the tonal quality of the composite tones from the speech synthesizer 2-6 bring outputted and the speech recognizer 2-2 being operated (i.e. speech is inputted to the speech recognizer 2-2 (microphone 2-21)), the speech synthesis apparatus, for example, outputs the synthesized sounds "what is the tone of the pitch?" and the user inputs the speech "low" to the speech recognizer 2-2.

Also, in the case where a low speed of utterance is selected by a selection menu for the speed of utterance of the synthesized sounds from the speech synthesizer 2-6 being outputted and the speech recognizer 2-2 being operated, the synthesized sounds "utterance speed", for example, are outputted by the speech synthesizer 2-6 and the speech "slow" is inputted to the speech recognizer 2-2 by the user.

Further, in the case where it is selected that the synthesized sounds are to be recorded by the selection menu for whether or not to carry out the recording of the synthesized sounds being outputted from the speech synthesizer 2-6 and the speech recognizer 2-2 being operated, the synthesized sounds "record?", for example, are outputted by the speech synthesizer 2-6 and the speech "yes" is inputted to the speech recognizer 2-2 by the user.

After the process in steps S2-5 to S2-8, the process goes on to step S2-9 and the speech recognizer 2-2, keyboard 2-3, buttons 2-4 or the jog shuttle 2-5 are operated so that the recital commences. In doing so, at the central controller 2-1 the phonetic signal information for the document recorded at the information recording playback apparatus is read out and sent to the speech synthesizer 2-6. In this way, speech is synthesized at the speech synthesizer 2-6 in the way described above and synthesized sounds are outputted. i.e. the document selected in step S2-1 is recited under the conditions selected in step S2-2 at the recital position selected in step S2-4. The synthesized sounds are outputted from the speech synthesizer 2-6 at this time at a tonal quality, utterance speed and a frequency characteristic selected in the steps S2-5, S2-6 and S2-8 respectively.

In the case where this recital is started by operating the speech recognizer 2-2 (where speech is inputted to the speech recognition apparatus), the speech "recital" is inputted to the speech recognizer 2-2. In the case where the keyboard 2-3 is used, a character string, for example "recital" is typed in. If the buttons 2-4 are used, the recital button 2-37 is operated (FIG. 7).

In the above way, when the recital is made to start and it has been selected in step S2-7 that the synthesized sounds of the recital are to be recorded, the recording of the composite tones for the recital is started using the speech recording/playback apparatus 2-13. The step S2-10 is then gone on to and the setting up of a point for random access is carried out, if necessary. The setting up of this point is carried out by the user operating the speech recognizer 2-2, keyboard 2-3 or the buttons 2-4 (in the case of the buttons 2-4, this will be the set up button 2-40 (FIG. 7)) so as to, for example, open up the synthesized sounds for a second time at the desired recital position.

The recital position set up at this point (random access point) can then be accessed immediately by operating the speech recognizer 2-2, keyboard 2-3, buttons 2-4 or the jog shuttle 2-5.

After this, the process goes on to step S2-1 1 and it is determined whether or not the speech recognizer 2-2, keyboard 23 or buttons 2-4 have been operated so as to cause the recital to be interrupted. If it is determined in this step S2-11 that the user has operated the speech recognizer 2-2, keyboard 2-3 or buttons 2-4 so as to cause the recital to be interrupted, the outputting of the synthesized sounds which recite the document is stopped. Also, if the speech recording/playback apparatus 2-13 is recording the recital, this operation is also stopped and the process returns to step S2-2.

i.e. in this case, the recital conditions for reciting the document, the tonal quality of the synthesized sounds and the speed of utterance etc. are pinpointed.

If it is determined in this step S2-11 that the user has not operated the speech recognizer 2-2, keyboard 2-3 or buttons 2-4 so as to cause the recital to be interrupted, the process goes on to step S2-12 where it is determined whether or not the user has operated the speech recognizer 2-2, keyboard 2-3 or buttons 2-4 in order to end the recital.

Also, if it is determined in step S2-12 that the user has not operated the speech recognizer 2-2, keyboard 2-3 or buttons 2-4 so as to cause the recital to end, the step S2-10 is returned to. If, however, it is determined in step S2-12 that the user has operated the speech recognizer 2-2, keyboard 2-3 or buttons 2-4 so as to cause the recital to end, the outputting of the synthesized sounds is halted. Also, if the speech recording/playback apparatus 2-13 is recording the recital, this operation is also stopped and the process is completed.

Figure 10:
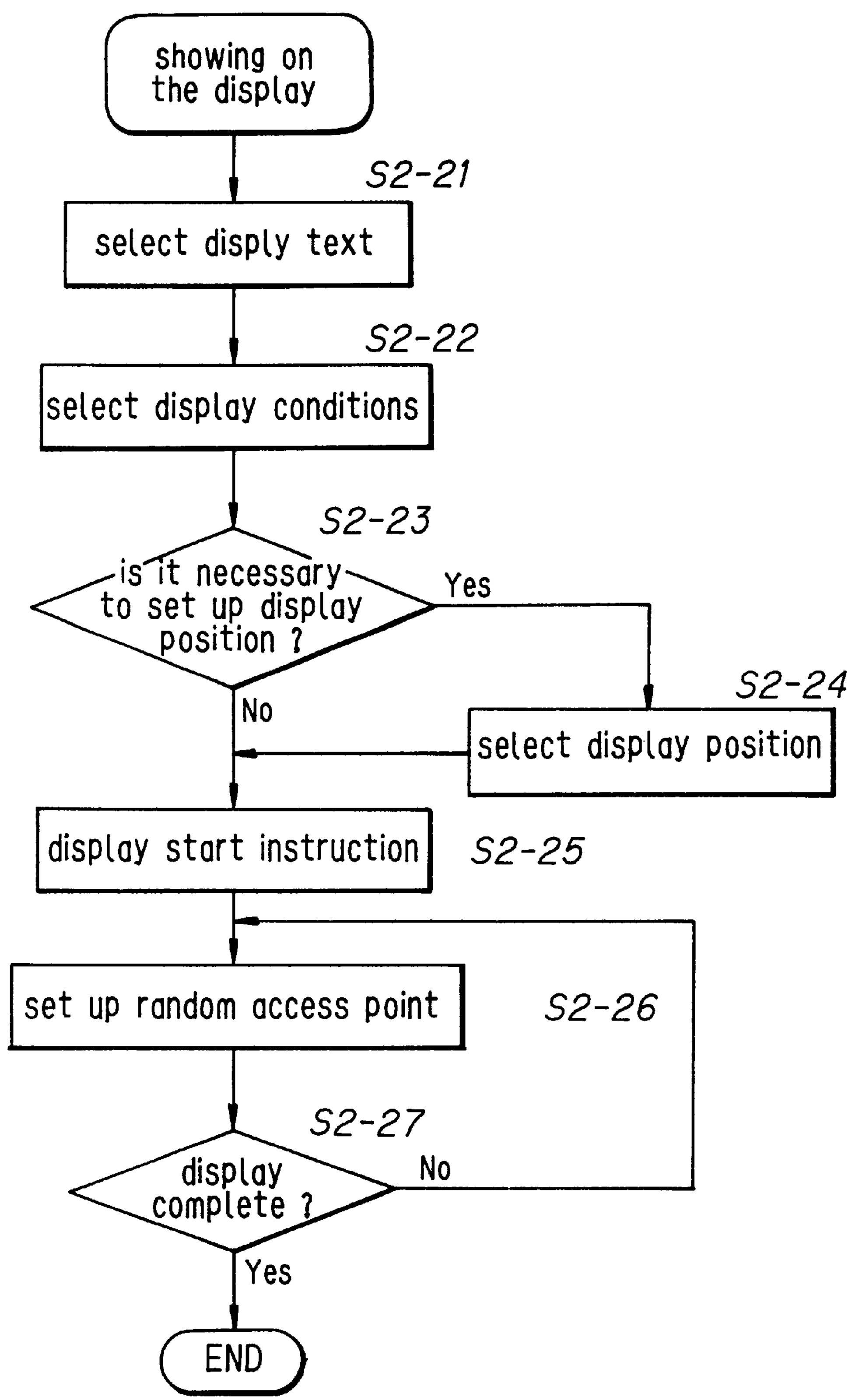
FIG. 10 is a flowchart for explaining operations in a case where the publication is displayed on the display 2-7 in the terminal 2 of FIG. 5.

Next, the document data recorded on the recording media (for example, the document data transmitted from the central system 1 (this may include photographic or diagrammatic data in addition to text data) has already been recorded on the recording media by the information recording/playback apparatus 2-12) is played back by the information recording/playback apparatus 2-12, with the flowchart for the operation whereby this is shown on the display 2-7 being described with reference to the flowchart in FIG. 10.

In this case also, the central controller 2-1 first goes into the operating mode for carrying out the displaying of documents in the same way as the case for reciting the documents described above. The display process for the document to be displayed (display text) is then carried out in step S2-21 shown in FIG. 10. The central controller 2-1 then outputs the title of the document for which the data is being recorded at the information recording/playback apparatus 2-12 (the recording medium installed at the information recording/playback apparatus 2-12) via the display 2-7 or the speech synthesizer 2-6.

The desired title from the titles outputted via the display 2-7 or the speech synthesizer 2-6 can then be selected by the user by operating the speech recognizer 2-2, keyboard 2-3, buttons 2-4 or the jog shuttle 2-5.

When the title of the document to be displayed is selected, the process goes on to step S2-22 and the display conditions are selected. These display conditions may be, for example, the conditions for displaying from the start of the body of the document, the conditions for starting from a discontinued portion of the previous display or the conditions for displaying the contents of the document only.

The selection of these display conditions is carried out by outputting a display conditions menu via the display 2-7 or the speech synthesizer 2-6 and then having the user make selections by operating the speech recognizer 2-2, keyboard 2-3, buttons 2-4 or the jog shuttle 2-5.

After the process in step S2-22, the process moves on to step S2-23 and a question menu for determining (questioning) whether or not display position set up is necessary is outputted via the display 2-7 or the speech synthesizer 2-6. A selection is then made as to whether or not display position set up is necessary by the user via the speech recognizer 2-2, the keyboard 2-3, the buttons 2-4 or the jog shuttle 2-5. In doing so, a selection signal corresponding to the operations carried out by the user is outputted from the speech recognizer 2-2, the keyboard 2-3, the buttons 2-4 or the jog shuttle 2-5 to the central controller 2-1, which then determines whether or not display position set up is necessary based on the selection signal.

If it is determined by the central controller 2-1 that display position set up is not necessary, the process misses out step S2-24 and goes on to step S2-25. If, on the other hand, the central controller 2-1 determines that display position set up is necessary, the process goes on to step S2-24 and the display position selection menu is displayed on the display 2-7 or outputted via the speech synthesizer 2-6. The user then selects the display position by operating the speech recognizer 2-2, the keyboard 2-3, the buttons 2-4 or the jog shuttle 2-5.

The chapters and paragraphs which it is wished to have displayed are selected during the selection of the display position in the same way as that during the selection of the recital position described above. It is also possible to select the displaying of the document to start from the beginning of this paragraph or chapter, to have only a few sentences from this starting place displayed, to just have a preset keyword for fast reading (to be described in detail later) displayed or to just have that in the region of a random access point set by the user in step S2-10, to be described later, displayed.

After this, the process goes on to step S2-25 and the speech recognizer 2-2, keyboard 2-3, buttons 2-4 or the jog shuttle 2-5 are operated so that displaying commences. In doing this, at the central controller 2-1, document data recorded by the information recording/playback apparatus 2-12 is read out and displayed via the display 2-7. i.e. the document selected in step S2-21 is displayed under the display conditions selected in step S2-22 from the display position selected in step S2-24.

In the case where this displaying is started by operating the speech recognizer 2-2 (where speech is inputted to the speech recognition apparatus), the speech "display" is inputted to the speech recognizer 2-2. In the case where the keyboard 2-3 is used, a character string, for example "display" is typed in. If the buttons 24 are used, the display button 2-39 is operated (FIG. 7).

When the displaying has started in the above way, the user can scroll through the picture displayed on the screen by operating the speech recognizer 2-2, keyboard 2-3, buttons 2-4 or the jog shuttle 2-5.

The step S2-26 is then gone onto and a point for random access is set up if necessary. This random access point may be set up by, for example, the user scrolling the screen display in the way described above. The user may then look again at the desired display position and then operate the speech recognizer 2-2, keyboard 2-3 or buttons 2-4 (in the case of the buttons 2-4 this would be the set up button 2-40 (FIG. 7).

The display position set up by this random access point can then be accessed immediately by operating the speech recognizer 2-2, keyboard 2-3, buttons 2-4 or the jog shuttle 2-5.

After this, the process goes on to step S2-27 and it is determined whether or not the speech recognizer 2-2, keyboard 23 or buttons 2-4 have been operated by the user so as to end the displaying.

If it is determined in step S2-27 that the speech recognizer 22, keyboard 2-3 or buttons 2-4 have not been operated by the user so as to end the displaying, the process returns to step S2-26. If, however, it is determined in step S2-27 that the speech recognizer 2-2, keyboard 2-3 or buttons 2-4 have been operated by the user so as to end the displaying, displaying via the display 2-7 is stopped and the process is completed.

Figure 11:
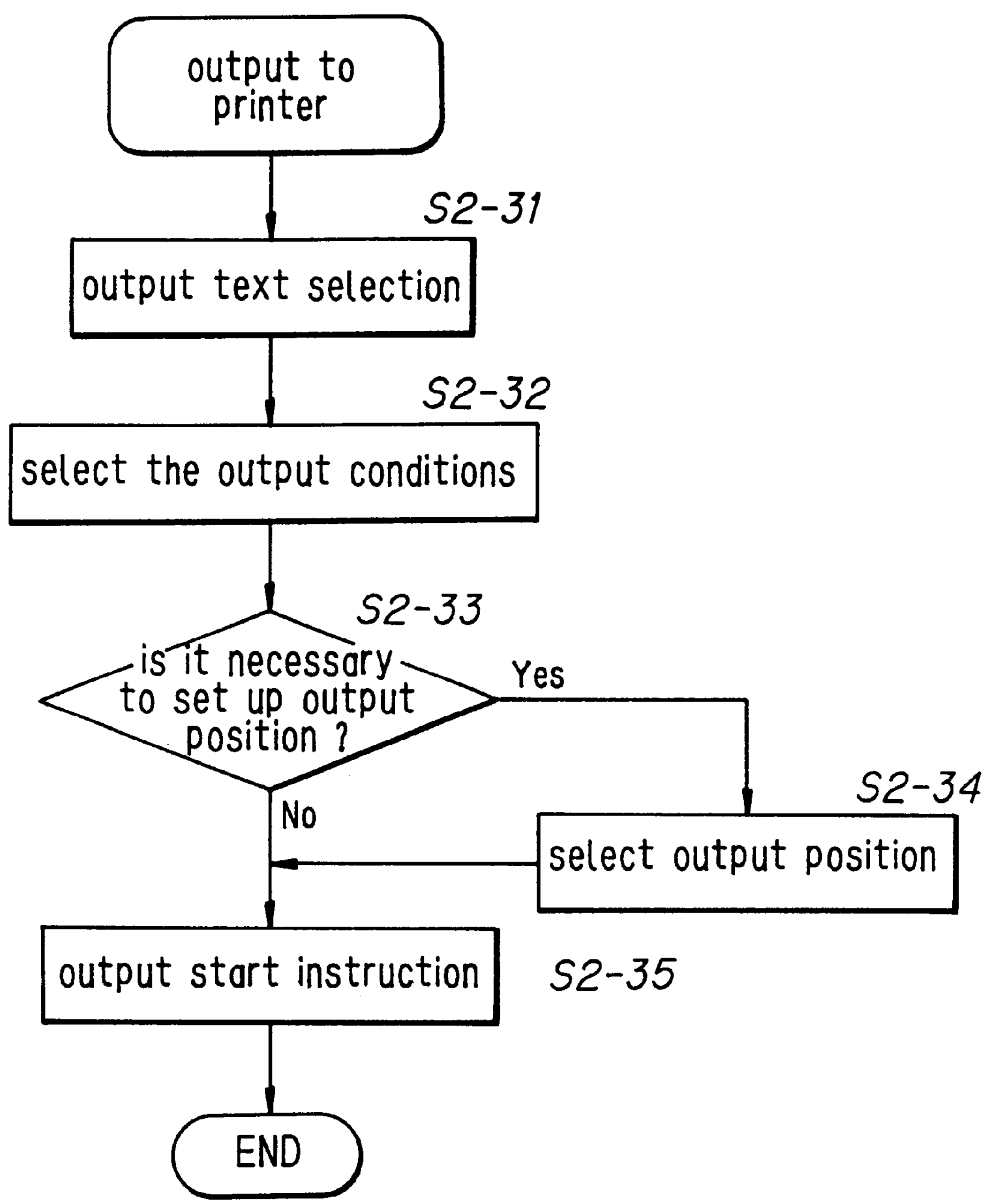
FIG. 11 is a flowchart for explaining operations in a case where printing out of the publication form the printer 2-8 is performed in the terminal 2 of FIG. 5.

Next, the document data recorded on the recording media (for example, the document data transmitted from the central system 1 (this may include photographic or diagrammatic data in addition to text data) has already been recorded on the recording media by the information recording/playback apparatus 2-12) is played back by the information recording/playback apparatus 2-12, with the flowchart for the operation whereby this is printed out by the printer 2-8 being described with reference to the flowchart in FIG. 11.

In this case also, the central controller 2-1 first goes into the operating mode for printing out documents in the same way as the case for reciting the documents described above. The selection process for the document to be printed out (text output) is then carried out in step S2-31 shown in FIG. 11. The central controller 21 then outputs the title of the document for which the data is being recorded at the information recording/playback apparatus 2-12 (the recording medium installed at the information recording/playback apparatus 2-12) via the display 2-7 or the speech synthesizer 2-6.

In doing so, the user can select the desired item from the titles outputted via the display 2-7 or the speech synthesizer 2-6 by operating the speech recognizer 2-2, keyboard 2-3, buttons 2-4 or the jog shuttle 2-5.

When the title of the document to be printed is selected, the process goes on to step S2-32 and the output conditions are selected. These output conditions may be, for example, the conditions for printing out from the start of the body of the document, the conditions for starting to print out from a discontinued portion of the previous print out or the conditions for printing out the contents of the document only.

The selection of the output conditions is carried out by the user selecting the desired items from the output conditions menu outputted via the display 2-7 or the speech synthesizer 2-6 by operating the speech recognizer 2-2, keyboard 2-3, buttons 2-4 or the jog shuffle 2-5.

After the process in step S2-32, the process moves on to step S2-33 and a question menu for determining (questioning) whether or not output position set up is necessary is outputted via the display 2-7 or the speech synthesizer 2-6. A selection is then made as to whether or not output position set up is necessary by the user via the speech recognizer 2-2, the keyboard 2-3, the buttons 2-4 or the jog shuttle 2-5. In doing so, a selection signal corresponding to the operations carried out by the user is outputted from the speech recognizer 2-2, the keyboard 2-3, the buttons 2-4 or the jog shuttle 2-5 to the central controller 2-1, which then determines whether or not output position set up is necessary based on the selection signal.

If it is determined by the central controller 2-1 that output position set up is not necessary, the process misses out step S2-34 and goes on to step S2-35. If, on the other hand, the central controller 2-1 determines that output position set up is necessary, the process goes on to step S2-34 and the output position selection menu is displayed on the display 2-7 or outputted via the speech synthesizer 2-6. The user then selects the output position by operating the speech recognizer 2-2, the keyboard 2-3, the buttons 2-4 or the jog shuttle 2-5.

The chapters and paragraphs which it is wished to have outputted are selected during the selection of the output position in the same way as during the selection of the recital position described previously. It is also possible to select the printing of the document to start from the beginning of this paragraph or chapter, to have only a few sentences from this starting place printed, to just have a preset keyword for fast reading (to be described in detail later) printed or to just have that in the region of a random access point set by the user in the aforementioned recital process (FIG. 9) and display process (FIG. 10), printed out.

After this, the speech recognizer 2-2, keyboard 2-3, buttons 2-4 or the jog shuttle 2-5 are operated so that printing out begins. The central controller 2-1 then reads out the document data recorded by the information recording/playback apparatus and outputs it to the printer 2-8 where it is printed out. i.e. the document selected in step S2-31 is outputted under the conditions selected in step S2-32 and printed out from the output position selected in step S2-24.

In the case where this printing out is started by operating the speech recognizer 2-2 (where speech is inputted to the speech recognition apparatus), the speech "output" is inputted to the speech recognizer 2-2. In the case where the keyboard 2-3 is used, a character string, for example "output" is typed in. If the buttons 2-4 are used, the display button 2-39 is operated (FIG. 7).

After this, printing out ends and the process is complete.

If the information recording/playback apparatus 2-12 has a recording medium capable of disorbing, the recital, display and print out operations described above are carried out after a recording medium on which document information is already recorded is installed into the information recording/playback apparatus 2-12, rather than after document information sent from the central system 1 is recorded on the recording medium.

Also, let the case be considered where the timer 2-11 keeps track of the amount of time which has passed, the central controller 2-1 refers to the amount of time which has passed and, for example, accesses the central system 1 at a time when the communications charges are cheap (for example, at night) and receives information searched from the book database 5 (FIG. 1) at the time of accesses made at some time beforehand. Here, the recital conditions, recital position, tonal quality of the synthesized sounds etc. have already been selected beforehand. The received document is then recited by the speech synthesizer 2-6 based directly on these selections and these recited synthesized sounds are recorded in preparation by the speech recording/playback apparatus 2-13.

In this case, the user can listen immediately to the recited tones, for example, the following day.

Figure 12:
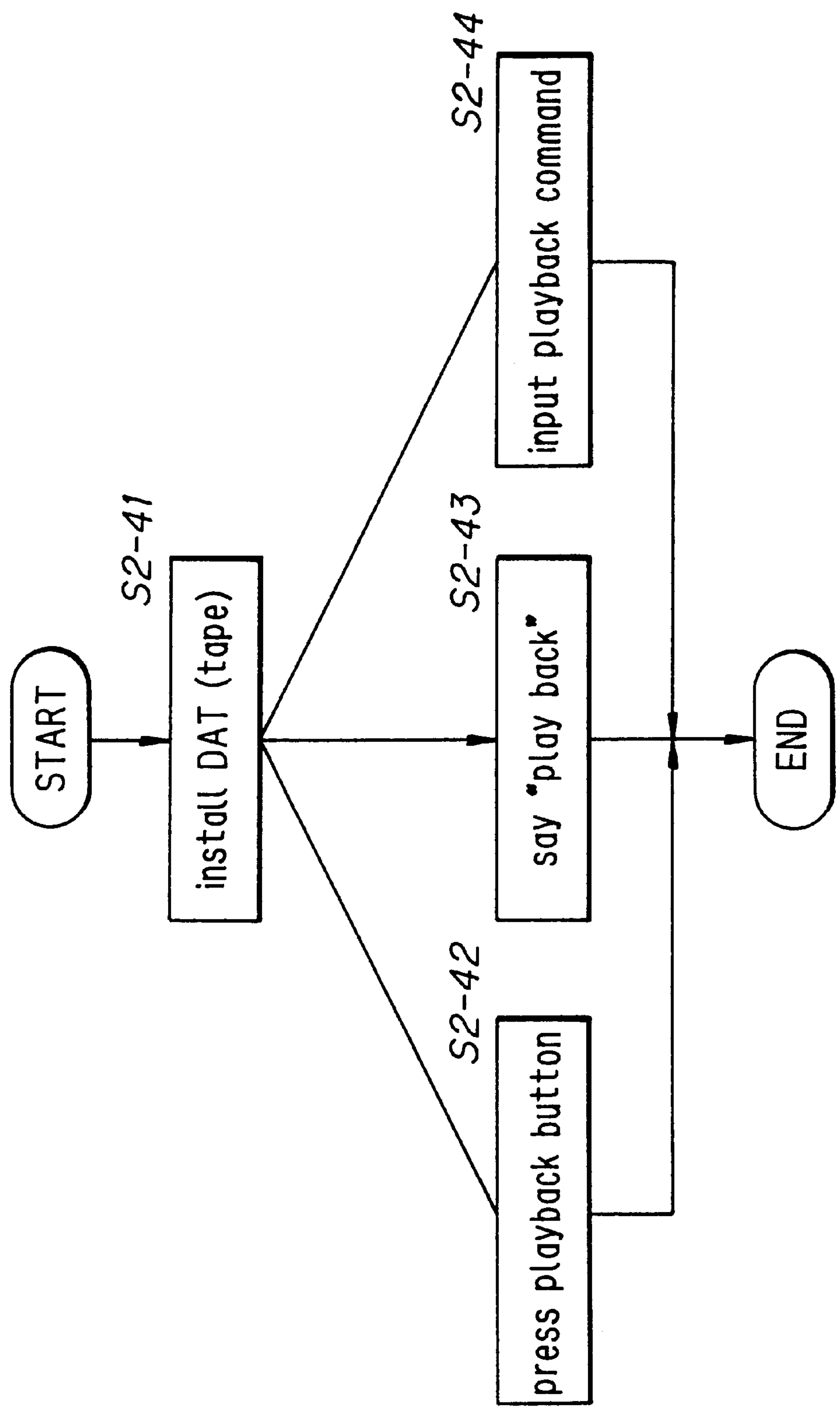
FIG. 12 is a flowchart for explaining operations in a case where reproduction is performed by the speech recording/playback apparatus 2-13 in the terminal 2 of FIG. 5.

Next, at the terminal 2, in the case where the speech recording playback apparatus 2-13 is, for example, a Digital Audio Tape (DAT) unit, a digital audio tape on which speech is already recorded is played back by the speech recording/playback apparatus 2-13 in the way shown in FIG. 12.

First, in step S2-41, the DAT is loaded into the speech recording/playback apparatus 2-1. Then, the input from the central controller 2-1 (this is not an input for a command etc. which depends upon the operation of an operation part (not shown in the diagrams) loaded in the speech recording/playback apparatus but is an input for a command from the central controller 2-1) is selected and one of steps S2-42 to S2-44 is gone onto.

If step S2-42 is gone onto, the speech recording/playback apparatus 2-13 is controlled so that the central controller 2-1 starts to playback the DAT (or playback the DAT in reverse) by operating the left button 2-33 or the right button 2-34 of the buttons 2-4 (FIG. 7) or the playback button 2-52 of the jog shuttle 2-5.

If step 2-43 is gone onto, the speech recording/playback apparatus 2-13 is controlled so that playback of the DAT is started by the central controller 2-1 by, for example, inputting the speech "playback" into the speech recognizer 2-2. If, on the other hand, step S2-44 is gone onto, the speech recording/playback apparatus 2-13 can be controlled so that the central controller 2-1 starts to play back the DAT by typing in a character string such as, for example, "playback" via the keyboard 2-3.

Next, the rewinding or fast-forwarding of the DAT loaded in the speech recording/playback apparatus 2-13 is carried out in the following way. First, an input from the central controller 2-1 is selected. Then, if, for example, the speech "fast forward" or "rewind" is inputted to the speech recognizer 2-2, the speech recording/playback apparatus 2-13 is controlled so that the DAT is fast forwarded or rewound, respectively, by the central controller 2-1.

If the jog shuttle ring of the jog shuttle 2-5 (FIG. 7) is rotated to the right or left, the speech recording/playback apparatus 2-13 is also controlled so that the DAT is fast-forwarded or rewound by the central controller 2-1 at a speed which is in accordance with the angle of rotation of the shuttle ring 2-51.

The speech recording/playback apparatus 2-13 is also controlled so that the DAT is fast-forwarded or rewound by the central controller 2-1 if, for example, the character strings "fast forward" or "rewind" are typed in via the keyboard 2-3.

The stopping of the playback, fast forward or rewind operations of the DAT are carried out in the following way. First, the input from the central controller 2-1 is selected. Then, the speech recording/playback apparatus 2-13 is controlled so that the playback, fast forward or rewind operations of the DAT are stopped by the central controller 2-1 by inputting, for example, the speech "stop" to the speech recognizer 2-2.

Also, if the "No" button from amongst the buttons 2-4 (FIG. 7) or the stop button 2-53 of the jog shuttle 2-5 (FIG. 7) is operated, the speech recording/playback apparatus 2-13 will be controlled so that the playback, fast forward or rewind operations of the DAT will be stopped by the central controller 2-1.

The speech recording/playback apparatus 2-13 will also be controlled so that the playback, fast forward or rewind operations of the DAT will be stopped by the central controller 2-1 by typing in, for example, the character string "stop" via the keyboard 2-3.

The receiving of television or radio programs by the broadcast receiving apparatus 2-10 is carried out in the following way. First, the input from the central controller 2-1 is selected. If, for example, the speech "radio" or "television" is then inputted to the speech recognizer 2-2, the broadcast receiving apparatus 2-10 will be controlled by the central controller 2-1 so that radio or television programs may be received. (CORRECT BACK)

Also, if the radio button or television button from the buttons (2-4) which are not shown in the diagrams are operated, the broadcast receiving apparatus 2-10 will be controlled by the central controller 2-1 so that radio or television programs may be received.

Further, if, for example, the character string "radio" or "tv" is typed in via the keyboard 2-3, the broadcast receiving apparatus 2-10 is controlled by the central controller 2-1 so that radio or television programs may be received.

Sound is outputted from a speaker when a radio program is received by the broadcast receiving apparatus 2-10 and images are displayed on the display 2-7 with sound being outputted from a speaker when the broadcast receiving apparatus 2-10 is receiving television programs.

The channel can be selected when the broadcast receiving apparatus 2-10 is receiving radio or television programs by operating the shuttle ring 2-51 of the jog shuttle 2-5.

The receiving of a television or radio program by the broadcast receiving apparatus 2-10 is stopped in the same way as the case for the stopping of the playback, fast forward or rewind operations described beforehand.

As before, the terminal 2 can be operated by speech input, the buttons 2-4 or the jog shuttle 2-5, rather than just being operated by the keyboard 2-3. By outputting the information both in audio and visual form the equipment is made particularly easy to use for people with some form of disability.

Figure 13:
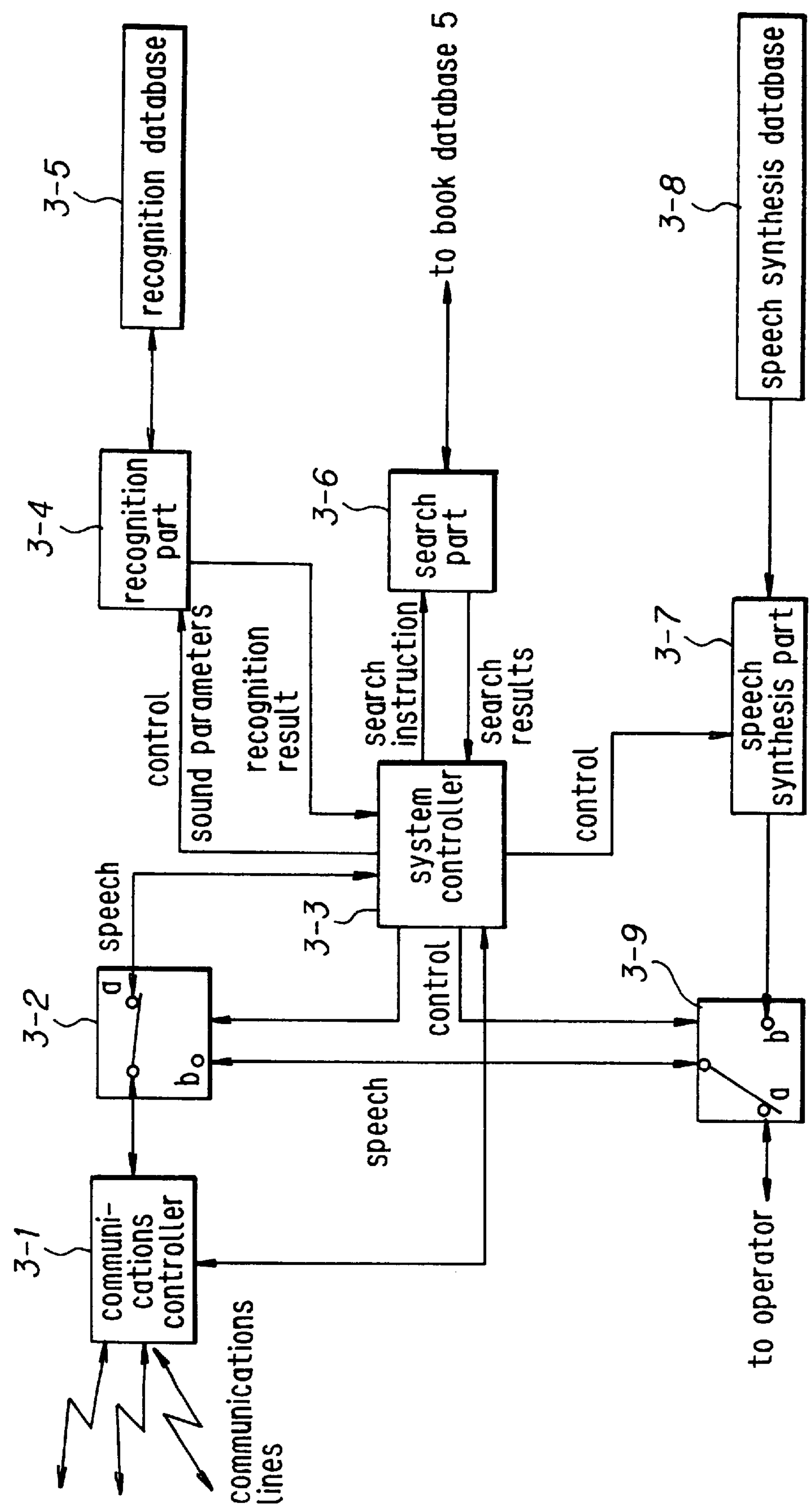
FIG. 13 is a view showing the detailed structure of a speech input type database search/send system 3 in FIG. 1.

FIG. 13 is a block diagram showing the detailed structure of the speech input type database search/send system 3 for the central system 1 in FIG. 1. A communications line (in this embodiment this is a telephone line, as described above) which is connected to the terminal 2 is connected to the communications controller 3-1. This communications controller 3-1 then controls the sending and receiving of information to and from the terminal 2 based on prescribed communications standards. A number of communication lines, i.e. a number of terminals can then be connected to the communications controller 3-1. In this case, the communications controller 3-1 will process a number of transactions in parallel using, for example, a time sharing method.

Rather than using the aforementioned time sharing method to process a number of transactions, a number of speech input type database search/send systems 3 could be set up, as shown in FIG. 13.

Further, the communications controller 3-1 can confirm the attributes of the terminal 2 (the hardware specifications (for example, whether the terminal 2 is equipped with a speech synthesis apparatus or whether the terminal is specifically for use by a disabled person etc.)) from the data received. If information (or a signal) is then transmitted to the terminal 2, this information may be changed to a form which is compatible with the attributes of the terminal before sending.

It would also be possible to have the conversion of the format to a format corresponding to the attributes of the terminal carried out at the terminal 2 rather than at the communications controller 3-1.

In the following, a description is given for simplicity where a single terminal 2 is connected to the communications controller 3-1.

First, the system controller receives the data and determines whether this data is speech or some other kind of data (for example, sound parameters for speech or other commands etc., non-speech data). This determination signal is then sent to the system controller 3-3.

The system controller 3-3 then receives the determination signal from the communications controller 3-1 and controls the changeover of the switch 3-2 based on this determination signal. i.e. if the determination signal indicates that the received data is speech data, the system controller 3-3 selects the switch 3-2 so as to be on the side of the terminal "b". Alternatively, if the determination data shows that the received data is data other than speech data, the system controller 3-3 selects the switch 3-2 so as to be on the side of the terminal "a".

As the communications line connected to the communications controller 3-1 is a telephone line, there may also be cases where speech is received as a result of an incorrect number having been dialed. In this case, a determination signal showing that the received data is speech is sent from the communications controller 3-1 to the system controller 3-3 so that the system controller 3-3 changes the switch 3-2 over to terminal "b". In this case, the system controller 3-3 will change the switch 3-9 over to the terminal "b" side so that the speech synthesizer 3-7 is connected to the communications controller 3-1 via the switches 39 and 3-2.

When the switch 3-9 is changed over to the "b" terminal side, the speech synthesizer 3-7 is controlled by the system controller 3-3. It then reads speech synthesis data already stored in the speech synthesis database 3-8 and, for example, generates synthesized sounds to the effect that a mistaken telephone number has been dialed based on this speech synthesis data.

These synthesized sounds are then sent to the telephone from which the call was dialed via the switches 3-9 and 3-2, and the communications controller 3-1 so that it is made known to the caller that an incorrect telephone number has been dialed.

If, however, the received data i.e. the non-speech data is from a terminal 2 which originally intended to make a connection with the central system 1, the switch 3-2 is changed over to the "a" terminal so that the non-speech data can be received by the system controller 3-3 via the communications controller 3-1 and the switch 3-2.

Here, even if a determination signal which indicates that the received data is non-speech data is received at the system controller 3-3 from the communications controller 3-1 the switch 32 is changed over to the side of the terminal "b" by a request from the terminal 2. In this case, the system controller 3-3 changes the switch 3-2 over to the side of terminal "b" and changes the switch 39 over to the side of terminal "a". In this way, a connection is made with terminal "a" so that communications can be carried out between the terminal which the operator is operating (not shown in the diagrams) and the terminal 2.

In this case, the user of terminal 2 can, for example, put questions directly to the operator by speaking. In this way, for example, a beginner with little experience in the operating methods of the terminal or a user who comes across unforeseen circumstances can cope adequately.

In addition to the above, in cases such as when communication cannot be achieved between the system controller 3-3 and the terminal 2 via the communications controller 3-1, or where unforeseen circumstances occur in the central system, the switches 3-2 and 3-9 are changed over to the terminals "b" and "a" respectively. In this way, the user of the terminal 2 and the operator can communicate by, for example, talking with each other.

When the system controller 3-3 receives non-speech data via the switch 3-2 when this switch 3-2 has the "a" terminal selected, a prescribed process is carried out in accordance with this non-speech data.

When this non-speech data is, for example, sound parameters on which it is intended to carry out speech recognition and a command indicating that this recognition is to be carried out, the system controller 3-3 sends these sound parameters to the recognizer 3-4 and controls this recognizer 3-4 so that the speech recognition is carried out. Also, when the non-speech data is command and other information pertaining to document data which it is intended to search, this document data is searched for in the search area 3-6. The search results are then sent to the terminal 2 via the switch 3-2 and the communications controller 3-1.

The present embodiment, as described above, is such that the sound parameters are sent from the central controller 2-1 (analyzer 2-23) of the terminal 2 to the central system 1. It follows that in this case, when the speech is compared with that which is transmitted over a communications circuit, signal deterioration is reduced and the volume of the communication which is carried out is reduced.

Also, in this case speech recognition was carried out using sound parameters and in this case the recognition can be seen to have improved when comparisons are made with recognition of items from speech transmitted via a communication line (in this embodiment the communications line is assumed to be a telephone line with the communications line being, for example, a PSTN line, with the speech being band limited to about 3.4 kHz in the case that the speech is transmitted via this PSTN).

The terminal 2 could also be constructed without, for example, the speech recognizer 2-2 (FIG. 5) so as to make the construction of the terminal 2 more compact. In this case, the speech may be sent from the terminal 2 so that the speech recognition could be carried out at the recognizer 3-4.

The recognizer 3-4 recognizes the speech using the sound parameters outputted from the system controller 3-3 while under the control of the system controller 3-3. i.e. the recognizer 3-4 performs vectoral quantization on the sound parameters from the system controller 3-3 using, for example, a codebook made beforehand. The recognizer 3-4 then connects phoneme unit models made based on, for example, a discrete HMM method which are stored in the recognition database 3-5 in accordance with words listed in the word dictionary stored in the same recognition database 3-5. This connection model is then used to calculate the output efficiency for vectorally quantized sound parameter strings and the recognition result is then outputted based on this probability.

This speech recognition algorithm is by no means limited to the use of the discrete HMM method so that methods such as, for example, continuous mixing HMM methods or neural networks may also be used.

The recognizer 3-4 is also not limited to using the kind of word recognition described above for the recognition of speech, so that speech recognition by dictation could also be carried out (to be described in detail later).

Further, the structure of this recognizer 3-4 is such that the scope of the recognition vocabulary is wide and the recognition precision is high when compared to that of the speech recognizer 2-2 set up at the terminal 2.

Next, this operation will be described with reference to the flowchart in FIG. 14. First, in step S3-1, a line connection is made between the terminal 2 (FIG. 1) and the central system 1. This is carried out in accordance with the usual connection procedures between remote terminal and a central system, with the user I.D. and code number being sent from the side of the terminal 2 and the recognition of this data being carried out at the central system 1.

When the line connection is made, in step S3-2, a menu of the services the central system 1 is capable of providing is sent to the terminal 2 and the process goes on to step S3-3. The user then selects the desired item from this service menu. i.e. the service menu is outputted at the terminal 2 via the display 2-7 or the speech synthesis apparatus in the way described above and the user then selects the desired item by operating the speech recognizer 2-2, keyboard 2-3, buttons 2-4 or the jog shuttle 2-5.

The outputting of the service menu (list) can be omitted depending on the prescribed information set up beforehand at the terminal 2 and the central system 1. For example, if the user is already aware of the contents of the services, the service menu may be omitted. Also, if the user only wishes to use a prescribed service of the services provided by the central system, the outputting of the service menu can be omitted together with the processes in steps S3-3 and S3-4 so that the prescribed service can be provided immediately after the process in step S3-1.

When a service menu selection is made in step 3-3, a selection signal (command) which displays the selected service menu is sent from the terminal 2 to the central system 1. Then, in step S3-4, it is determined at the central system 1 (system controller 3-3) whether or not the selection signal (command) indicates any of the service menus and the process then goes on to one of steps S3-5 to S3-8, depending on this detection result.

In step S3-5, a program relating to a newspaper service is initialized at the system controller 3-3 so that a newspaper service is provided. In step S3-6, a program relating to a magazine service is initialized at the system controller 3-3 so that a magazine related service may be provided. Also, in step S3-7, a program related to book searching is initialized by the system controller 3-3 so that a service related to book searching may be provided and in step S3-8, a program relating to a new book service is started so that a service relating to new books may be provided.

Figure 15:
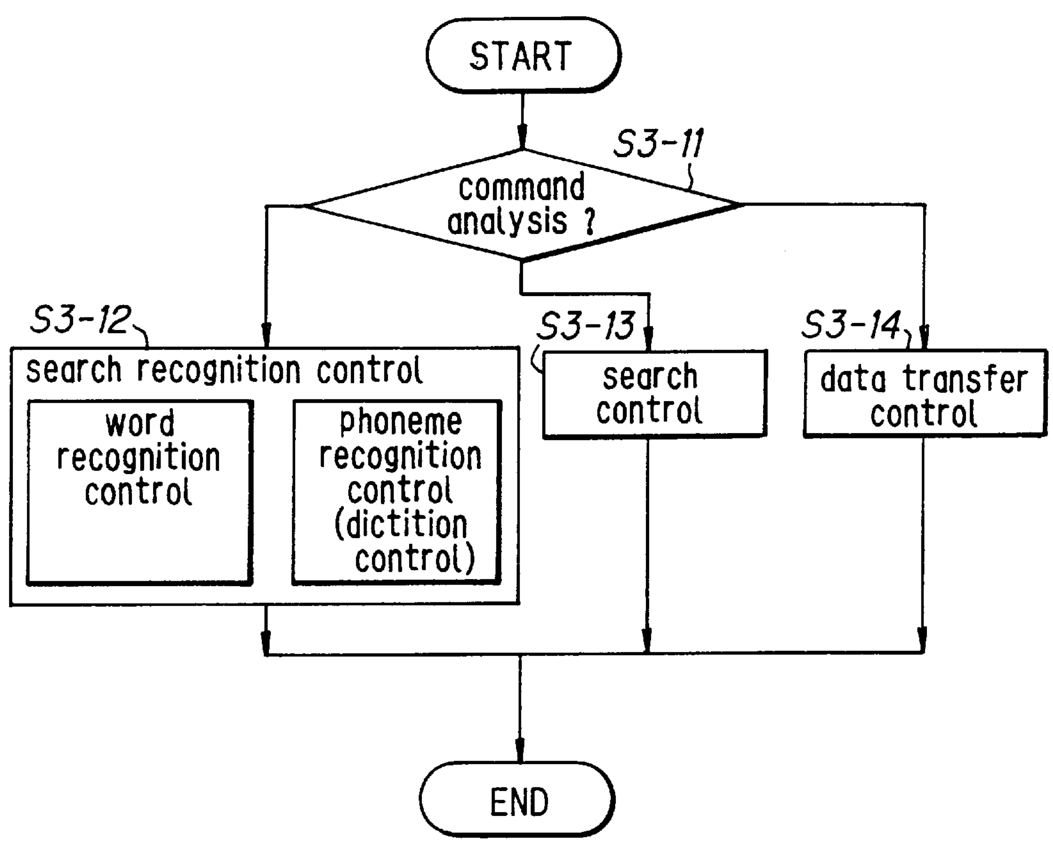
FIG. 15 is a flowchart for explaining controls of the system controller 3-3.

Once the programs for starting each of the services are initialized, a command from the terminal 2 is received by the system controller 3-3. The received command is then analyzed in step 3-11 as shown in the flowchart in FIG. 15 and the process goes on to one of the steps S3-12 to S3-14, depending on the results of this analysis.

In step S3-13, a control process for the word recognition or phoneme recognition occurring at the recognizer 3-4 is carried out by the system controller 3-3. In step S3-13, a control process is carried out by the system controller for a search for information from the book database 5 in the searcher 3-6. Also, in step S3-14, the system controller 3-3 carries out a transfer control process for the data requested by the terminal 2.

Figure 16:
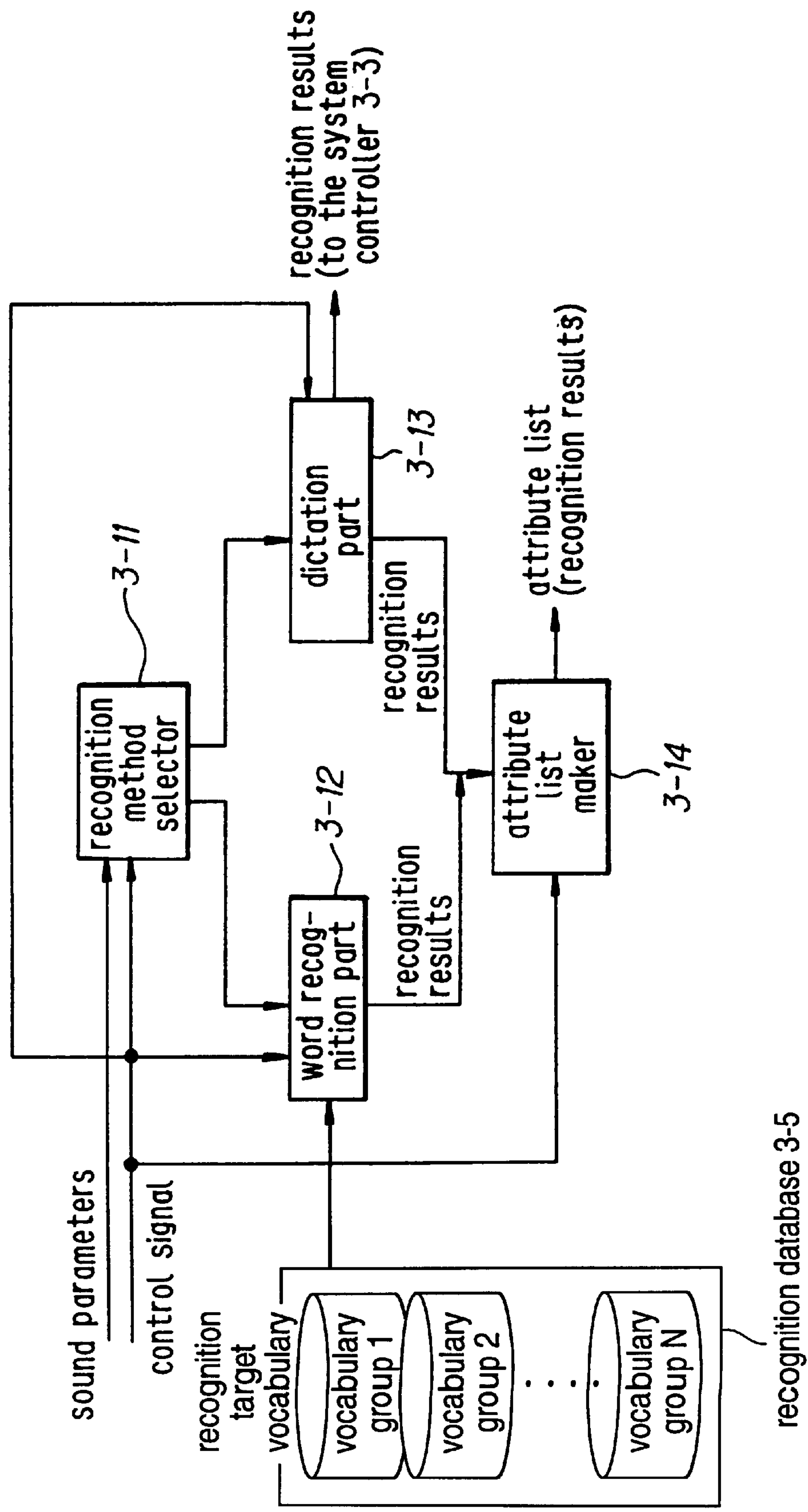
FIG. 16 is a view showing the detailed structure of the recognizer 3-4 in FIG. 13.

Next, a detailed description will be given of the recognizer 3-4 shown in FIG. 13. FIG. 16 is a block view showing the detailed structure of the recognizer 3-4 and the recognition database 3-5. In the recognition database 3-5, the models and word dictionaries are classified and stored depending on prescribed categories in the form of vocabulary groups 1, 2, . . . , N, giving N groups in all.

Here, "category" constitutes what is known as a word classification unit. This means that a word may mean a document attribute such as a document title, author, publisher, date of publication, classification, etc., or a word may mean a command for the system controller 3-3 etc. At the recognition database 3-5, the models and word dictionaries are stored split up into groups such as items displaying document attributes such as the document title, author, publisher, date of publication, classification or items displaying commands etc.

The recognizer 3-4 is made up of a recognition method selector 3-11, a word recognizer 3-12, a dictation part 3-13 and an attribute list maker 3-14. Sound parameters and control signals are provided to the recognition method selector 3-11 from the system controller. These control signals and sound parameters are then outputted to one of either the word recognizer 3-12 or the dictation part 3-13, in accordance with the control signals.

Figure 17:
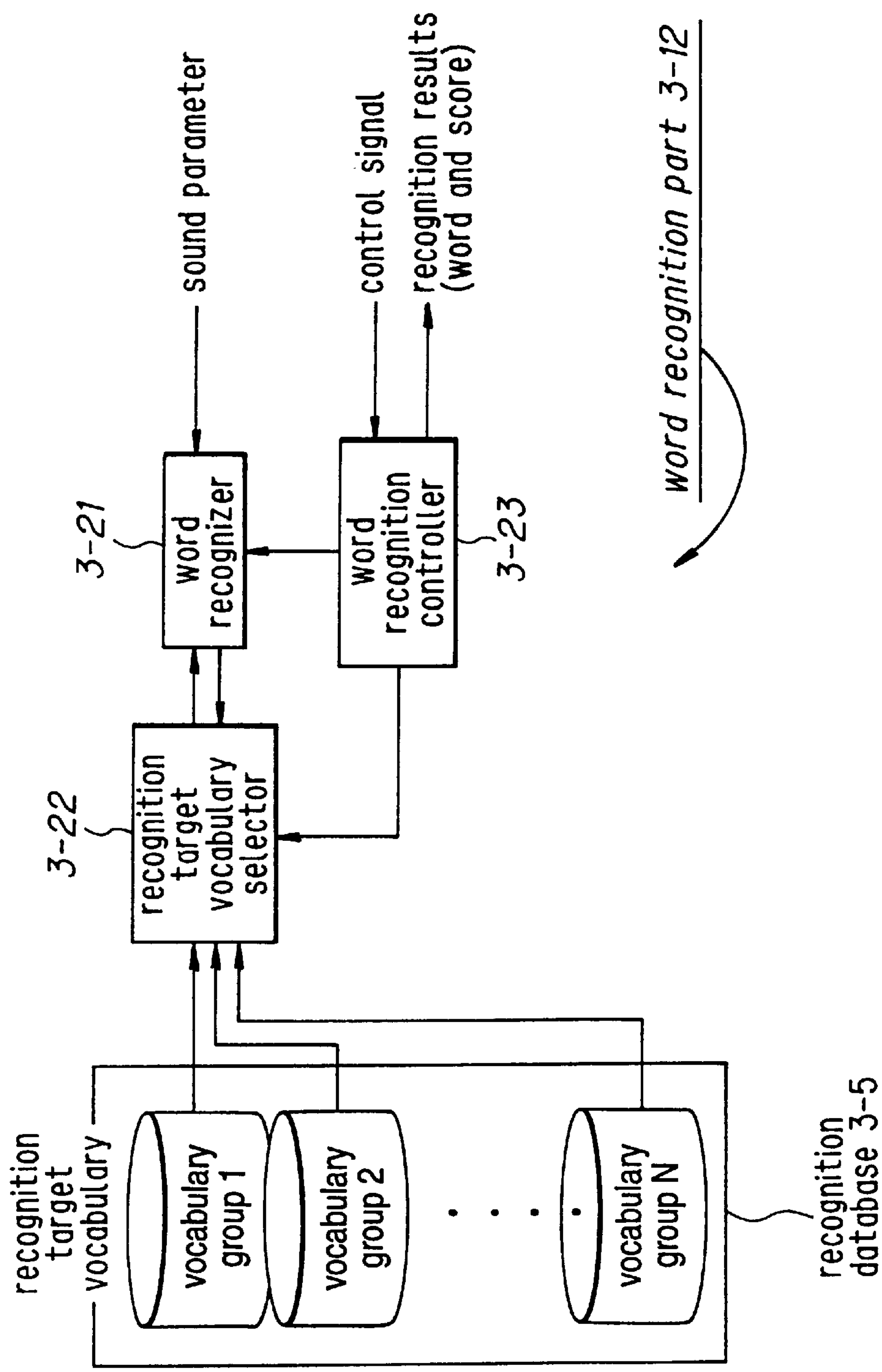
FIG. 17 is a view showing the detailed structure of the word recognizer 3-12 in FIG. 16.
Figure 18:
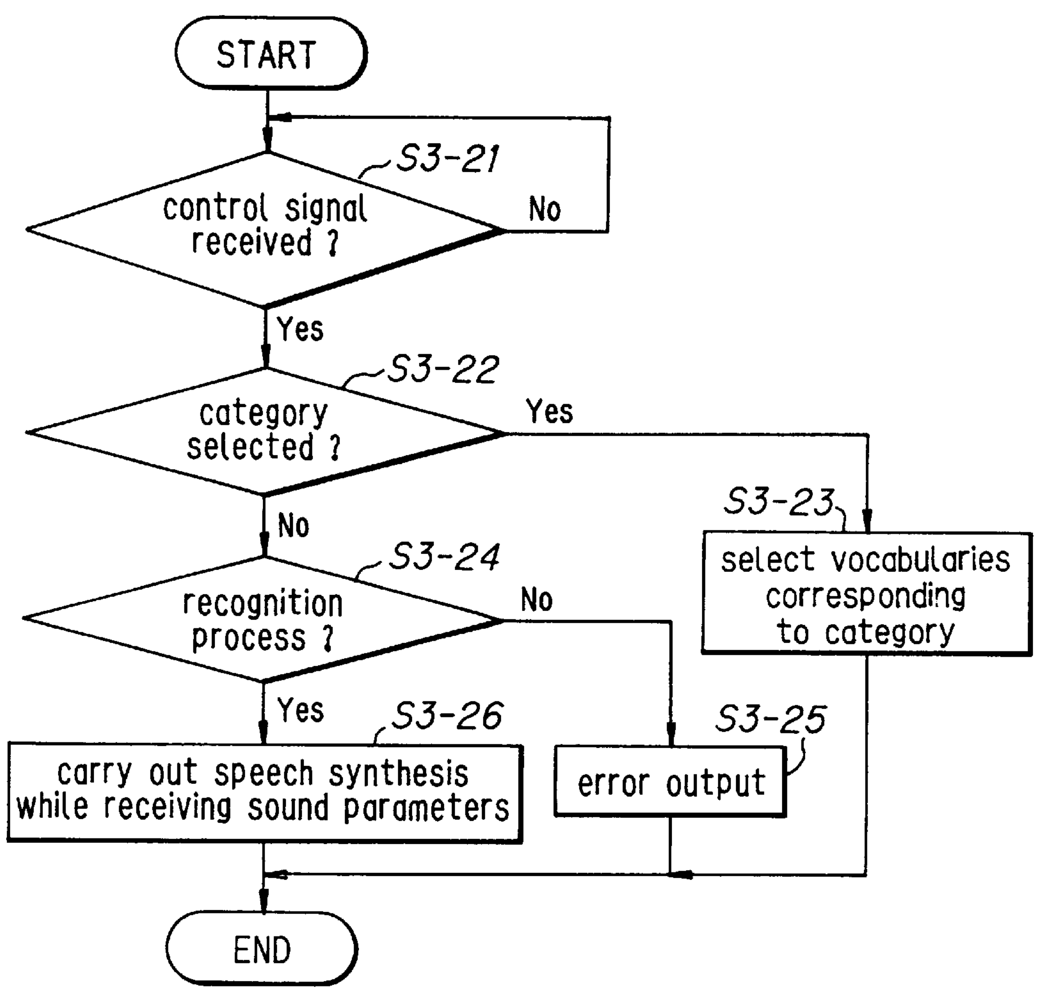
FIG. 18 is a flowchart describing the operation of the word recognizer 3-12 in FIG. 16.

The word recognizer 3-12 is made up of a word recognizer 3-21 which refers to the model and word dictionary read out by a recognition target vocabulary selector 3-22 from the recognition database 3-5 in the way shown in FIG. 17 and carries out speech recognition (word recognition), a recognition target vocabulary selector 3-22 which selects one of the vocabulary groups 1 to N on the recognition database 3-5 and reads out the model and word dictionary belonging to the selected group and a word recognition controller 3-23 which controls the word recognizer 3-21 and the recognition target vocabulary selector 3-22 based on the control signal from the recognition method selector 3-11 (FIG. 16). This structure operates in the way shown in FIG. 18.

At the word recognizer 3-12, it is first determined by the word recognition controller 3-23 whether or not a control signal has been received from the recognition method selector 3-11 (system controller 3-3). If a control signal has not been received in step S3-21 then this process is repeated.

If, however, it is determined in step S3-21 that a control signal has been received, the process goes on to step S3-22 and the word recognition controller 3-23 determines whether this control signal indicates that one of the vocabulary groups 1 to N of the recognition database 3-5 has been selected (hereafter referred to as category selection).

The outputting of a control signal from the system controller 3-3 that indicates the category is described in the following.

If it is determined in step S3-22 that the control signal indicates that a category has been selected the process goes on to step 3-23. The recognition target vocabulary selector 3-22 is then controlled by the word recognition controller 3-23 so that the model and word dictionary belonging to the category (one of the vocabulary groups 1 to N) indicated by the control signal can be read out by the recognition target vocabulary selector 3-22 and the process can be completed.

On the other hand, if it is determined in step S3-22 that the control signal does not indicate a category selection, the process goes on to step S3-24 and it is determined whether or not this process designates a recognition process for the word recognizer 3-21. If it is determined in step S3-24 that the control signal does not designate a recognition process for he word recognizer 3-21, the process goes on to step S3-25. An error signal to the effect that the control signal cannot be decoded is then taken as the recognition result and this is outputted from the word recognition controller 3-23 to the system controller 3-3 via an attribute list constructor 3-14 (FIG. 16).

Also, if it is determined in step S3-24 that the control signal does designate a recognition process for the word recognizer 3-21, the process goes on to step S3-26. The model and word dictionary read out from the recognition database 3-5 are then referred to by the word recognizer 3-21. Speech recognition processing is then carried out based on the discrete HMM method using the sound parameters provided by the recognition method selector (FIG. 16) (for example, sound parameter strings are observed so as to calculate probability from a model where phonetic units are arranged one after the other (word model) using a VITERBI algorithm).

The words and probabilities obtained from these results (hereafter referred to as score) is then outputted as a recognition result and the process is completed.

Figure 19:
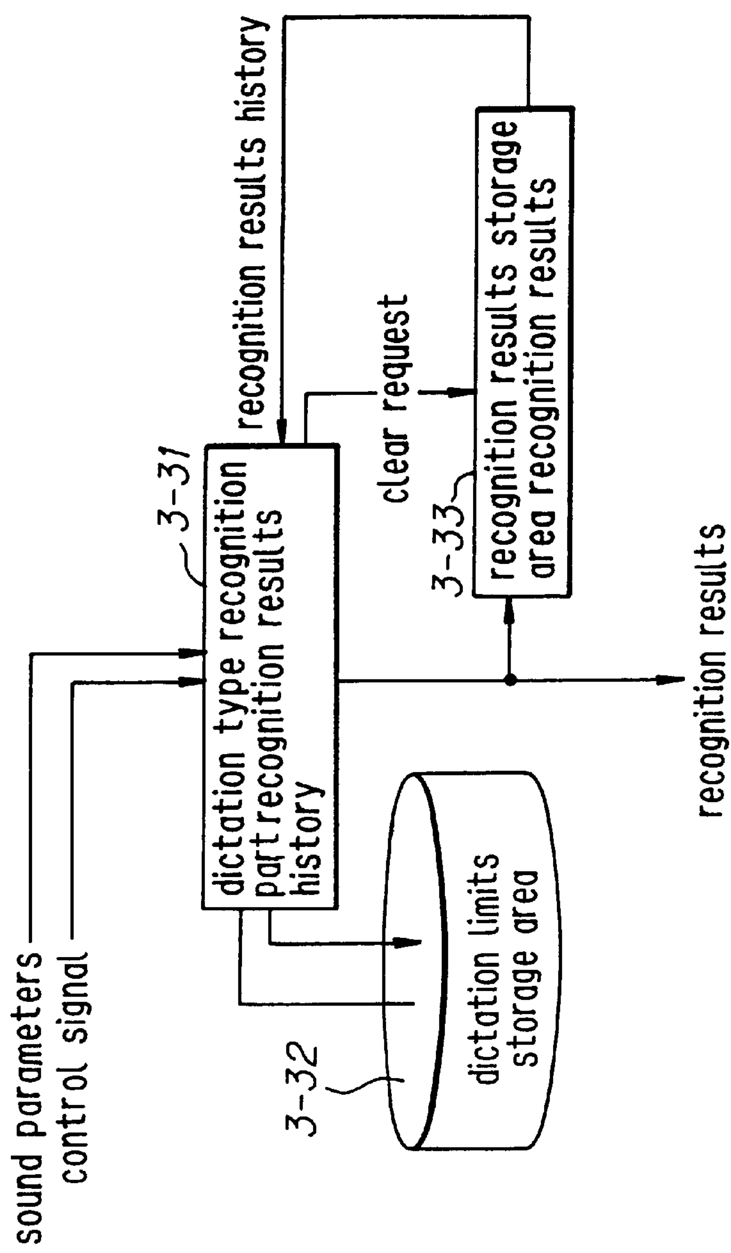
FIG. 19 is a view showing the detailed structure of the dictation part 3-13 in FIG. 16.

FIG. 19 shows the detailed structure of the dictation part 3-13 for recognizing the dictation type shown in FIG. 16. The dictation part 3-13 then uses sound parameters provided by the recognition method selector 3-11 to carry out speech recognition (dictation) by performing VITERBI beam searches on HMM phoneme models connected by bigrams or by getting a continuum using template matching. These results (dictation results) are then outputted.

The dictation type recognizer 3-31 carries out the speech recognition using the dictation limits, to be described later, stored in the dictation limits storage area 3-32 and the past dictation results stored in the recognition results storage area 3-33 as a basis (these are referred to as necessary).

The dictation limits storage area 3-32 stores the amendment limits (dictation limits) for the dictation results indicated by the user from the terminal 2, as described in he following.

The term "amendment limit" means, for example, means that when a given item of speech (sound parameter) is taken as input and a dictation result to the effect that the effect that the first character is "a" is outputted, this dictation result is sent to the terminal 2. If the user then indicates that this dictation result for the first character is mistaken, dictation of the speech to be inputted is carried out again and limits are set so that the first character is not taken to be "a".

If the dictation results are indicated to have been mistaken by the user at the terminal 2, the amendment limits (dictation limits) are indicated as a control signal from the system controller 3-3.

The contents of the amendment limits (dictation limits) storage area 3-33 are cleared directly before the dictation for the inputted speech is carried out at the recognition result storage area 3-31. After this, it is used to store the dictation results outputted from the dictation type recognizer 3-31. If a past dictation result is stored in the recognition results storage area 3-33, the dictation type recognizer 3-31 ensures that the result does not become the same as this past dictation result i.e. it ensures that the dictation is carried out so that the outputted result for the speech is not mistaken in the same way as before.

Next, the operation of the dictation part 3-13 and the operation of the system controller 3-3 when it is controlling this dictation part 3-13 will be described. As shown in step S3-31 of the flowchart in FIG. 20, at the system controller 3-3, a control signal is outputted to the dictation part 3-13 (FIG. 19) so that the contents (dictation limits) of the dictation limits storage area 3-32 are cleared. Then, in step S3-32, sound parameters are received from the terminal 2 and the process moves on to step S3-33. In step S3-33, the sound parameters from the terminal 2 and the control signal which indicates the speech recognition which is to be carried out using these sound parameters are outputted to the dictation part 3-13.

After this, when the dictation results (speech recognition results) come from come from the dictation part 3-13, the process moves on to step 3-34 and it is determined whether or not this dictation result is accurate. This determination is carried out in the following way. First, this dictation result is sent to the terminal 2, where it is outputted via the display 2-7 or the speech synthesizer 2-6. The user at the terminal 2 then indicates whether this dictation result is correct or not (this indication is made by operating the speech recognizer 2-2, keyboard 2-3, buttons 2-4 or the jog shuttle 2-5). In this way, a determination signal which lets it be known whether the dictation result is correct or not can be sent from the terminal 2. The system controller then determines whether the dictation result is correct or not based on this determination signal.

If it is determined in step S3-34 that the dictation results are correct, i.e. that they are not mistaken, the process goes on to step S3-36. A message is then sent from the terminal 2 to the effect of indicating that the same speech should be generated again, or indicating the mistaken portion or incorrect portion of the dictation results (inputting the dictation limits).

After this, if the user operates the speech recognizer 2-2, keyboard 2-3, buttons 2-4 or the jog shuttle 2-5, the speech and associated sound parameters for the dictation carried out this time or the dictation limits may be transmitted from the terminal 2.

In this case, in addition to sound parameters and dictation limits, items which amend the dictation results are also sent from the terminal 2. When these correct dictation results which have been amended are received at the system controller 3-3, the processes in steps S3-37 onwards are interrupted and the process is complete.

After the process in step S3-36 is completed, the process in step S3-37 is gone onto and it is determined whether or not the signal from the terminal 2 is a sound parameter. If it is determined in step S3-37 that the signal sent from the terminal 2 is a sound parameter, the process returns to step S3-33 and the sound parameter from the terminal 2 is outputted once again to the dictation part 3-13 together with the control signal which indicates the speech recognition to be carried out using the sound parameter. The process going on from the step S3-34 is then repeated.

Also, if the signal sent from the terminal 2 in step S3-37 is not a sound parameter, i.e. if it is determined that they are dictation limits, the process goes on to step S3-38, these dictation limits are outputted to the dictation part 3-13 as a control signal and step S3-33 is returned to.

On the other hand, if it is determined in step S3-34 that the dictation result is accurate, the process goes on to step S3-35. A control signal indicating that the dictation result has been outputted to the attribute list constructor 3-14 (FIG. 16) is then outputted to the dictation part 3-13 and the process is complete.

Figure 21:
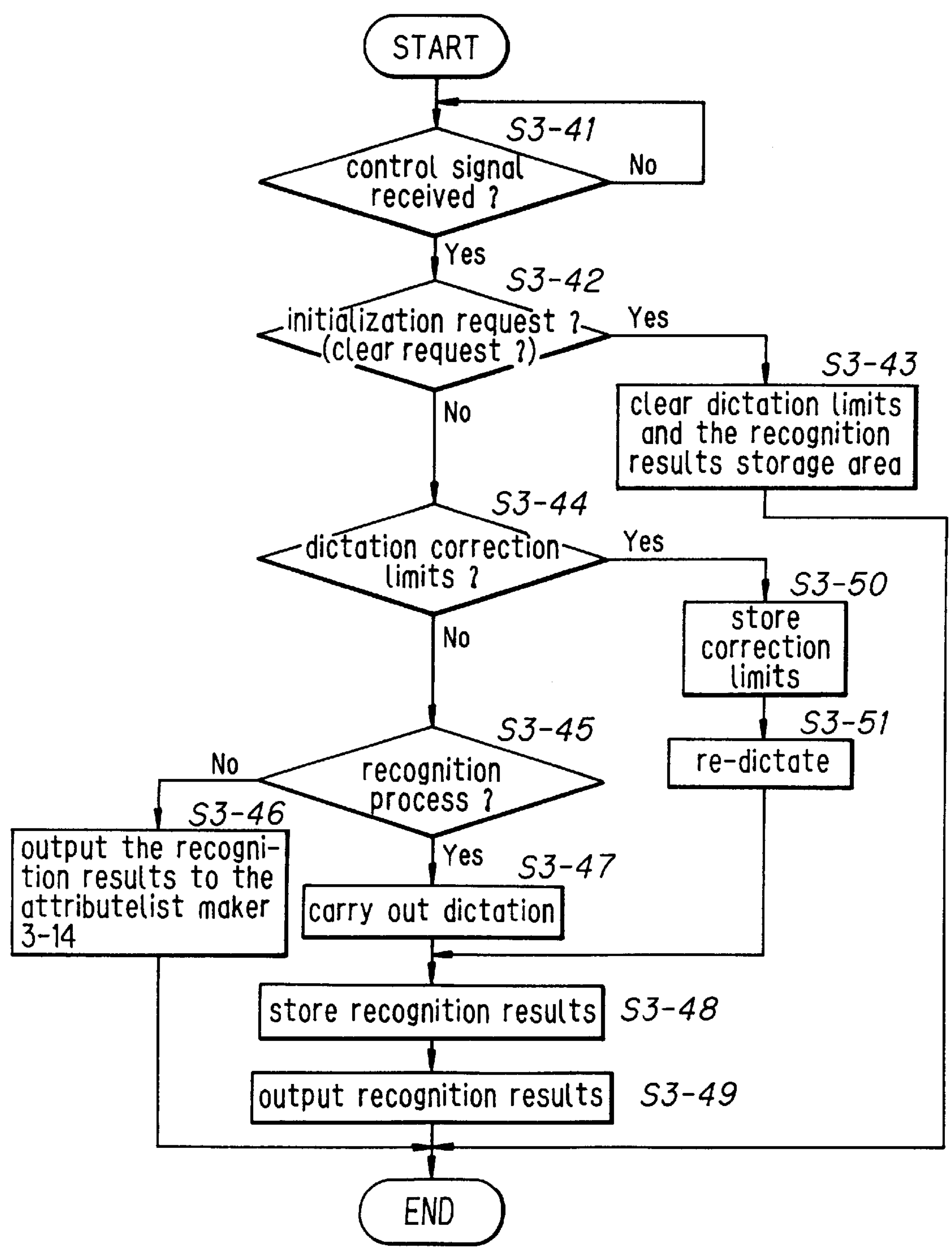
FIG. 21 is a flowchart for explaining the operation of the dictation part 3-13 in FIG. 16.

The operation of the dictation part 3-13 under the control of the kind of system controller 3-3 described above is shown in the flowchart in FIG. 21. In step S3-41, at the dictation part 3-13 (FIG. 19), it is first determined by the dictation type recognizer 3-31 whether or not a control signal has been sent from the system controller 3-3.

If it is determined in step S3-41 that a control signal has not been received, the process in step S3-41 is repeated until it is determined that a control signal has been received, at which point the process goes on to step S3-42. The dictation type recognizer 3-31 then determines whether or not this control signal indicates that the contents of the dictation limits storage area 3-32 are to be cleared (i.e. if an initialization request is displayed). If is determined in step S3-42 that the received control signal is an initialization request, the process goes on to step S3-43, the contents of the dictation limits storage area 3-32 are cleared and the process is completed. In step S3-4, if the contents of the dictation limits storage area 3-32 are cleared, then the contents of the recognition results storage area are also to be cleared at the same time.

On the other hand, if it is determined in step S3-42 that the control signal received does not indicate an initialization request, the process goes on to step S3-4 and it is determined whether or not this control signal represents dictation limits (dictation amendment limits). If it is determined in step S3-44 that the control signal indicates dictation limits, the process goes on to step 3-50 and these dictation limits are outputted from the dictation type recognizer 3-31 to the dictation limits storage area 3-32, where they are stored.

However, if the control signal does represent dictation limits, the dictation is carried out at least once for speech which is already present in the dictation type recognizer 3-31.

If a control signal which has dictation limits is received, these dictation limits are stored and the process goes on to step S3-51. The dictation limits stored in the dictation limits storage area 3-32 are then referred to by the dictation type recognizer 3-31 and dictation for the same speech is carried out again. The dictation results are then outputted by the dictation type recognizer 3-31 and step S3-48 is gone onto.

On the other hand, in step S3-44, if it is determined that the control signal does not represent dictation limits, step S3-45 is gone onto and it is determined whether or not this control signal represents a command which indicates the speech recognition. If it is determined in step S3-45 that this control signal does represent a command which indicates the speech recognition, step S3-47 is gone onto. Dictation is then carried out by the dictation type recognizer 3-31 using this control signal and the sound parameters provided by the system controller 3-3.

After this, the dictation result is outputted from the dictation type recognizer 3-31. Then, in step S3-48, the dictation result is stored in the recognition results storage area 3-33 and the process goes on to step S3-49. Here, the dictation result currently stored in the recognition results storage area 3-33 is outputted to the system controller 3-3 (FIG. 13) and this process is completed.

However, if it is determined in step S3-45 that the control signal does not represent a command which indicates the speech recognition, step S3-46 is gone onto. The newest dictation result stored in the recognition result storage area is then taken as the final dictation result (correct dictation result) and outputted to the attribute list constructor 3-46 so that this process is completed.

Returning to FIG. 16, the attribute list constructor 3-14 combines the recognition results outputted from the word recognizer 3-12 and/or the dictation part 3-13 with the control signal provided by the system controller 3-3 and this is outputted to the system controller 3-3 as the final speech recognition result.

In the following, a prescribed process will be carried out at the system controller 3-3 with reference to the speech recognition result outputted by the recognizer 3-4 as the attribute list.

The speech (sound parameters) which undergoes recognition at the recognizer 3-4 (the word recognizer 3-12 or the dictation part 3-13) is, in most cases, speech in the form of responses sent from the terminal 2 in response to interrogations (questions) from the system controller 3-3. The system controller 3-3 can therefore predict to which category the speech (words) undergoing recognition at the recognizer 3-4 belong.

The system controller 3-3 therefore takes the category (as above, the speech may be the title of a document, an author, or a command, etc.) of the speech which is the recognition target which is undergoing speech recognition at the recognizer 3-4 as a control signal and outputs it to the recognizer 3-4.

Words and their accompanying plausibility are outputted from the word recognizer 3-12 as speech recognition results. Words having a plausibility above a prescribed threshold value may then be searched for at the attribute list maker form within the speech recognition results. These search results (words and plausibility) may then be outputted together with the categories provided as control signals from the system controller 3-3 as an attribute list having, for example, the following format.

(category, (word, plausibility), (word, plausibility), . . . , (word, plausibility)).

The words would then, for example, be arranged on order of plausibility. Also, at the word recognizer 3-12, the plausibility may then be outputted within, for example, the range "0" to "1", with larger values representing a higher plausibility.

Further, as a single word (character string) is outputted from the dictation part 3-13 as the speech recognition result, this word (character string) and the category provided as a control signal from the system controller 3-3 may be outputted from the attribute list constructor 3-14 to the attribute list in, for example, the following format;

(category, (word, plausibility)).

In this case, the plausibility is taken to have its largest value 1.

Figure 22:
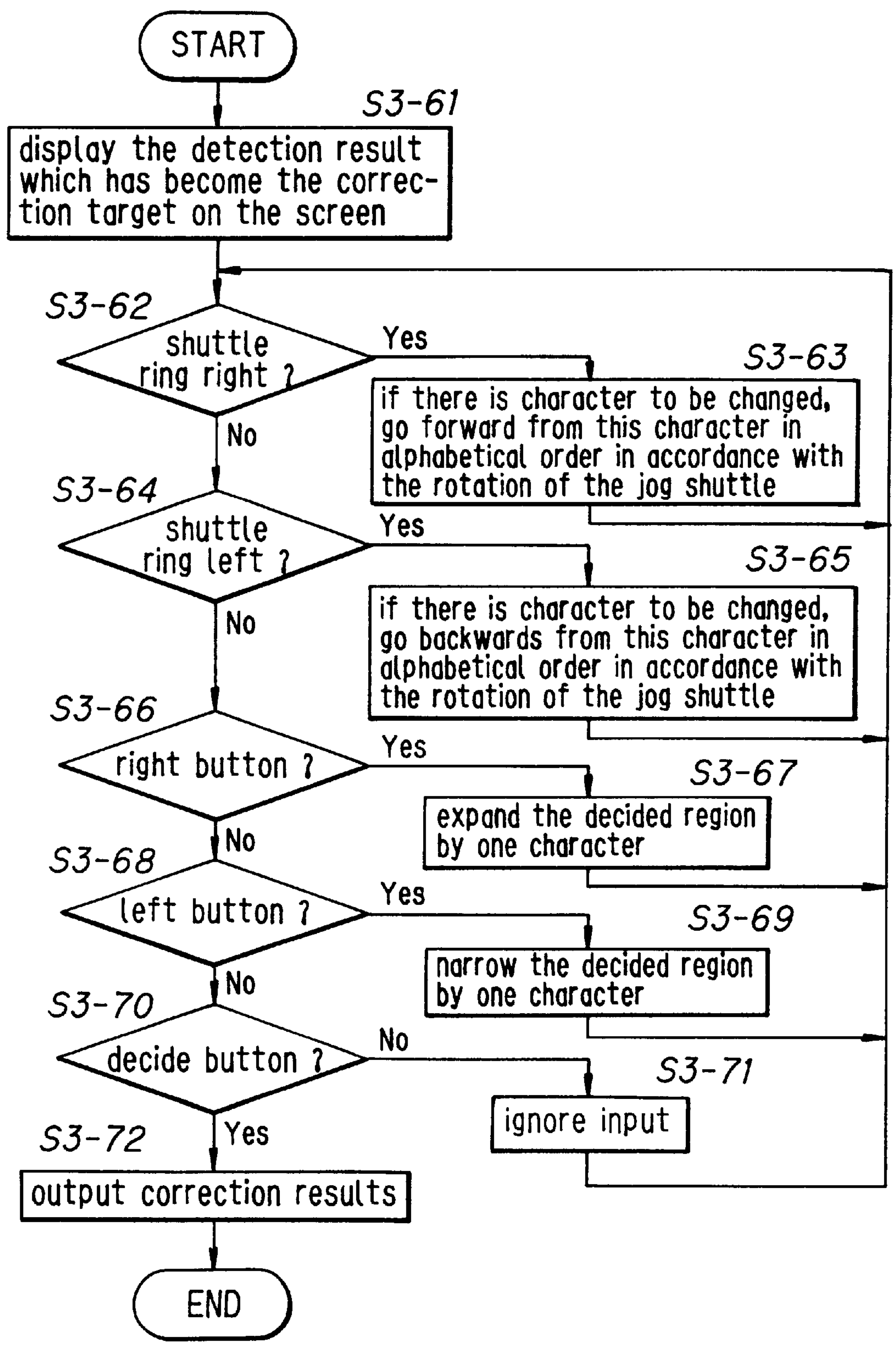
FIG. 22 is a flowchart for explaining operations in a case where correction of the dictation result of the dictation part 3-13 is performed in the terminal 2.

In step S3-36 described above in FIG. 20, for example, the operation of the terminal 2 (central controller 2-1) (FIG. 5), in the case where the operator at the terminal 2 operates the buttons 2-4 and/or the jog shuttle 2-5 in order to correct the dictation result after a message has been sent to the terminal 2 to the effect that the same speech is to be generated again or to the effect of indicating (inputting the dictation limits) the mistaken portions or correct portions of the dictation result, is described with reference to the flowchart in FIG. 22.

Figure 20:
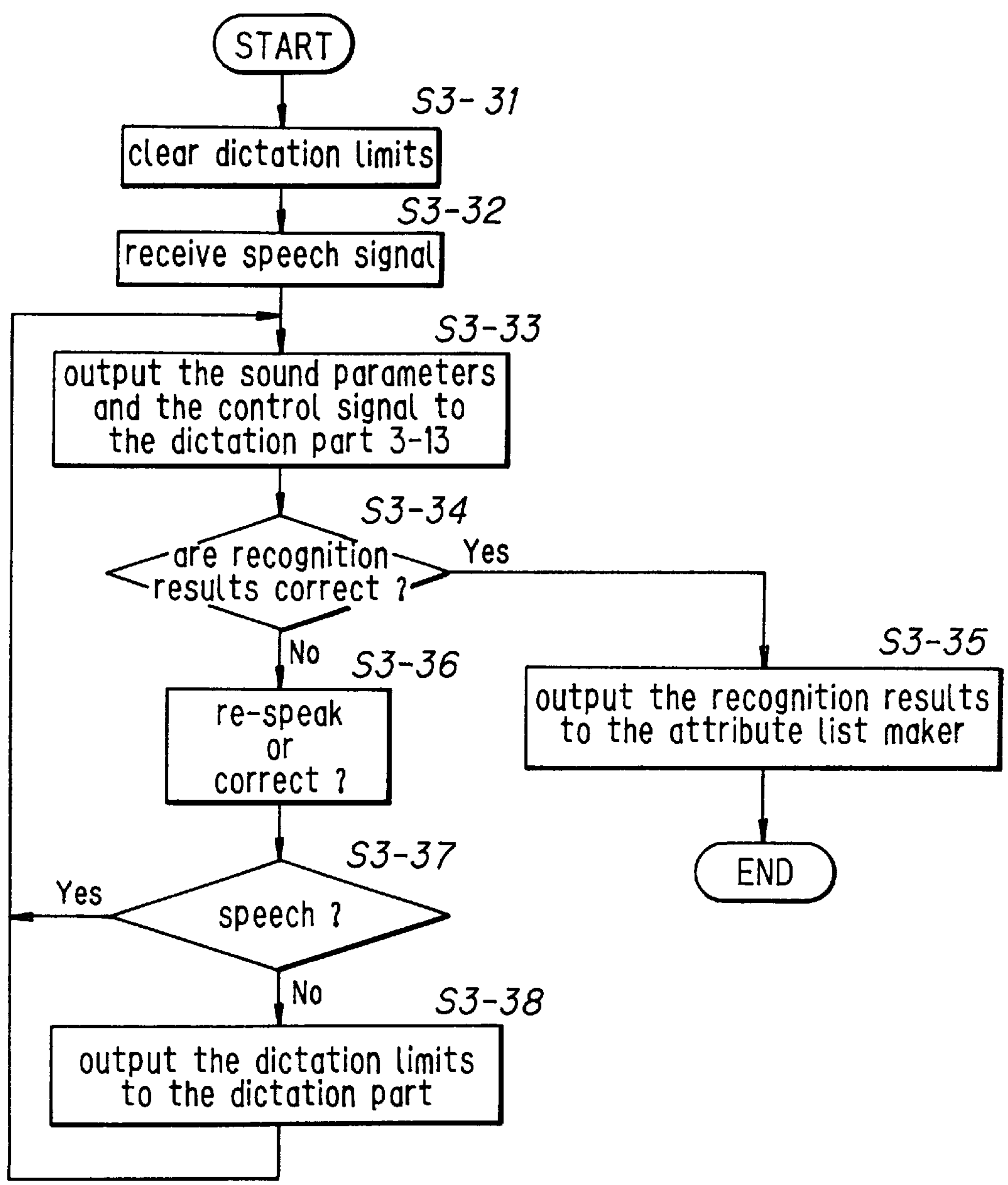
FIG. 20 is a flowchart for explaining the operation of the controller 3-3 in a case where dictation is performed in the dictation part 3-13 in FIG. 16.

Also, in the way described above, the dictation result is sent to the terminal 2 when it is determined whether or not the dictation result is correct in step S3-34 in FIG. 20. This dictation result is therefore displayed by the terminal 2 (central controller 2-1)(FIG. 5) in step S3-61 via the display 2-7, step S3-62 is gone onto and it is determined whether or not the shuttle ring 2-51 of the jog shuttle 25(FIG. 7) is being rotated to the right by the user.

If it is determined in step S3-62 that the shuttle ring 2-51 has been rotated to the right by the user, step S3-63 is gone onto. If there is a character to be changed, characters are displayed in alphabetical order at a speed corresponding to the angle of rotation of the shuttle ring 2-51, a correction is carried out and step S3-62 is returned to.

Figure 23A:
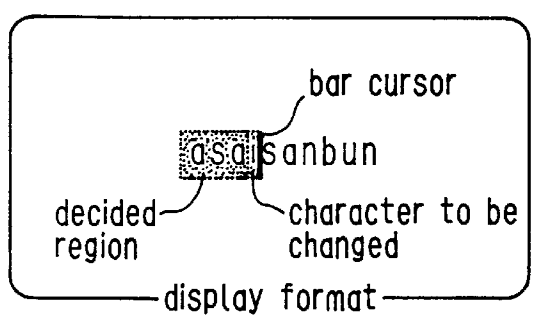
FIGS. 23A and 23B are diagrams for explaining operations in a case where correction of the dictation result of the dictation part 3-13 is performed in the terminal 2.
Figure 23B:
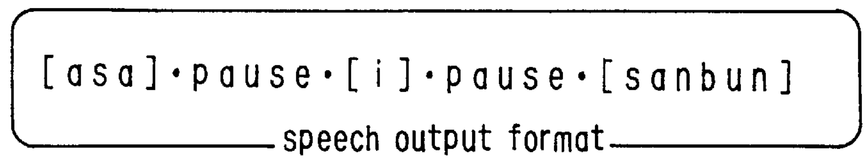

If a mistaken dictation result such as "asai shinbun" is received at the terminal 2 when the user the, for example, "asahi shinbun", this is shown on the display 2-7 in the way shown in FIG. 23(*a*).

The character to be changed, as shown in FIG. 23(*a*), would be the character directly after the decided region, i.e. the character directly before the bar cursor. The decided region is then the region of the region which defines the characters within the character string "asai shinbun" displayed on the display 2-7 as the recognition result which do not require modification. In this case this would be two characters from the start of the character string.

If the left button or the right button of the buttons 2-4 (FIG. 7) of the terminal 2 is operated, the bar cursor shifts one character to the left or right. In this way, the decided region can be increased or decreased by one character and the character to be changed can be changed to the character to the left or the character to the right. If the cursor is before the character at the front of the "asahi shinbun" character string taken as the dictation result, neither a character to be changed nor a decided region exists.

Further, if the Yes/Decide button 2-31 or the decide button 2-38 of the buttons 2-4 (FIG. 7) is operated, the display 2-7 is made to display the character string for the adapted dictation result (correct dictation result) and this is sent to the central system 1 (system controller 3-3).

If the shuttle ring 2-51 of the jog shuttle 2-5 (FIG. 7) is rotated to the right or left, characters are displayed for the character which is currently to be changed in alphabetical order or in reverse alphabetical order and this character is then corrected.

More specifically, when the character to be changed is the character "i" which is the fourth character from the front of the character string "asai shinbun" as shown, for example, in FIG. 23(*a*), if the shuttle ring 2-51 is rotated to the right or the left, the character "i" will be shown as "j"-"k"-"l"- . . . or "h"-"g"-"f"- . . . and this will then be corrected (changed).

Returning to FIG. 22, if it is determined in step S3-62 that the shuttle ring 2-51 is not being rotated to the right by the user, step S3-64 is gone onto and it is determined whether or not he shuttle ring is being rotated to the left by the user. If it is determined in step S3-64 that the shuttle ring 2-51 is being rotated to the left, step S3-65 is gone onto. If there is then a character to be changed, the character to be changed is shown in alphabetical or reverse alphabetical order and corrected, after which step S3-62 is returned to.

If it is then determined in step S3-64 that the shuttle ring 2-51 is not being rotated to the left by the user, step S3-66 is gone onto and it is determined whether or not the right button 2-34 of the buttons 2-4 (FIG. 7) has been operated by the user. If it is determined in step S3-66 that the right button 2-34 has been operated, step S3-67 is gone onto and the decided region (FIG. 23(*a*)) is made one character larger to the right. The bar cursor and the character to be changed are also shifted over by one character to the right and step S3-62 is returned to.

On the other hand, if it is determined in step S3-66 that the right button 2-34 has not been operated, step S3-68 is gone onto and it is determined whether the left button 2-33 of the buttons 2-4 (FIG. 7) has been operated by the user. If it is determined in step S3-38 that the left button 2-33 has been operated by the user, step S3-69 is gone onto and the decided region (FIG. 23(*a*)) is made one character narrower to the left. The cursor and the character to be changed are also then shifted one character to the left and step S3-62 is returned to.

Also, if it is determined in step S3-68 that the left button 2-33 has not been operated, step S3-70 is gone onto and it is determined whether or not the Yes/Decide button 2-31 or the decide button 2-38 of the buttons 2-4 (FIG. 7) has been operated by the user. If it is determined in step S3-70 that the Yes/decide button 2-31 or the decide button 2-38 has not been inputted, step S3-71 is gone onto, the input is ignored and step S3-62.

On the other hand, if it is determined in step S3-70 that the Yes/Decide button 2-31 or the decide button 2-38 has been operated, step S3-72 is gone onto and the character string currently being displayed by the display 2-7 is taken to be the adapted result for the dictation result (correct dictation result). This is then sent to the central system 1 (system controller 3-3) and the process is complete.

Adaption of the character string to be changed cannot just be carried out by operating the jog shuttle 2-5. It can also be carried out by the central controller 2-1 whilst inputting speech to the speech recognizer 2-2 (FIG. 5). However, when corrections are carried out on character strings to be changed using speech input, the number of characters which can be said again is limited to a few characters (for example, one or two characters) as there is the fear of these characters being mixed back in to the overall speech.

Further, as shown in FIG. 23(*a*), the dictation results and character string which is in the middle of being corrected may not just be shown on the display 2-7 but may also be outputted from the speech synthesizer 2-6 as synthesized sounds. In this case, as shown in FIG. 23(*b*) a pause, for example, may be inserted directly after the character to be changed comes from the speech recognition apparatus 2-6 so that people who have impaired vision may also be able to confirm the characters to be changed.

Next, the operation of the system controller in the case where a user who is accessing the central system 1 from the terminal 2 by inputting speech to the speech recognizer 2-2 in the terminal 2 (FIG. 5) so as to select the book service in step S3-7 in the flowchart in FIG. 14 in order that a book search may be carried out in the central system 1 is described with reference to the flowchart in FIG. 24 and FIG. 25.

Figure 14:
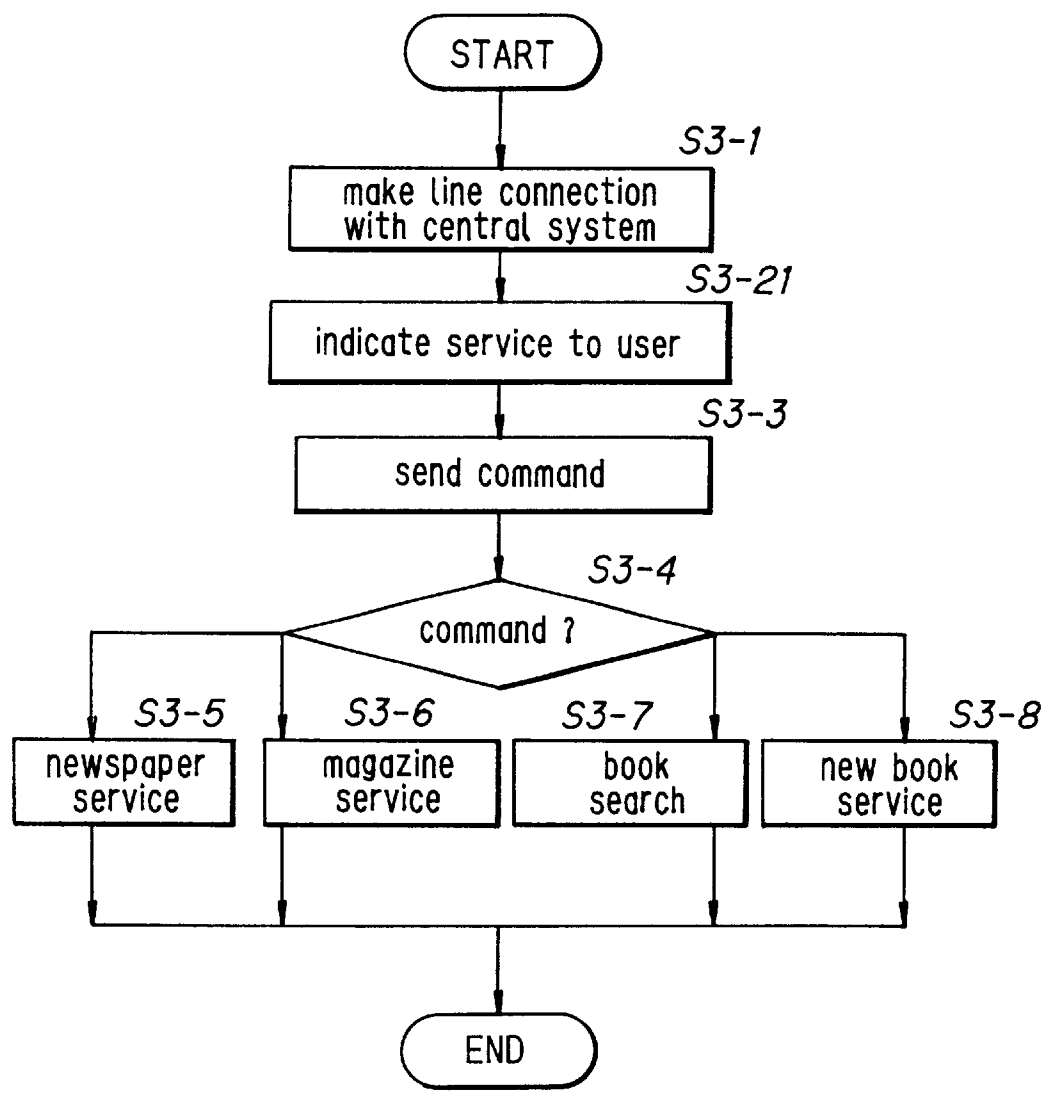
FIG. 14 is a flowchart for explaining the main controls of a system controller 3-3.

If, in this case, the user says, for example, "search" as the speech for selecting the book service in the step S3-3 in FIG. 14, this is analyzed at the speech recognizer 2-2 (analyzer 2-23 (FIG. 6)) and the speech parameters corresponding to the speech "search" are sent from the terminal 2 to the central system 1.

Then, in step S3-81, it is determined by the system controller 3-3 (FIG. 13) whether or not the sound parameters have been received from the terminal 2. Step S3-81 is then repeated if it is determined that the sound parameters have not been received. If it is determined in step S3-81 that the sound parameters have been received, step S3-82 is gone onto and the sound parameters from the terminal 2 are sent from the system controller 3-3 to the recognizer 3-4 along with the control signal for designating the speech recognition process to be carried out.

Whether the speech recognition is carried out by the speech recognizer 3-12 or the dictation part 3-13 which make up the recognizer 3-4 (FIG. 16) is basically decided by the state of the recognition method changeover switch 2-36 of the buttons 2-4 (FIG. 7) of the terminal 2. This recognition method changeover switch 2-36 may, for example, be equipped with a LED 2-35 so that this LED 2-35 is turned on or off depending on whether or not the recognition method changeover switch 2-36 is being operated.

For example, if the LED 2-35 for the recognition method changeover switch 2-36 is illuminated, a control signal indicating that speech recognition is to be carried out by the word recognizer 3-12 is sent from the terminal 2 to the central system 1 and if the LED 2-35 for the recognition method changeover switch 2-36 is not illuminated, a control signal indicating that speech recognition is to be carried out by the dictation part 3-13 is sent from the terminal 2 to the central system 1.

If the speech corresponding to the sound parameters sent from the terminal 2 corresponds to a command (i.e. belongs to a command category) the system controller 3-3 carries out the speech recognition process at the word recognizer 3-12 (the system controller estimates which category the speech (words) recognized at the recognizer 3-4 belongs to) regardless of the state of the recognition method changeover switch 2-36 (i.e. regardless of whether the LED 2-35 is illuminated or not).

Therefore, in step S3-82, control of the speech recognition using the sound parameters from the terminal 2 at the speech recognizer 3-12 of the recognizer 3-4 is carried out by the system controller 3-3 so to enable this speech recognition process to be carried out at the word recognizer 3-12.

Step S3-83 is then gone onto and it is determined whether or not speech recognition results (in this case, this is the aforementioned category list) from the recognizer 3-4 (word recognizer 3-12) have been received by the system controller 3-3. If no speech recognition results have been received, this step is repeated until recognition results have been received. If it is determined that speech recognition results have been received, step S3-84 is gone onto and it is determined by the system controller 3-3 whether or not this speech recognition result (in this case, this is the speech recognition results with, for example, the highest plausibility) is the word "search". If it is determined in step S3-85 that the speech recognition result is not the word "search", step S3-85 is gone onto, a process corresponding to this speech recognition result is carried out at the system controller 3-3 and the process is complete.

On the other hand, if it is determined in step S3-84 that the speech recognition result is the word "search", step S3-86 is gone onto and the following process relating to the book search service is carried out (the operation mode for the system controller 3-3 becomes the search mode).

This is to say that, in step S3-86, the attribute name for the document (category name) (as mentioned beforehand, this may be the title of the document, authors name, name of the publisher etc.) is to be outputted to the terminal 2 so that the keyword for carrying out the search can be obtained.

In this way, the attribute name of the document is outputted via the display 2-7 or the speech synthesizer 2-6 at the terminal 2. More specifically, the document attribute name is outputted in the form of, for example, "title", "author" or "publisher" etc. so that the user may then input keywords.

After this, the user then inputs the keywords by operating the speech recognizer 2-2, keyboard 2-3, buttons 2-4 or the jog shuttle 2-5 and these keywords are then sent from the terminal 2. If, in this case, speech is inputted to the speech recognizer 2-2 in the aforementioned way, this can be considered as these sound parameters being sent from the terminal 2.

When sound parameters corresponding to the keyword are received from the terminal 2 at the system controller 3-3, step S3-87 is gone onto, and it is determined whether there is a keyword which it is intended to request from the user of the terminal 2 present yet. If it is determined in step S3-87 that there is not yet a keyword which is to be requested from the user of the terminal 2, step S3-86 is returned to and the attribute name for the document for the category to which the keyword belongs which it is intended to request from the user of the terminal 2 is outputted.

If the attribute name (for example, the author etc.) for the document outputted via the display 2-7 or the speech synthesizer 2-6 is unclear to the user, the user may, for example, say the word "skip" so that the process may be completed without the unclear keyword being inputted.

Also, if it is determined in step S3-87 that there is no keyword to be requested from the user of the terminal 2, the process goes on to step S3-88. The sound parameters corresponding to the keywords sent from the terminal 2 are then outputted in sequence from the recognizer 3-4 and control is then exerted at this recognizer 3-4 so that speech recognition processes using these sound parameters are carried out in sequence. In this way, the speech recognition process is carried out at the recognizer 3-4 and the speech recognition results are outputted in the form of the aforementioned attribute list.

In this case, the speech to undergo speech recognition at the recognizer 3-4 does not correspond to a command. Speech recognition is therefore carried out at the word recognizer 3-12 or the dictation part 3-13 in accordance with the state of the recognition method changeover switch 2-36 amongst the buttons 2-4 (FIG. 7) at the terminal 2. In the following, a specific description is given of the speech recognition process at the word recognizer 3-12 which uses the recognition database 3-5 (FIG. 16 and FIG. 17) in which models and word dictionaries are stored according to category.

After the process in step S3-88, step S3-89 is gone onto and it is determined whether or not all of the speech recognition results (attribute list) for the keywords received from the terminal 2 have been received from the recognizer 3-4. If this is not the case, then step S3-89 is repeated until it is determined that all of the speech recognition results for the keywords received from the terminal 2 have been received from the recognizer 3-4. When this is the case, step S3-90 is gone onto and if a number of keywords have been received from the terminal 2, speech recognition results (attribute list) for each key word are outputted to the searcher 3-6 (FIG. 13).

If a speech recognition result was an aforementioned "skip", this is not counted in the number of speech recognition results and this speech recognition result is not outputted from the searcher 36.

In step S3-90, after the speech recognition results (attribute list) have been outputted from the searcher 3-6, control is exerted so that the number of keywords obtained are gathered together in a combination.

In this way, the number of keywords (speech recognition results) outputted from the system controller 3-3 (from the recognizer 3-4 via the system controller 3-3) are put into a combination.

Namely, when the speech recognition is carried out at the word recognizer 3-12 of the recognizer 3-4 (FIG. 16) words (recognition results) having a plausibility above a prescribed value are outputted in the aforementioned way. For example, if sound parameters corresponding to the document attributes "title" and "author" are transmitted from the terminal 2 as a number of keywords, so that with respect to the attribute "title", the speech recognition results "linear algebra and its applications" and "I am a cat" are obtained going from the side where plausibility is high, and with respect to the attribute "author", the speech recognition results "Ryunosuke Akutagawa" and "Doppo Kunikida" are obtained, going from the side for which the plausibility is high, the combination for the respective titles and authors with the recognition results with the highest plausibility "linear algebra and its applications" and "Ryunosuke Akutagawa" i.e. the document "linear algebra and its applications" by "Ryunosuke Akutagawa" is not possible.

Then, at the searcher 3-6, the speech recognition results from the system controller 3-3 are gathered together into the combination of ([I am a cat],[Ryunosuke Akutagawa]) from the combination of the speech recognition result "I am a cat" having the second highest plausibility with respect to the attribute "title" and the speech recognition result "Ryunosuke Akutagawa" having the highest plausibility with respect to the attribute "author" based on their plausibility and the book data relationship table (FIG. 27) stored in the database 5.

In this case, the values for the plausibilities of the speech recognition results [I am a cat] and [Ryunosuke Akutagawa] may, for example, be added together to give the plausibility for the combination.

Further, at the searcher 3-6, even if the speech recognition result is outside the aforementioned combination, if there is a given obtained combination, this is collected together and sent to the system controller 3-3.

Also, if the speech recognition is carried out at the dictation part 3-13 of the recognizer 3-4 (FIG. 16), speech recognition result which is finally correct can be obtained. In this case, confirmation can be carried out at the searcher 3-6 simply by determining whether or not there is a combination for the speech recognition results for the number of keywords from the system controller 3-3.

In the above way, when combinations of the speech recognition results are gathered at the searcher 3-6, these combined results are sent to the system controller 3-3 and step S3-91 is gone onto.

If a combination of the respective speech recognition results does not exist for the number of keywords, a message to this end is sent to the terminal 2 and the process is complete. Also, if only one keyword is received from the terminal 2, the process in step S3-90 is skipped and step S3-91 is gone onto.

In step S3-91, the combinations with the highest plausibility from within the combinations of speech recognition results (this includes speech recognition results where only one keyword is received from the terminal 2) are sent to the terminal 2.

In this way, the combination of speech recognition results from the central system 1 (system controller 3-3) are outputted at the terminal 2 via the display 2-7 or the speech synthesizer 2-6.

Figure 25:
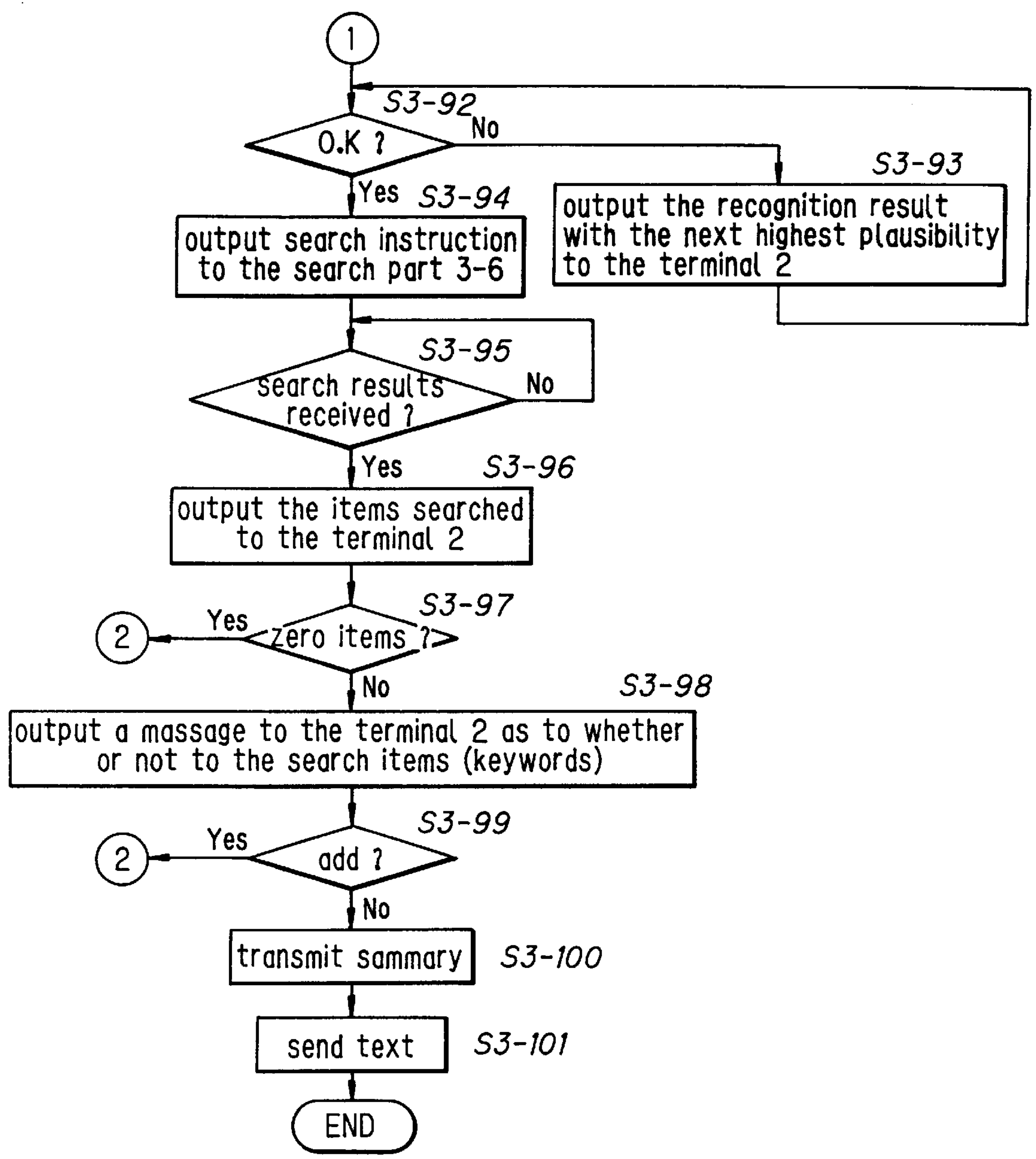
FIG. 25 is a flowchart continuing on from the flowchart of FIG. 24.

Then, in step S3-92 shown in FIG. 25, an interrogation (question) message is sent from the system controller 3-3 to determine whether or not the speech recognition result combination just received is correct is outputted from the system controller 3-3. This message is then outputted at the terminal 2 via the display 2-7 or the speech synthesizer 2-6.

In step S3-92, it is then determined whether or not the combination for the speech recognition results received is correct. This determination is carried out in the following way.

If the speech recognition result combination outputted via the display 2-7 or the speech synthesizer 2-6 is correct, the user operates, for example, the Yes/Decide button 2-31 of the buttons 2-4 (FIG. 7) of the terminal 2. If, however, the speech recognition result combination is not correct, the No button 2-32, for example, of the buttons 2-4 (FIG. 7) of the terminal 2 is operated. Operation signals corresponding to these operations are then sent by the terminal 2 and the system controller 3-3 then determines whether or not this speech recognition results combination is correct based on this operation signal.

If it is determined in step S3-92 that the speech recognition results combination is not correct i.e. if the user operates the No button 2-32 (FIG. 7) on the terminal 2 side, step S3-93 is gone onto. The combination with the next highest plausibility of that which was sent from the terminal 2 the previous time is then sent from the terminal 2 and step S3-92 is returned to. In this way, the item with the next highest plausibility from the speech recognition result currently being outputted at the terminal 2 is outputted via the display 2-7 or the speech synthesizer 2-6.

If it is determined in step S3-92 that the speech recognition result combination is not correct, then rather than carrying out the process in step S3-93, for example, the recognition method changeover switch 2-36 of the buttons 2-4 (FIG. 7) of the terminal 2 may be operated. dictation speech recognition is then carried out at the dictation part 3-13 of the recognizer 3-4 (FIG. 16) of the central system 1. Mistaken speech recognition results are then corrected by the user, as explained in FIG. 22 and FIG. 23.

On the other hand, if it is determined in step S3-92 that the speech recognition result combination is correct, i.e. that the user has operated the Yes/Decide button 2-31 (FIG. 7) at the terminal 2, step S3-94 is gone onto. The correctly determined speech recognition result i.e. the keyword combination is then outputted to the searcher 3-6 (FIG. 13) together with a control signal which indicates to search for information for the document listed by this combination. Information for the document listed b the keyword combination sent from the system controller 3-3 is then searched for at the searcher 3-6 and this detection result is then outputted to the system controller 3-3.

At the system controller, after the keyword combination and the control signal have been outputted to the searcher 3-6 in step S3-94, step S3-95 is gone onto and it is determined whether or not the search result has been received from the searcher 3-6. If it is determined that the search result has not been received from the searcher 3-6, step S3-95 is repeated. If, however, it is determined in step S3-95 that the search result has been received from the searcher 3-6, step S3-96 is gone onto and the number of documents which have been searched is sent to the terminal 2.

The number of items searched is then outputted at the terminal 2 via the display 2-7 or the speech synthesizer 2-6 so that the user can be made aware as to how many documents have been searched. If the No button 2-32 of the buttons 2-4 of the terminal 2 is operated at this time, the subsequent process is halted and the search mode is exited from.

At the system controller 3-3, after the number of searches has been outputted to the terminal 2, step S3-97 is gone onto and it is determined whether or not the number of documents is zero. If it is determined at this stage that the number of items searched is zero, step S3-86 in FIG. 24 is returned to so that the central system one can assume the conditions for carrying out a search using a new keyword.

If it is determined is step S3-97 that the number of searched items is not zero, i.e. if the number of searched items is one or more, step S3-98 is gone onto, a new keyword is added and a message which interrogates (asks a question) as to whether or not the searched document has been pinpointed (for example, "pinpointed?") is outputted to the terminal 2. Step S3-99 is then gone onto and it is determined whether or not the pinpointing of the document has been carried out. This is carried out in the following way.

In the way mentioned above, a message interrogating as to whether or not is sent to the terminal 2 in step S2-98 and this message is outputted at the terminal 2 via the display 2-7 or the speech synthesizer 2-6. The user of the terminal 2 then operates the speech recognizer 2-2, keyboard 2-3, buttons 2-4 or the jog shuttle 2-5 in accordance with whether or not the pinpointing has been carried out.

More specifically, if pinpointing has been carried out, for example, the speech "Yes" will be inputted to the speech recognizer 2-2 or the Yes/Decide button 2-31 of the buttons 2-4 (FIG. 7) will be operated. Also, if pinpointing has not been achieved, for example, the speech "No" will be inputted at the speech recognizer 2-2 or the No button 2-32 of the buttons 2-4 (FIG. 7) will be operated.

In this way, an operation signal indicating whether or not pinpointing should be carried out will be sent from the terminal 2 in accordance with the operation of the speech recognizer 2-2, keyboard 2-3, buttons 2-4 or the jog shuttle 2-5. It is then determined in step S3-99 whether or not pinpointing of the searched document is to be carried out at the system controller based on the operation signal.

Figure 24:
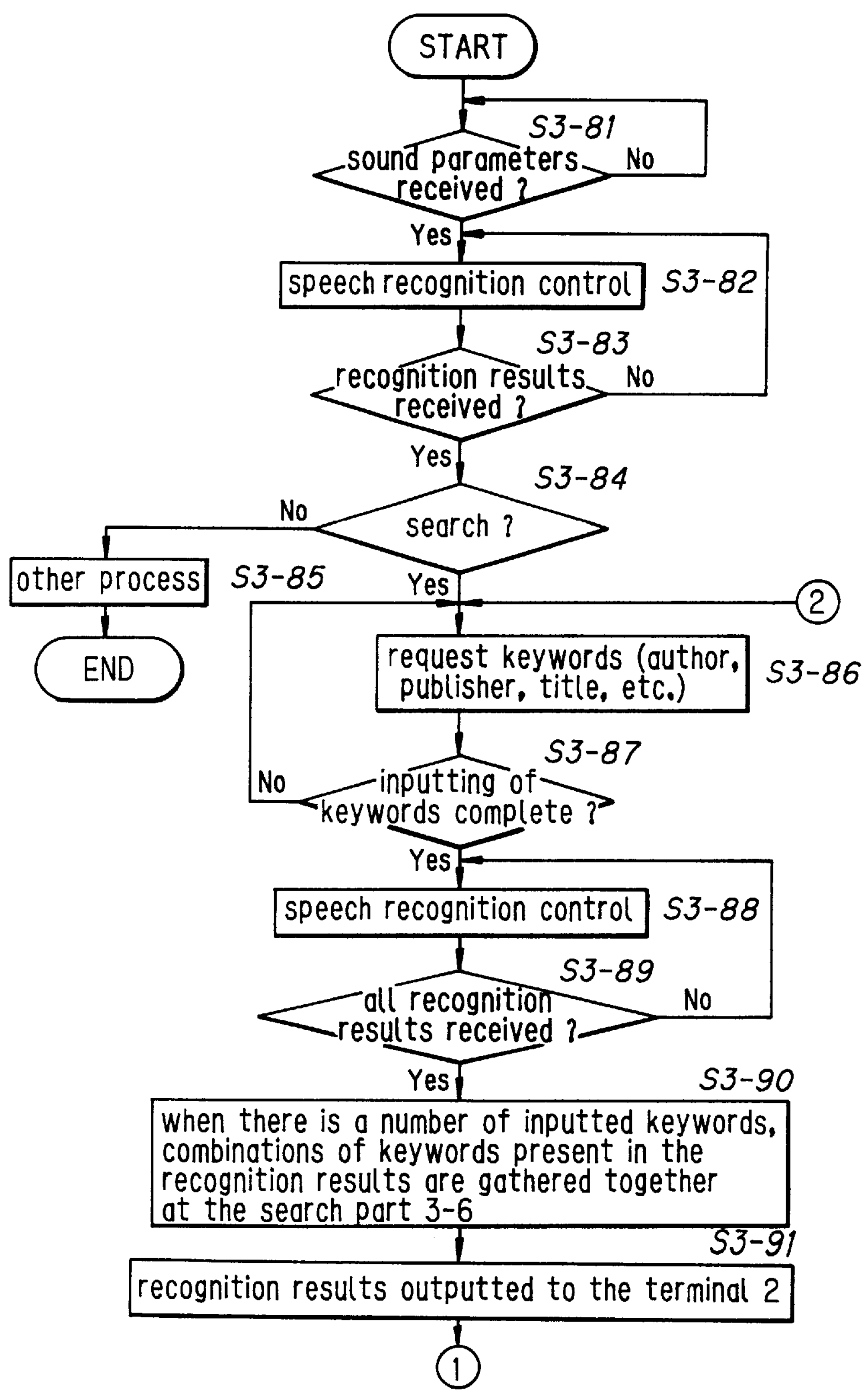
FIG. 24 is a flowchart for explaining operations of the system controller 3-3 in a case where a keyword is input by speech to perform a search of the library database 5-5.

If it is determined in step S3-99 that pinpointing has been carried out, step S3-86 in FIG. 24 is returned to, a new keyword is added in the way described above and the process in step S3-86 is carried out again.

On the other hand, if it is determined in step S3-99 that pinpointing has not been carried out, step S3-100 is gone onto, information relating to a summary of the contents from within the information for the searched document is sent to the terminal 2 and step S3-101 is gone onto. In step S3-101, information relating to this text from the information for the searched document is sent to the terminal 2 and the process is complete.

Information sent to the terminal 2 in the above way is then, for example, recorded by the information recording/playback apparatus 2-12.

The process at the central system 1 will be interrupted even if a search is in progress if speech such as, for example, "end" is inputted to the speech recognizer 2-2. Also, if the line is cut etc. for whatever reason, the process is halted and a new access can be received from another terminal.

Further, in steps S3-86 and S3-87 in FIG. 24, if a keyword is inputted, this keyword may be omitted if it is understood, for example, that this keyword has already been inputted. For example, in the case of searching for a desired article in a newspaper which is basically published every day, the date of publication will always be input as the date for that particular day. In this case, the terminal 2 or the central system 1 will be set up beforehand so that the date of publication will be inputted as the date of that particular day so that the inputting of the date of publication as the keyword can be omitted.

In the above, keywords have been inputted from the terminal 2 (FIG. 5) via speech inputted as keywords but it is also possible to input the keywords by operating the keyboard 2-3 or the jog shuttle 2-5 (the case where the jog shuttle is operated will be described later).

Figure 26:
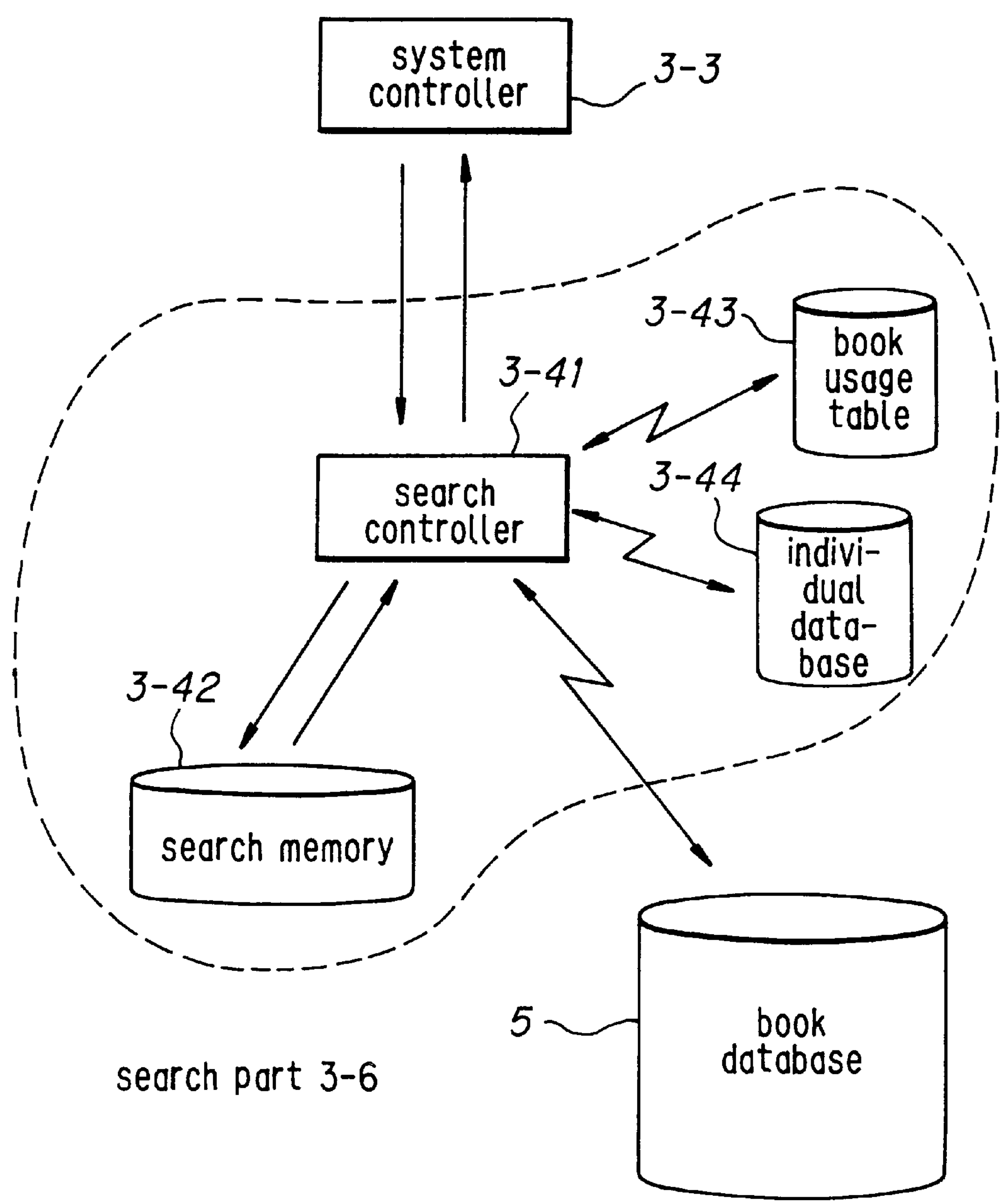
FIG. 26 is a view showing the detailed structure of the searcher 3-6 in FIG. 13.

The detailed structure of the searcher 3-6 in the speech input type database search/send system 3 shown in FIG. 13 is shown in FIG. 26. The searcher 3-6 consists of a search controller 3-41, a search memory 3-42, a book usage table 3-43 and an individual database 3-44. The search controller 3-41 which is controlled by the system controller 3-3 refers to the contents of the search memory 3-42, book usage table 3-43 or the individual database 3-44 as necessary, or writes information into these items while searching for document information stored on the book database 5.

Information such as, for example, information necessary in the searching of the database 5, search results from the book database 5 (intermediate search results) and search information for each user (for example, a user ID added to the intermediate search results so that the kind of user search results can be discerned) is stored in the search memory 3-42.

Information which classifies the documents depending on the number of times they have been searched (search frequency) and information about keywords (categories) (document attributes) classified depending on the number of times they have been used as (broad) keywords in a search The individual database 3-44 is used to store information relating to searches for each individual user such as individual user information (for example, information such as periodical subscriptions to a magazine) and the users past utilization conditions.

Next, the operation of how the searcher 3-6 chooses between information for the document stored on the book database 5 is described but the structure of the book database 5 will first be described first in preparation for this.

Figure 27:
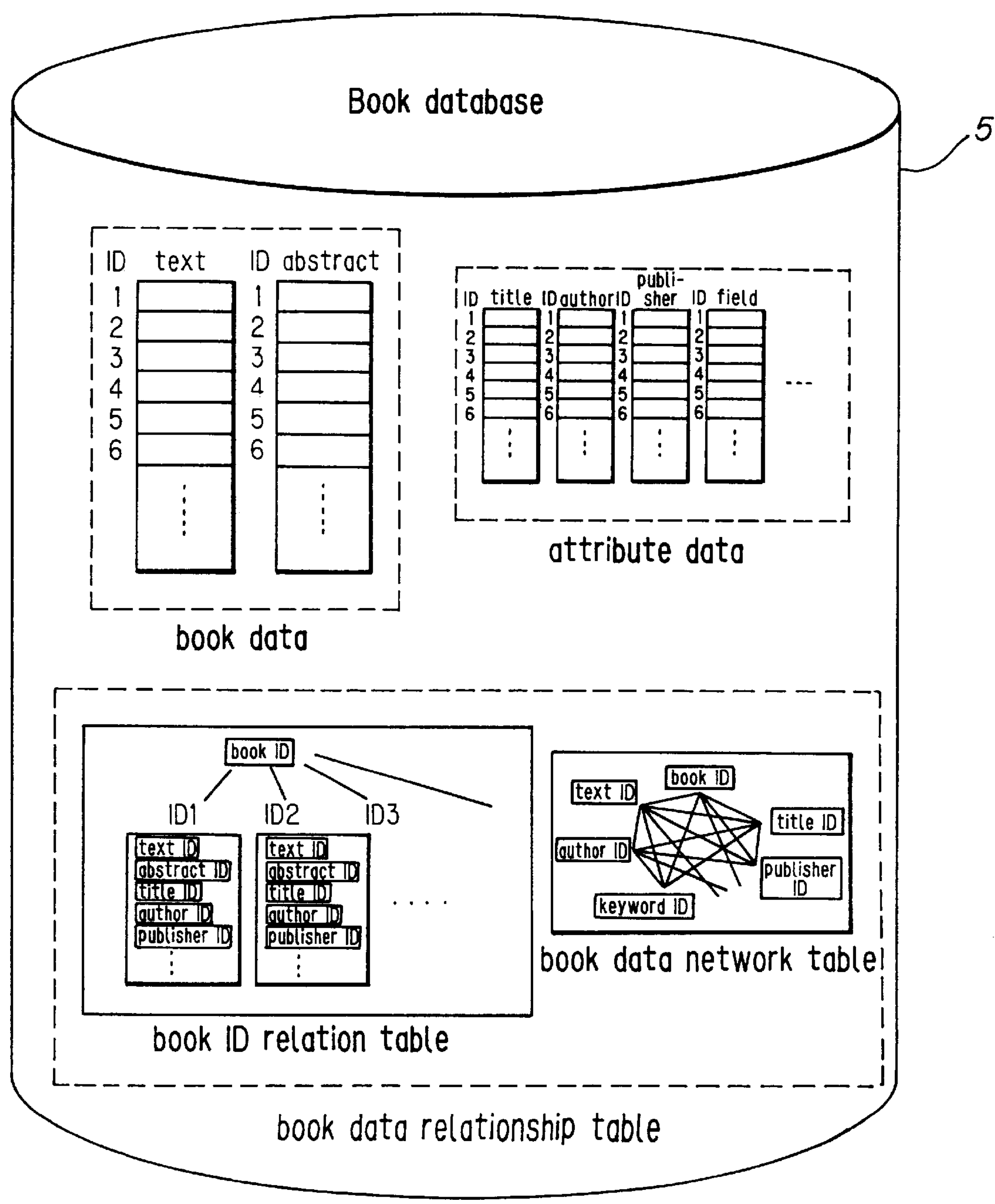
FIG. 27 is a view showing the detailed structure of the library database 5 in FIG. 1.

FIG. 27 is a view of the structure of the information for documents stored in the book database 5. As shown in the same diagram, the book database 5 can more or less be split up into book data, attribute data and a book data relationship table.

The book data consists of the document text data its associated summary (abstract) data. Unique numbers for the text ID and the abstract ID are added to each of the items of text data and abstract data for the documents. It is not necessary for, for example, the data text ID for the document text and the abstract ID for the data for the abstract of this document to be the same.

The attribute data is made up from data which expresses document attributes such as, for example, the document title, the authors name, the publisher, keywords ("keyword" used in this sense includes keywords (broad keywords) put in during searches and also therefore means narrow keywords which, for example, list specific words of documents etc.), fields(for example, literature, mathematics etc.), date of publication and the page number etc. The respective unique numbers taken as the attribute IDs (title ID, author ID, publisher ID, keyword ID, field ID, date of publication ID, page number ID etc.) are then added to these items. It is also not necessary for these attribute IDs to be the same for each publication (i.e. it is not necessary for the document title, author, publisher, keywords, field, date of publication and page number to be the same as their respective IDs).

The book data relationship table is made up from a book ID relationship table and a book data network table. The book ID relationship table stores the corresponding relationship between the text data, abstract data and attribute data such as the title and authors name etc., and their respective text IDs, abstract IDs and attribute IDs and adds a unique number representing a book ID to each book.

Here, the word "book" means the combination of the text data for each document, the abstract data and the attribute data. The book number is therefore a number for identifying the document.

The text ID, abstract ID and attribute ID for the document text data, abstract data and attribute data can be obtained from the document book ID by referring to the book ID relationship table. The text data for the document, abstract data and attribute data can then also be obtained.

The corresponding relationships between the book ID's, text ID's, abstract ID's and attribute ID's are stored in the book data network table. i.e. the connections between the book ID's, text ID's, abstract ID's and attributes are stored expressed as a network.

According to this book data network table, in the same way as for the book ID relationship table, in addition to being able to, for example, obtain the text ID's, abstract ID's and attribute ID's for the text data, abstract data and attribute data which makes up the book ID book structure, for example, the book ID for the documents (books) written by the author of a book, or the publisher ID of the publisher which published documents written by this author van be obtained. The book ID for a document (book) belonging to a field with a field ID or an author ID for an author belonging to a particular field of authorship can also be obtained.

Figure 28:
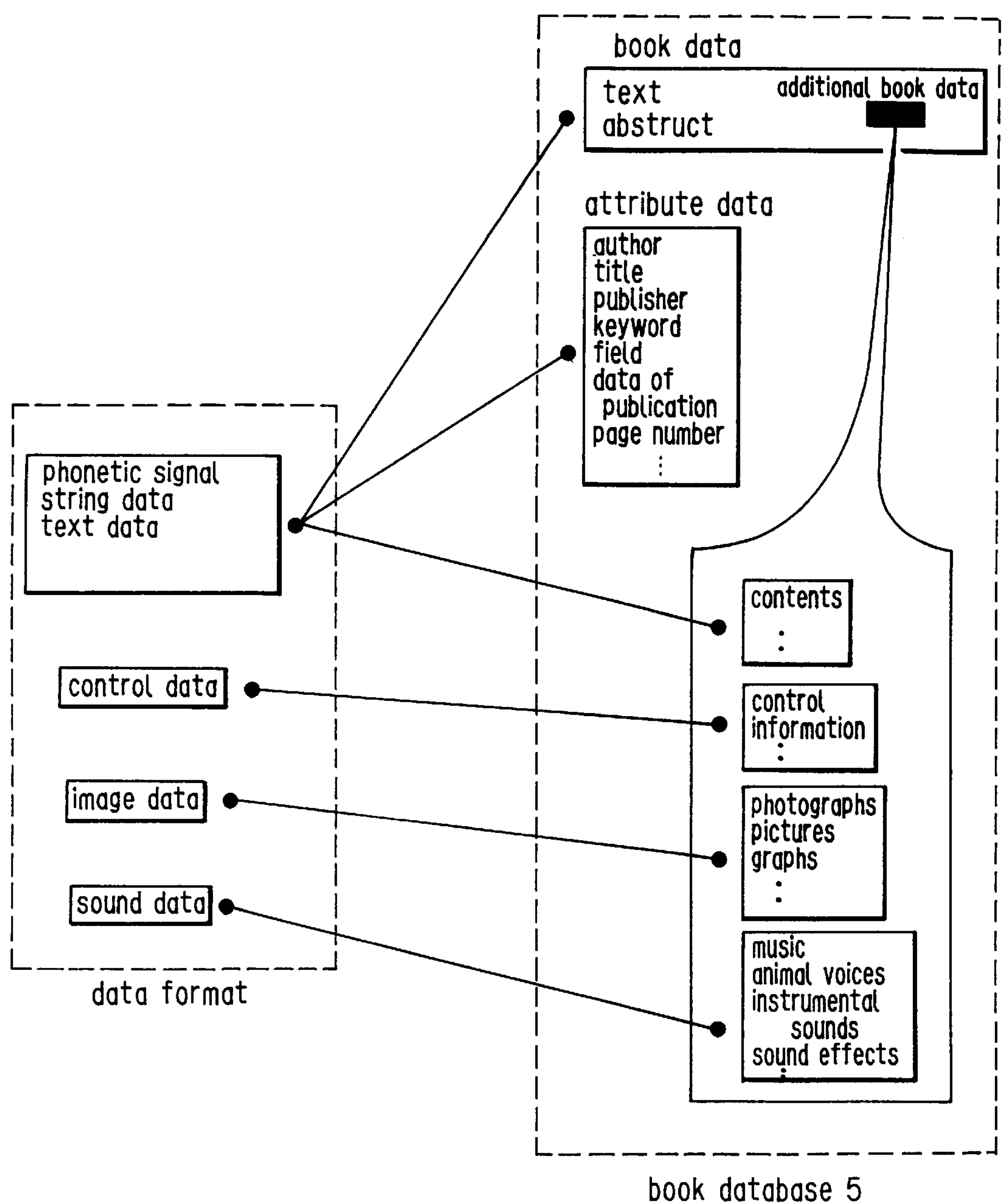
FIG. 28 is a view explaining the data format stored in the library database 5 in FIG. 27.

Next, the data formats for the book data and the attribute data are described with reference to FIG. 28. In this diagram, on the book data side, the text data, for example, is made up of the data for the writing recorded in the document (hereinafter referred to as the text writing data) and other necessary data taken as the additional book data.

The additional book data which goes to make up this text data consists of document contents information, control information necessary when the writing is outputted in the form of a display or as synthesized sounds, image information for photographs, diagrams or graphs which may be recorded in the text, or effects information for music on animal sounds, instrumental sounds or sound effects to make recital and displaying more effective while the writing is being recited or displayed at the terminal 2.

The control information necessary when the writing is displayed is, for example, how many characters each line is to be or information such as where a return is to be. The control information necessary when the writing is outputted as synthesized sounds would be information for controlling the intonation of the synthesized sounds or for controlling the speed of utterance.

In addition to including the text data, the additional book data also includes abstract data, in the way described above. i.e. the text data may be made up of only the text writing data, and the abstract data may be made up of writing data relating to the document abstract (hereafter referred to as abstract statement data) and additional book data. Part of this additional book data is also included in one part of the text data and the remainder is included in the abstract data.

The text writing data within the text data, the abstract statement data within the abstract data, the contents information within the additional book data and the attribute information (author, title, publisher, (narrow) keywords, field, date of publication (day, month and year of publication), page number, . . . ) are stored on the book database 5 using a data format which includes at least phonetic signal information from within the encoded data and compressed data formats which accompany the following: phonetic signal information, text data, kana characters, kana characters for use with Braille and speech signals Also, the control information from within the additional book data is stored on the book database 5 using the data format for the control data (for example, data made up of control codes). Image information such as photographs, diagrams and graphs etc. is stored on the book database 5 using image data formats or their associated compressed or encoded formats. Also, effects information such as music and animal sounds, instrumental sounds and sound effects etc. is stored on the database in a data format for sound data (for example, waveform data etc.) or an associated compressed or encoded data format.

Each of the items of data stored on the book database 5 using each of the data formats has a distinguishing number for distinguishing its own data format. In this way, it can be discerned which data format has been used for each item of data.

Figure 29:
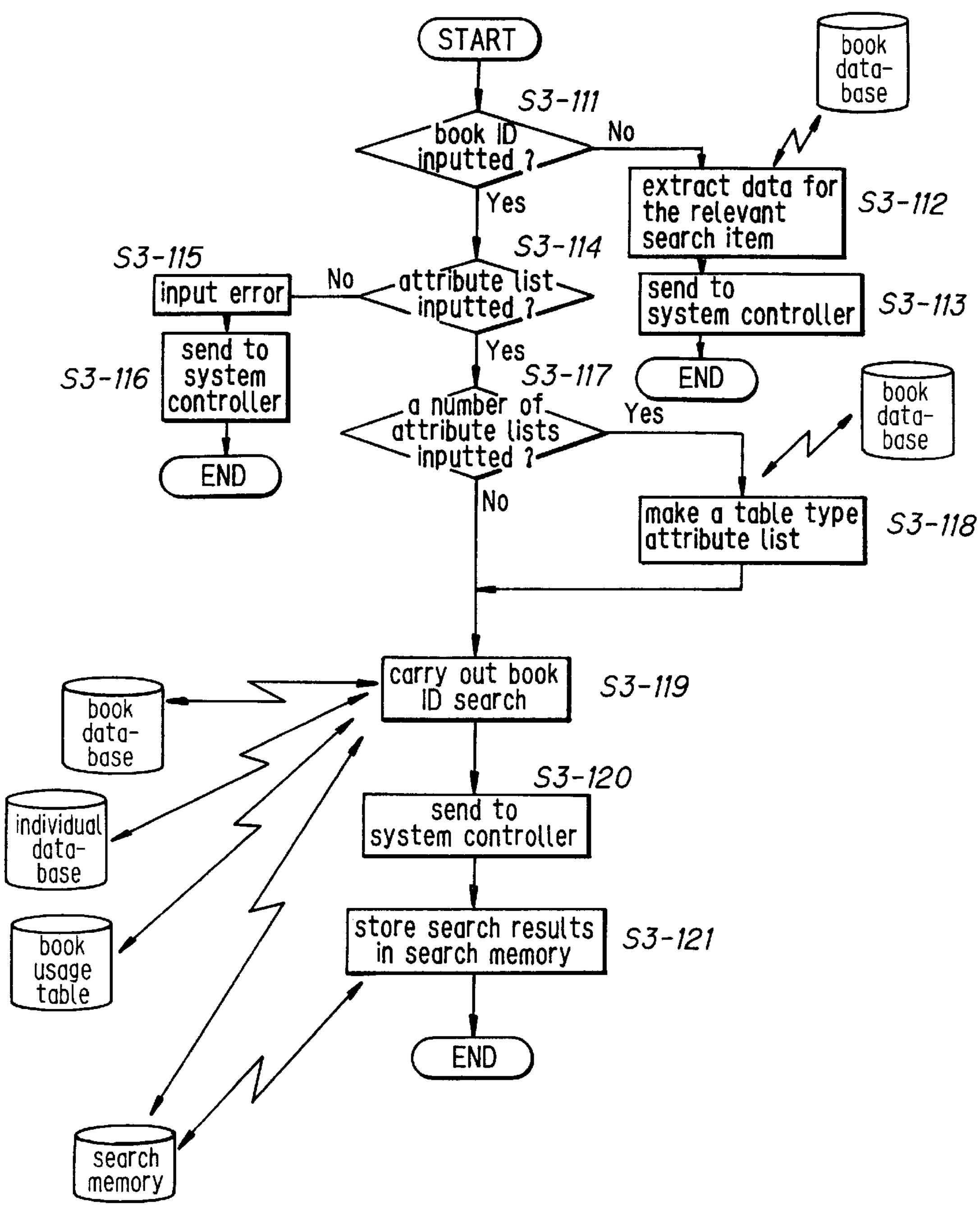
FIG. 29 is a flowchart explaining the operation of the search controller 4-41 in FIG. 26.

Next, the operation of the search controller 3-41 which makes up part of the searcher 3-6 is described with reference to the flowchart in FIG. 29. First, in step S3-111, it is determined whether or not a book ID has been inputted from the system controller 3-3.

If it is determined in step S3-41 that a book ID has been inputted, step S3-112 is gone onto and the book ID relationship table within the book data relationship table stored on the book database 5 is referred to. The book data for the book which accompanies the inputted book ID (text data or abstract data) or abstract data for the publication such as the title or the authors name is searched from the book database 5 in accordance with the number of the paragraph it is intended to search for. The search result from step S3-112 is then sent to the system controller 3-3 in step S3-113 and this process is complete.

On the other hand, if it is determined in step S3-111 that a book ID has not been inputted from the system controller 3-3, step S3-114 is gone onto. It is then determined whether or not an attribute list with a recognizer 3-4 speech recognition result has been inputted from the system controller 3-3.

An example of this attribute list is shown in FIG. 30(*a*). FIG. 30(*a*) shows an attribute list taken as the recognition result for speech made by the user at the terminal 2 when, for example, a keyword (attribute name) (category) interrogation (publisher?) (question) is made in step S3-86 in FIG. 24. The items P, Q, R listed on the left hand side of the attribute list are words obtained as recognition results for speech made by the user at the terminal 2. The numbers 0.7, 0.2, 0.01, 0.01 listed on the right hand side then list the plausibility of the words.

If it is determined in step S3-114 that the attribute list has not been inputted, i.e. that information which is neither attribute list or book ID information has been inputted, step S3-115 is gone onto, the input is taken to be an error, and step S3-116 is gone onto. In step S3-116, an error signal is outputted to the system controller 3-3 (FIG. 13) and the process is completed.

If, however, it is determined in step S3-114 that an attribute list has been inputted, step S3-117 is gone onto and it is determined whether or not a number of attribute lists have been inputted. If it is determined in step S3-117 that a number of attribute lists have not been inputted, step S3-118 is skipped and the process goes on to step 3-119.

Alternatively, if it is determined in step S3-117 that a number of attribute lists have been inputted, step S3-118 is gone onto. The number of inputted attribute lists are then gathered, for example, into the kind of table type attribute list shown in FIG. 30(*b*).

This is to say that the book data relationship table (FIG. 27) stored in the book database 5 is referred to in step S3-118 and the number of attribute lists i.e. the keywords taken as speech recognition results are gathered together in the way shown in step S3-90 in FIG. 24.

In FIG. 30(*b*), when the combination of the publisher "P", title "X" and author "A" taken as speech recognition results are being gathered together into a keyword, the combination with the highest combined plausibility is opted for. Also, when the publisher "P", title "X" and author "B" taken as speech recognition results are being put into a keyword combination, their plausibility is the second highest plausibility.

After the number of attribute lists have been gathered together in step S3-118, the result of this list, i.e. the table type attribute list shown in FIG. 30(*b*) is sent to the system controller 3-3. The step S3-119 is then gone onto, an indication from the system controller 3-3 is awaited and a search for the book ID is carried out.

This is to say that, when a control signal designating the execution of a search and a keyword for searching (for example, the publisher "P", title "X" and author "A" which make up the combination with the highest plausibility of the combinations in the table type attribute list shown in FIG. 30(*b*)) are received from the system controller 3-3 in step S3-119, the book data relationship table (FIG. 27) stored on the book database 5 is referred to and a search for the book ID attached so as to correspond to the received keyword ID (attribute ID) is carried out.

At this time, the search controller 3-41 carries out a search based on the contents of the search memory 3-42, the book usage table 3-43 and the individual database 3-44 as deemed necessary.

Namely, the user ID sent from the terminal 2 in step S3-1 in FIG. 14 is first confirmed by the search controller 3-41 (FIG. 26). After this, it is confirmed whether the search is a new search or a continued search (for example, a search where pinpointing is determined in step S3-99 of FIG. 25 so that the search is carried out again).

If the search is a continuous search, the intermediate results for the search appendixed by the confirmed user ID stored in the search memory 3-42 (FIG. 26) are read out and the search is carried out with these intermediate results as the target.

If it is a new search, the search is carried out without referring to the contents of the search memory 3-42.

However, information which is already set up for each user and stored on the individual database 3-44 (FIG. 26) (hereafter referred to as individual information) such as, for example, information specifying that searches are only to be carried out for newspapers or mathematical papers etc. is read out in accordance with the user ID regardless as to whether or not the search is a new search or a continued search. The search is then carried out with the search target limited based on this individual information.

The information which classifies this document is read out in response to the number of times the document has been searched for (search frequency) which is stored in the book usage table 3-43 (FIG. 26). A sequential search which is limited to documents which are classified according to a high search frequency is then carried out. This serves to increase the speed of the search.

If information which the search controller 3-41 intends to store in the search memory 3-42, the book usage table 3-43 or the individual database 3-44 is created during the search, this information will be stored in the search memory 3-42, the book usage table 3-43 or the individual database 3-44.

Further, in step S3-119, it is determined whether or not the number of book IDs (i.e. the number of books) searched from the book database 5 is greater than or equal to m (books) whilst the search is being carried out. If it is determined that the number of searched books is greater than or equal to m, i.e. if the number of books searched is extremely large, the search is suspended at this point in time and step S3-120 is gone onto.

If the number of books for the ID which goes with the keyword ID (attribute ID) received from the system controller 3-3 is extremely large, the search process is stopped whilst it is still in progress. This is because this search will take a great deal of time and the user may therefore mistakenly think that the system is broken.

If the search for the keyword received from the system controller 3-3 i.e. the book ID which goes with the attribute ID is complete or is halted, step S3-120 is gone onto. The book ID obtained from the results of this search is then sent to the system controller 3-3 together with the number of items (number of books). In this case, when the search process is stopped midway in step S3-119, information concerning the interruption of the process whilst in progress is also sent to the system controller 3-3.

After this, step S3-121 is gone onto and the search results are transferred to and stored in the search memory 3-42 (FIG. 26) so as to go with the user ID sent from the terminal 2 in step S3-1 in FIG. 14. This is in preparation for the aforementioned continued processing and this part of the process is then complete.

Now, as described above, the number of attribute lists in step S3-118 i.e. the process where a number of keywords are gathered together into combinations, is not carried out at the searcher 3-6 (search controller 3-41) but rather, is carried out at the recognizer 3-4 with reference to the book data relationship table stored on the book database 5 (FIG. 27). In this case, a table type attribute list of the kind shown in FIG. 30(*b*) is outputted from the recognizer 3-4 to the system controller 3-3 as the speech recognition results. The table type attribute list is then inputted to the searcher 3-6 with these results while the system controller 3-3 is controlling the search.

At the searcher 3-6, when the table type attribute list is inputted in the way described above, the most plausible combination down to the nth most plausible combination of keywords and their respective book IDs are searched once. Therefore, in this case it is not simply one combination of keywords and their corresponding book ID's that are outputted to the system controller 3-3 as search results but rather the "n" combinations of keywords for which the plausibility of the speech recognition results is the highest.

Next, the operation of how the newspaper service in step S3-5 in FIG. 14 is provided will be described with reference to the flowchart in FIG. 31. In FIG. 31, the letter T or H attached to the upper left hand side of each step indicates whether this step is carried out at the terminal 2 (T) or at the central system 1 (H).

First, in step S3-131 the terminal 2 (FIG. 1) is started up (the power supply switch is turned on etc.). In step S3-132 a line connection is made with the central system 1 (user ID etc.) in the way described in step S3-1 in FIG. 14 and the process moves on to step S3-133. In step S3-133, the speech recognizer 2-2, keyboard 2-3, buttons 2-4 or the jog shuttle 2-5 (FIG. 5) are operated by the use of the terminal 2 so that the newspaper service is provided (i.e. so that the newspaper service program is executed at the central system 1). Then, in step S3-134, a selection signal indicating the selection of the newspaper service and the user ID are sent to the central system 1 from the terminal 2.

The selection signal and user ID sent from the terminal 2 in step S3-34 are then received by the central system 1 and the program relating to the newspaper service is activated by the system controller 3-3 (FIG. 13). The user ID and attribute data (newspapers) for carrying out a search limited to newspapers are then sent to the searcher 3-6.

It is then confirmed in step S3-135 as to whether or not the periodical subscription has been set up with respect to the user ID received from the system controller 3-3 at the searcher 3-6. i.e. the individual database 3-44 is referred to by the search controller 3-41 at the searcher 3-6 (FIG. 26).

Then, in step S3-136, it is determined whether or not the periodical subscription has been set up with respect to the user ID sent from the system controller 3-3. If it is determined in step S3-136 that the periodical subscription has been set up with respect to the user ID sent from the system controller 3-3, step S3-138 is gone onto. The periodical subscription and the book ID set up beforehand is then searched from the individual database 3-44 along with attribute data (hereafter referred to set up information relating to the periodical subscription) such as the title and the data of publication. This is then sent to terminal 2 and step S3-139 is gone onto.

In step S3-139, set up information relating to the periodical subscription transmitted from the central system 1 in step S3-138 is received at the terminal 2 and the user confirms whether or not the transfer of data necessary for the book (newspaper) set up by the periodical subscription is to be requested at the terminal 2. The user then operates the speech recognizer 2-2, keyboard 2-3, buttons 2-4 or the jog shuttle 2-5 (FIG. 5) in accordance with whether or not data necessary for the book set up by the periodical subscription is to be transferred and step S3-140 is gone onto. It is then determined whether the speech recognizer 2-2, keyboard 2-3, buttons 2-4 or the jog shuttle 2-5 have been operated so as to transfer data.

If it is determined in step S3-140 that the speech recognizer 2-2, keyboard 2-3, buttons 2-4 or the jog shuttle 2-5 have not been operated so as to transfer data, the process goes on to step S3-143.

However, if it is determined in step S3-140 that the speech recognizer 2-2, keyboard 2-3, buttons 2-4 or the jog shuttle 2-5 have been operated so as to transfer data, the process goes on to step S3-41 and the book ID and data item of the book for which transfer is to be requested is sent to the central system 1 from the terminal 2.

The book ID and data item for the book for which the transfer is to be requested which are sent from the terminal 2 are then received at the central system 1. In step S3-142 the data which it is intended to transfer corresponding to the book ID and data item received from the terminal 2 are then searched for on the book database 5 at the searcher 3-6, sent to the terminal 2, and the process is complete.

On the other hand, if it is determined in step S3-136 that the periodical subscription is not set up with respect to the user ID sent from the system controller 3-3, the process goes on to step S3-137. Information to the effect that the periodical subscription is not set up is then sent from the searcher 3-6 to the system controller 3-3 and step S3-143 is gone onto.

In step S3-143, the operation mode for terminal 2 is put into search mode, so that the terminal 2 can carry out search mode operations (to be described in detail later). The process then goes on to step S3-144 where search processing and data transfer processing (to be described in detail later) are carried out at the central system 1 so as to correspond with the search mode operation for the terminal 2 occurring in step S3-143. The process is then complete.

Next, the operation of the terminal 2 in step S3-143 and the operation of the central system 1 in step S3-144 will be described with reference to the flowchart in FIG. 32. The letters H and T positioned at the upper right hand side of each of the steps indicate whether the processes are carried out at the terminal 2 (T) or the central system 1 (H) in the same way as in FIG. 31.

In step S3-151, the selection of the attribute data category (for example, "title" or "author" etc.) by the user via the operation of the speech recognizer 2-2, keyboard 2-3, buttons 2-4 or the jog shuttle 2-5 by the user at the terminal 2 is awaited. If there is no category selection even after a prescribed period of time, a message to prompt category selection is outputted to the display 2-7 or the speech synthesizer 2-6.

If the user has still not selected a category even after a category selection prompt message has been outputted at the terminal 2 several times via the display 2-7 or the speech synthesizer 2-6, an interrogation message to the effect of questioning whether or not it would be preferable to end the process is outputted via the display 2-7 or the speech synthesizer 2-6.

If the interrogation message is outputted a number of times at the terminal 2 via the display 2-7 or the speech synthesizer 2-6 without a response coming from the user or the speech recognizer 2-2, keyboard 2-3, buttons 2-4 or the jog shuffle 2-5 is operated so that the process is to come to an end, the line which connects with the central system is cut and the process is complete.

On the other hand, if a category is selected in step S3-151, the process goes on to step S3-152. The terminal 2 then waits for the user to input the attribute data (for example, if the category, "publication date" was selected, this would be a date such as the xth day of the xth month) for the selected category by operating the speech recognizer 2-2, keyboard 2-3, buttons 2-4 or the jog shuttle 2-5. If there is no attribute data inputted, then the process will be complete in the same way as for the case in step S3-151.

If attribute data is inputted in step S3-152, the process goes on to step S3-153. The user ID from the terminal 2 and the inputted attribute data is then sent to the central system 1 along with a search indication signal (data transfer instruction) for indicating the book search for this attribute data.

The central system 1 receives the user ID and the attribute data from the terminal 2 and then, in step S3-154, makes the aforementioned attribute list (this may include a table type attribute list) (FIG. 30) from the attribute data before going on to step S3-155. If the inputting of the attribute data is carried out at the terminal 2 by operating, for example, the keyboard 2-3, buttons 2-4 or the jog shuttle 2-5 rather than the speech recognizer 2-2, the plausibility in the attribute list is given a value equal to the maximum value of, for example, 1.

In step S3-155, the search is carried out in the aforementioned way by the searcher in the central system 1 (FIG. 13) based on the attribute list made in step S3-154. If the attribute data sent from the terminal 2 is a book ID, the process in step S3-154 is missed out and the data corresponding to this book ID is searched from the book database 5 in step S3-155.

When the search by the searcher 3-6 is finished, the process goes on to step S3-156. The information relating to the search results for the searcher 3-6 is then sent to the terminal 2 via the system controller 3-3 and the communications controller 3-1.

In step S3-157, a number of search result items are received at the terminal 2 from the central system 1 and are then outputted via the display 2-7 or the speech synthesizer 2-6. An interrogation message questioning as to whether or not the search results should be pinpointed i.e. "pinpoint" is then outputted via the display 2-7 or the speech synthesizer 2-6.

It is then determined in step S3-158 whether or not the user has operated the speech recognizer 2-2, keyboard 2-3, buttons 2-4 or the jog shuffle 2-5 so as to carry out pinpointing. If it is determined in step S3-158 that the user has operated the speech recognizer 2-2, keyboard 2-3, buttons 2-4 or the jog shuttle 2-5 so as to carry out pinpointing, step S3-151 is returned to and the process is repeated from step S3-151.

If it is determined in step S3-158 that the user has operated the speech recognizer 2-2, keyboard 2-3, buttons 2-4 or the jog shuttle 2-5 so that pinpointing is not to be carried out, step S3-159 is gone onto. A message is then outputted via the display 2-7 or the speech synthesizer 2-6 to select the data which it is intended to transfer from the terminal 2 and the process goes on to step S3-160.

In step S3-160, it is determined whether or not the speech recognizer 2-2, keyboard 2-3, buttons 2-4 or the jog shuttle 2-5 has been operated by the user so as to select the data it is intended to transfer. If it is determined in step S3-160 that data has not been selected, steps S3-161 and S3-162 are omitted and the process is complete.

If it is determined in step S3-160 that the data has been selected, step S3-161 is gone onto. A data transfer instruction is then sent to the central system 1 along with a book ID corresponding to this data so that the data selected in step S3-160 is transferred and step S3-162 is then gone onto.

In step S3-162, the data transfer instruction and book ID from the terminal 2 are received at the central system 1. The data corresponding to this book ID is then read out from the book database 5. It is then transferred to the terminal 2 and the process is complete.

So, by operating the jog shuttle 2-5 (FIG. 7) at the terminal 2, various attribute data (this is referred to as "index") which has already been entered can be outputted via the display 2-7 or the speech synthesizer 2-6. In this way, it is easy to locate the desired index when the aforementioned search is carried out.

Figure 33:
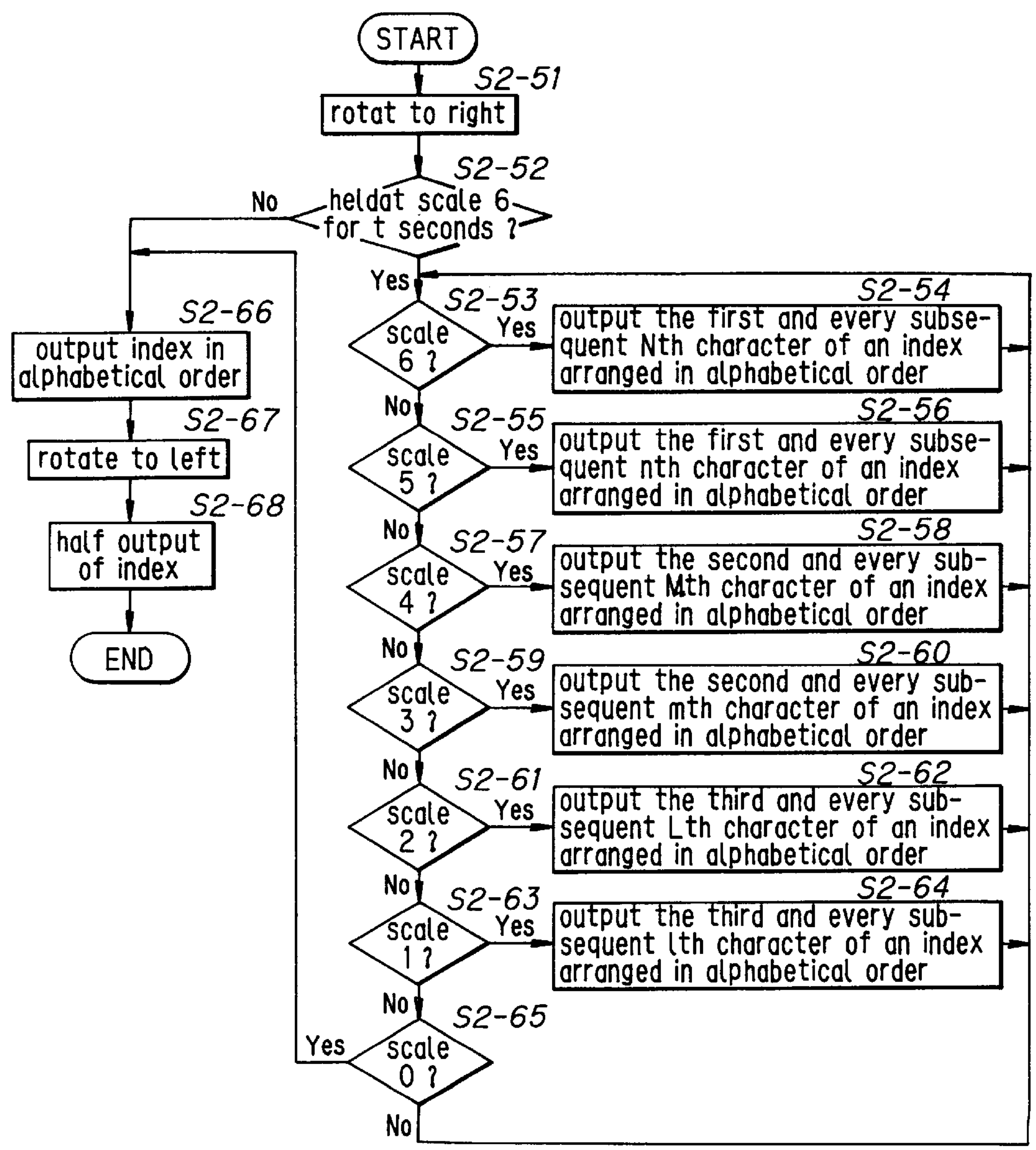
FIG. 33 is a flowchart describing the operation when the fog shuttle 2-5 is operated so that a pre-recorded index is outputted via the display 2-7 or the speech synthesizer 2-6.

In the following, the operation for when the jog shuttle 2-5 (FIG. 7) is operated so that various indexes already listed may be outputted via the display 2-7 or the speech synthesizer 2-6 is described with reference to the flowchart in FIG. 33.

The shuttle ring 2-51 of the jog shuttle 2-5 (FIG. 7) can be rotated to the left or the right up to a maximum scale of, for example, 6.

First, in step S2-51 the shuttle ring 2-51 is rotated to the right. Then, in step S2-52, it is determined whether or not the shuttle ring 2-51 rotated to the right in step 2-51 was held at the maximum scale of 6 (the maximum rotation in the right hand direction) for a prescribed time t. If it is determined in step S2-52 that the shuttle ring 2-51 is not held at the maximum scale 6 for just a prescribed time t, step S2-66 is gone onto.

However, if it is determined in step S2-52 that the shuttle ring 2-51 is held at the maximum scale 6 for just a prescribed time t, step S2-53 is gone onto. It is then determined whether or not the shuttle ring 2-51 is still being held at the maximum scale 6. If it is determined in step S2-53 that the shuffle ring 2-51 is still being held at the maximum scale 6, step S2-54 is gone onto. Then, every Nth character (where N is predetermined) from, for example, the leading character of the pre-recorded index is then outputted via the display 2-7 or the speech synthesizer 2-6 in alphabetical order.

This is to say that, if, for example, N is 5 and the index is already entered in the form of, from the leading character: five "a"s , six "i"s, one "u" and four "e"s, this will be outputted via the display 2-7 or the speech recording apparatus 2-6 as "a, i, i, e".

On the other hand, if it is determined in step S2-53 that the shuttle ring 2-51 is not held at the scale 6, step S2-55 is gone onto and it is determined whether or not the shuttle ring 2-51 is held at the scale 5. If it is determined in step S2-55 that the shuttle ring 2-51 is held at the scale 5, step S2-56 is gone onto. Then, every nth character (where n is predetermined and is less than N) from, for example, the leading character of the pre-recorded index is then outputted via the display 2-7 or the speech synthesizer 2-6 in alphabetical order.

Also, if it is determined in step S2-55 that the shuttle ring 2-51 is not held at the scale 5, step S2-57 is gone onto and it is determined whether or not the shuffle ring 2-51 is being held at the scale 4. If it is determined in step S2-57 that the shuttle ring 2-51 is being held at the scale 4, step S2-58 is gone onto. Then, every Mth character (where M is predetermined) from, for example, the second character from the leading character of the pre-recorded index is then outputted via the display 2-7 or the speech synthesizer 2-6 in alphabetical order.

On the other hand, if it is determined in step S2-57 that the shuttle ring 2-51 is not held at the scale 4, step S2-59 is gone onto and it is determined whether or not the shuttle ring 2-51 is held at the scale 3. If it is determined in step S2-59 that the shuttle ring 2-51 is held at the scale 3, step S2-60 is gone onto. Then, every mth character (where m is predetermined and is less than M) from, for example, the second character from the leading character of the pre-recorded index is then outputted via the display 2-7 or the speech synthesizer 2-6 in alphabetical order.

Also, if it is determined in step S2-59 that the shuttle ring 2-51 is not held at the scale 3, step S2-61 is gone onto and it is determined whether or not the shuttle ring 2-51 is being held at the scale 2. If it is determined in step S2-61 that the shuttle ring 2-51 is being held at the scale 2, step S2-62 is gone onto. Then, every Lth character (where L is predetermined) from, for example, the third character from the leading character of the pre-recorded index is then outputted via the display 2-7 or the speech synthesizer 2-6 in alphabetical order.

On the other hand, if it is determined in step S2-61 that the shuttle ring 2-51 is not held at the scale 2, step S2-63 is gone onto and it is determined whether or not the shuttle ring 2-51 is held at the scale 1. If it is determined in step S2-63 that the shuttle ring 2-51 is held at the scale 1, step S2-64 is gone onto. Then, every Ith character (where I is predetermined and is less than L) from, for example, the third character from the leading character of the prerecorded index is then outputted via the display 2-7 or the speech synthesizer 2-6 in alphabetical order.

Also, if it is determined in step S2-63 that the shuttle ring 2-51 is not being held at the scale 1, step S2-65 is gone onto and it is determined whether or not the shuttle ring 2-51 is being held at the scale 0. If it is determined in step S2-65 that the shuttle ring 2-51 is not being held at the scale 0, step S2-53 is returned to and the process from step S2-53 is repeated.

On the other hand, if it is determined in step S2-65 that the shuttle ring 2-51 is being held at the scale 0, i.e. if the shuttle ring has returned to the scale 0 as a result of having been let go etc. after having been rotated to the right in step S2-51, step S2-66 is returned to. The pre-recorded index is then outputted in, for example, alphabetical order, via the display 2-7 or the speech synthesizer 2-6.

If, after this, the shuttle ring 2-51 is rotated to the left in step S2-67, step S2-68 is gone onto. The outputting of the index via the display 2-7 or the speech synthesizer 2-6 is then halted and the process is complete.

If, for example, the decide button 2-38 of the buttons 2-4 (FIG. 7) is then operated, the index currently being outputted via the display 2-7 or the speech synthesizer 2-6 is taken as being the selected index.

If the shuttle ring is turned to the left in step S2-51, the outputting of the index in step S2-54, S2-56, S2-58, S2-60, S2-62, S2-64 and S2-66 is carried out in reverse alphabetical order. By then turning the shuttle ring 2-51 to the right in step S2-67, the outputting of the index can be halted in step S2-68.

Next, the authoring system 4 for making phonetic signal information using speech synthesis and carrying out editing of information to be stored on the book database 5 in FIG. 1 is described.

Generally speaking, it has proved to be very difficult to remove errors in the reading of a word (in particular, kanji), errors in the imparted accent, errors in the position and length of pauses and errors in the rhythm imparted to phrases when speech synthesis has been carried out using data for sentences where kanji and kana have been mixed. Also, when data in which kanji and kana is mixed obtained using, for example, OCR (Optical Character Recognition), a substantial number of read errors occur. Inputting mistakes are also made if sentences in which kanji and kana are mixed are inputted from the document by hand.

Also, as there are often photographs, diagrams and equations in addition to writing in the document, it is necessary to also put these photographs, diagrams and equations etc. into writing (text form) when recitals are to be carried out at the speech synthesizer 2-6 for the terminal 2 (FIG. 5).

Also, the process for outputting the recited synthesized sounds which is carried out at the speech synthesizer 2-6 is a sequential process. In order to increase the accessibility, just the summaries or keywords for the documents are therefore outputted in a process known as fast reading. It is therefore necessary that searches which depend on the keywords and contents are carried out as soon as the desired portion is indicated by the user.

It is therefore necessary that document data is to be included in the information made for carrying out these fast readings and searches.

At the authoring system 4, intonation signal information which is suitable as data for speech synthesis which consists of phoneme information and rhythm information is made from the document in such a manner that any mistakes may be corrected. The authoring system 4 then puts photographs, diagrams and equations (hereafter referred to as picture information) listed in the document into the form of writing (text form), converts this information into intonation signal information and makes the information for carrying out the fast readings and searches (hereafter referred to as fast reading information and searching information).

Figure 34:
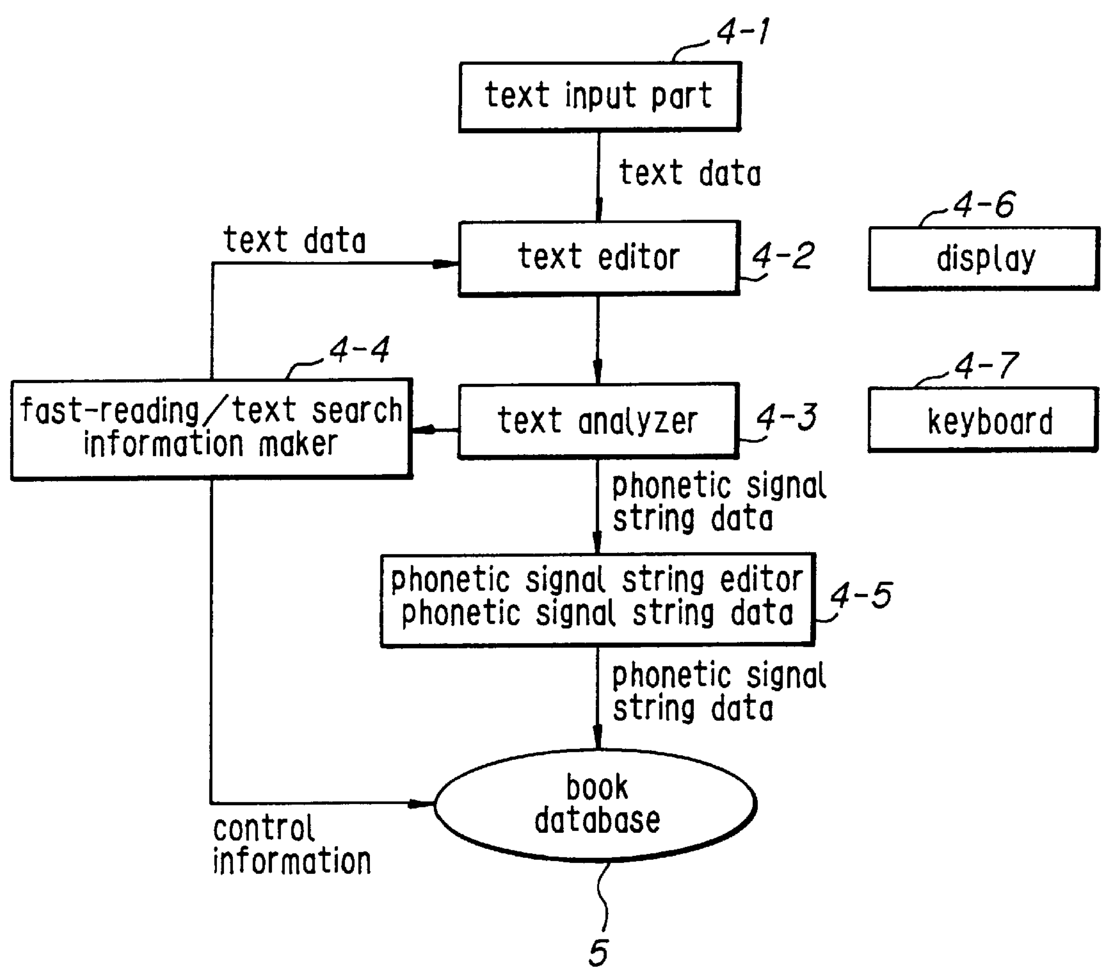
FIG. 34 is a view of the detailed structure of the authorizing system 4 in FIG. 1.

FIG. 34 shows the detailed structure of the authoring system 4. Document information inputted in a variety of formats at a text input area 4-1 is changed into text data for sentences having a mixture of kanji and kana and this is then outputted to a text editor 4-2. The text data for sentences having a mixture of kanji and kana are edited as necessary at the text editor 4-2 before being outputted to a text analyzer 4-3. The text data is then analyzed at the text analyzer 4-3 by a natural speech process so that phonetic signal information made up from for example, accent, phrase, pause, power and utterance duration information can be generated as, for example, reading and rhythm information taken as phonetic information.

At a phonetic signal string editor 4-5, mistaken word readings, inappropriately voiced portions (errors) of de-voiced vowels and consonants, mistaken accent impartation, mistaken settings for pause positions and lengths and mistaken phrase rhythm impartation for the phonetic signal information outputted from the text analyzer 4-3 are corrected. This means that intonation information is produced for which accurate synthesized sounds can be produced. This is then sent to the book database 5, where it is stored.

A fast-reading/text search information maker 4-4 outputs information other than writing from within the information inputted to the text input area 4-1 i.e., image information which has been put into text form, to the text analyzer 4-3 via the text editor 4-2. The fast-reading/text search information maker 4-4 then makes the aforementioned fast-reading information and search information based on the analysis results from the text analyzer 4-3. The fast-reading information is then outputted to the text analyzer 4-3 via the text editor 4-2 and converted to phonetic signal information. The search information is then outputted to and stored on the book database 5 as control information.

The display 4-6 displays the information outputted from each of the blocks which make up the authoring system 4. The keyboard 4-7 is operated when it is wished to provide the necessary commands and information to each of the blocks which make up the authoring system 4.

Figure 35:
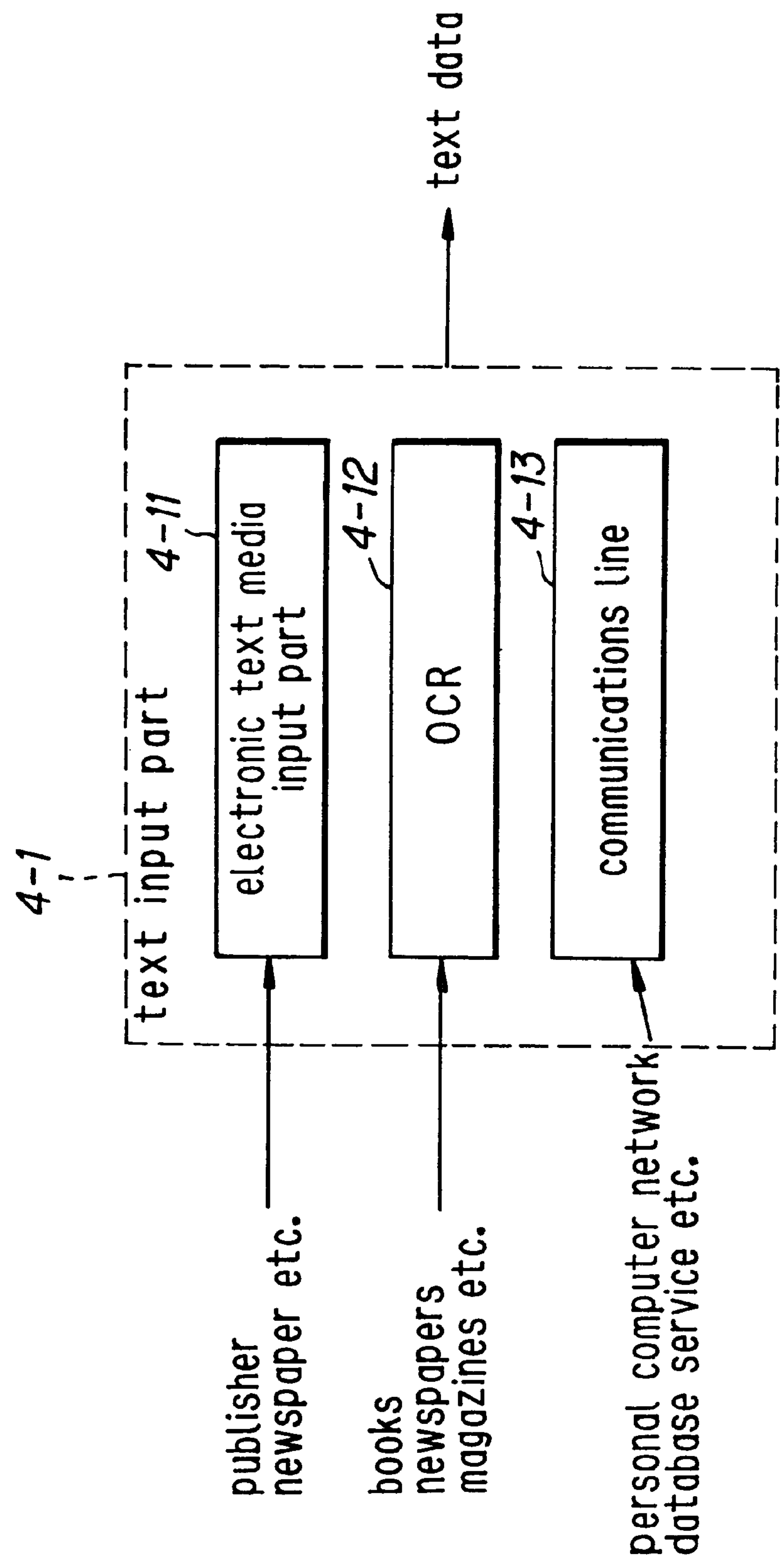
FIG. 35 is a view showing the detailed structure of the text input area 4-1 in FIG. 34.

FIG. 35 is a view of the detailed structure of the text input area 4-1 in FIG. 34. The text input area 4-1 consists of an electronic text media input area 4-11, and OCR unit 4-12 and a communications line 4-13. Data for documents such as books, magazines and newspapers etc. which is edited and produced at a publishers or newspaper company and which is in electronic form (hereafter referred to as electronically published information) is inputted at the electronic text media input area 4-11 from portable-type recording media such as magnetic tapes, magnetic discs, magneto-optical discs or optical discs etc. or via communications lines.

Then, the character data for the contents, summary, headlines and body etc. are extracted as text data from the electronically published information at the electronic text media input area 4-11. The image information for the document is also extracted from the electronically published information at the electronic text media input area 4-11 and this is then displayed at the display 4-6.

Further, at the electronic text media input area 4-11, when the electronically published information is expressed as information processed by a document processing system such as TEX, a page description language such as postscript etc., or a language which describes the document structure to a greater extent such as SMGL (Standard Generalized Markup Language) etc., this description information is also extracted and sent to the fast-reading/text search information maker 4-4 via the text editor 4-2 (FIG. 34) and the text analyzer 4-3.

At the OCR unit 4-12, documents which are already published on paper (documents which are not published electronically) are optically read in and then outputted as text data. Text data for publications may also be inputted from companies which provide information providing services such as personal computer communications services and database services etc. via the communications line 4-13.

Figure 36:
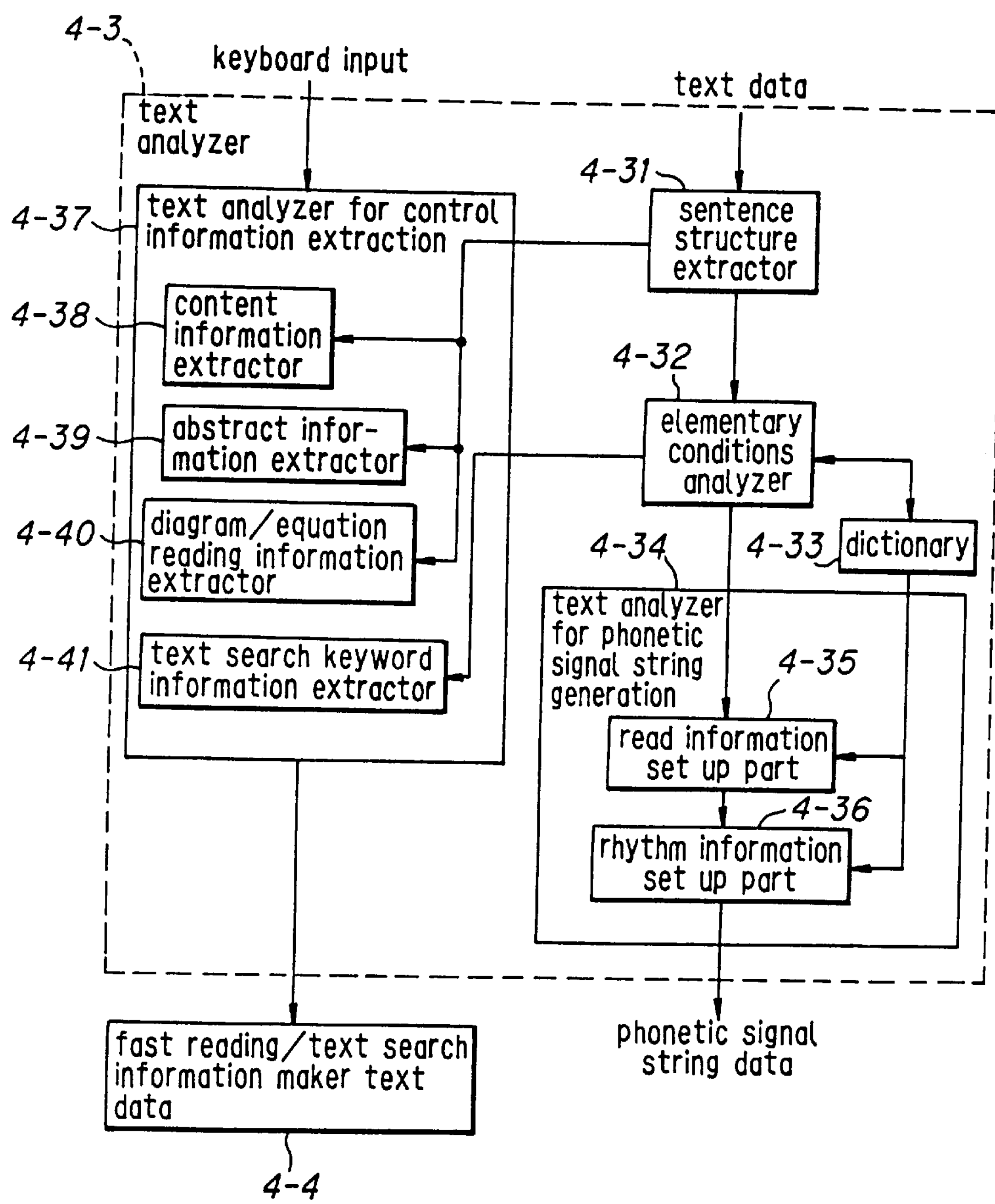
FIG. 36 is a view showing the detailed structure of the text analyzer 4-3 in FIG. 34.

FIG. 36 shows the detailed structure of the text analyzer 4-3 in FIG. 34. The text analyzer 4-3 is equivalent to a so called text speech synthesis method language processor where phoneme information and rhythm information which makes up the phonetic signal information is extracted from the text data for sentences of mixed kanji and kana.

Data from the text input area 4-1 or the fast-reading/text search information maker 4-4 is inputted to the text analyzer 4-3 via the text editor 4-2. This data is inputted to a sentence structure extractor 4-31.

The contents, summary and image information for the document is extracted from the inputted data at the sentence structure extractor 4-31 and outputted to a text analyzer for control information extraction 4-37.

In this case, when the inputted data is in TEX or SGML form etc., the contents, summary and image information can be easily extracted from the document. For example, data made with a document processing system such as TEX etc., tables and equations etc. are expressed in a prescribed format and can therefore be extracted based on this format. In this case, the contents of the drawings and equations is converted into text data, which can be easily carried out in accordance with a prescribed standard.

Also, text data for sentences which are a mixture of kanji and kana is extracted from the inputted data at the sentence structure extractor 4-31 and outputted to the elementary conditions analyzer 4-32.

At the elementary conditions analyzer 4-32, word information and grammatical rules which are already stored in the dictionary 4-33 are referred to and the text data is broken down into words by elementary conditions analysis. Judgements are then made with respect to these parts of speech and they are then outputted to the text analyzer for control information extraction 4-37 and a text analyzer for phonetic signal string generation 4-34.

Namely, when the kind of text data, for example, shown in FIG. 37(*a*) is inputted, the kinds of words and their parts of speech shown in FIG. 37(*b*) are outputted from the elementary conditions analyzer 4-32 as elementary conditions analysis results.

At the text analyzer for phonetic signal string generation 4-34, the impartation of readings to words, lengthening of vowels, de-voicing of vowels and voicing of de-voiced consonants etc. is carried out by a reading information set up area 4-35 whilst referring to the dictionary 4-33.

The sentence melody identification and the relationship between sentence melodies is extracted at a rhythm information set up area 4-36. The sentence phrase information, accent position, phoneme power, phoneme continuation period, pause position and length etc. to be taken as rhythm information is then decided with reference to the dictionary 4-33.

FIG. 37 shows the detailed structure of the reading information set up area 4-35 and the rhythm information set up area 4-36. As shown in FIG. 37, the reading information set up area 4-35 is made up of a pronunciation imparter 4-51, and the rhythm information set up area 4-36 is made up of a word accent set up area 4-61, a sentence melody decider 4-62, an inter melody information extractor 4-63, a pause set up area 4-64, a phrase information set up area 4-65 and an accent information set up area 4-6.

The pronunciation imparter 4-51 attaches word readings (pronunciations) from the elementary conditions analyzer 4-32 whilst referring to the dictionary 4-33 (FIG. 36), carries out processing such as vowel lengthening etc. and then sends output to the word accent set up area 4-61 of the rhythm information set up area 4-36. The basic accent (in the case where the word is only to be said in one way) for the word readings outputted from the pronunciation imparter 4-51 are then decided at the word accent set up area 4-61 with reference to the information (word accent information) stored in the dictionary 4-33 (FIG. 36).

The elementary conditions analysis results in FIG. 37(*b*) are shown in FIG. 37(*c*) with the readings and basic accents attached. In FIG. 37(*c*), the readings are shown in romaji. Also, the meanings of the symbols "'", "@", "$", "X" and "Q" are accent position, devoicing, assimilated sounds, palatines and nasal sounds, respectively. For example, with the contents of the second set of parenthesis on the first line of FIG. 37(*c*) "honnin common noun HO'XNIX), the part of speech for the word "honnin" is "common noun", the reading is "HO'XNIX" and the accent is "HO".

The results with the reading and the basic accent attached are outputted to the accent information set up area 4-66.

Figure 38:
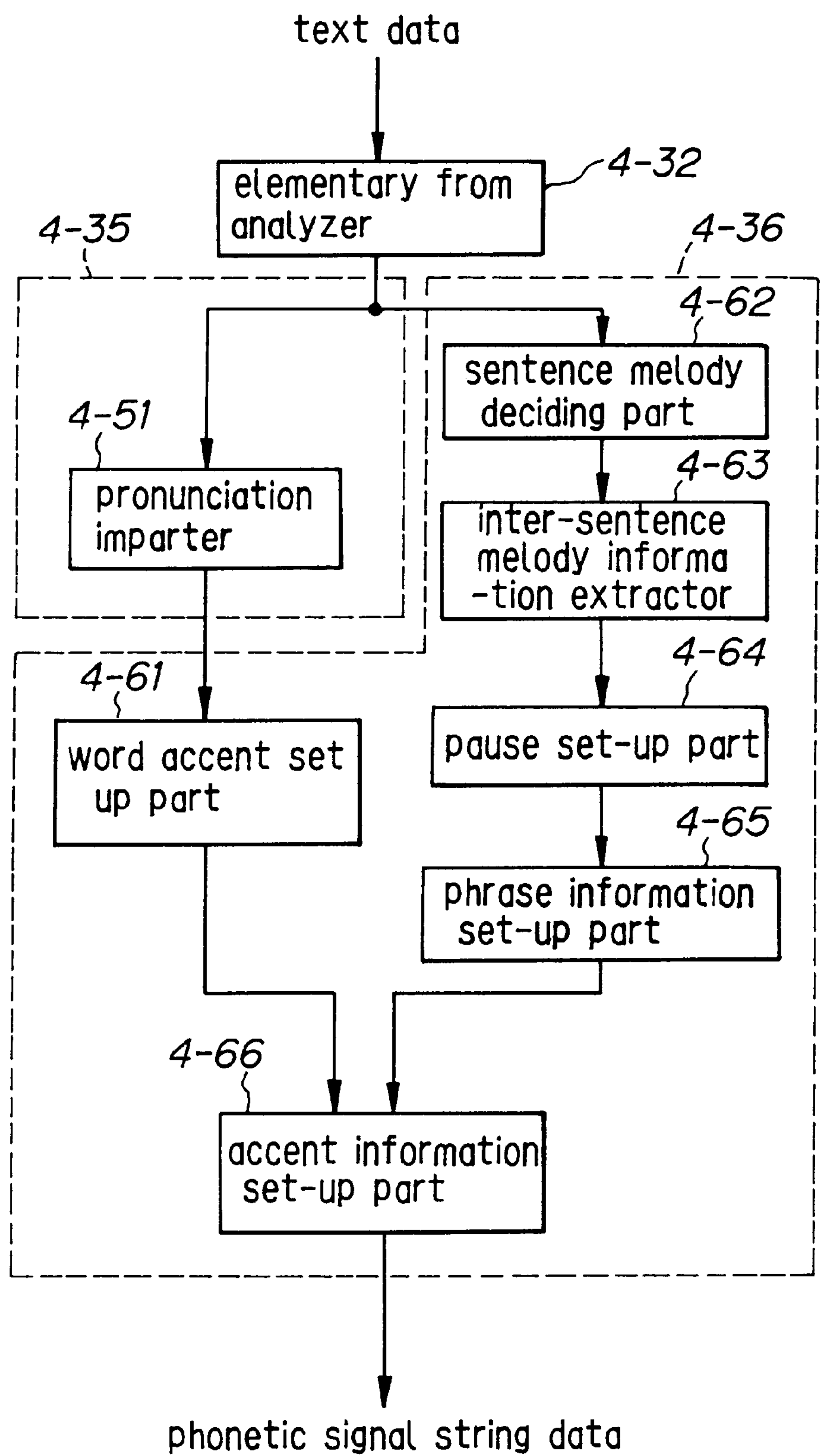
FIG. 38 is a view showing the detailed structure of the text analyzer 4-34 for phonetic signal string production.

Returning to FIG. 38, the elementary conditions analysis results (FIG. 37(*b*))are inputted to the sentence melody set up area 4-62 of the rhythm information set up area 4-36 via the reading information set up area 4-35. The sentence melody is then decided at the sentence melody set up area 4-62 from the elementary conditions analysis results (FIG. 37(*b*)). i.e. the words are connected based on the speech part so that the sentence melody for the text data shown in FIG. 37(*a*) can be set up in the way shown in FIG. 37(*d*).

The results for the setting up of the sentence melody are outputted to the inter-sentence melody information extractor 4-63. The sentence melodies are then gathered together in the way shown, for example, in FIG. 37(*e*) based on the relationship between the sentence melodies (in FIG. 37(*e*), the sentence melodies which have been gathered together are shown by the parenthesis "( )")and these are then outputted to the pause set up area 4-64. Pause positions to be inserted between the sentence melodies and lengths are decided at the pause set up area 4-64. i.e. the position at which it may be possible to insert a pause of the positions on the outside of the brackets shown in FIG. 37(*e*) would be directly after the closing of the brackets, so that the pause set up area 4-64 may decide the pause position, for example, based on the number of mora, etc.

Results obtained by carrying out the pause set up with respect to the text data (FIG. 37(*e*)) for which the sentence melodies are gathered are shown in FIG. 37(*f*). In FIG. 37(*f*), a pause is shown by the slash mark "/".

Text data for which pause setting up has been carried out (FIG. 37(*f*)) is sent to the phrase information set up area 4-65. At the phrase information set up part, 4-65, the sentence structure is obtained from the relationship between the sentence melodies for the text data. The phrases within the sentences (phrase information) are then set up based on these sentence structures. For example, pitch patterns etc. are used for deciding the phrase information during speech synthesis.

Text data for which the phrases have been set up is outputted to the accent information set up area 4-66. At the accent information set up area 4-66, the kind of phonetic signal information shown in FIG. 37(*g*) is generated from the output from the word accent set up area 4-61 (FIG. 37(*c*)) and the output from the phrase information set up area 4-65. This is then outputted to the book database 5 via the phonetic signal string editor 4-5 (FIG. 34). In FIG. 37(*g*), a pause is indicated by "PAU".

Here, the position of the accent within the phrase is decided at this time at the phrase information set up area 4-65 based on the rules for accent shifting for phrases and compound words. i.e. when words are connected together into a sentence, the position of the accent on the words changes depending on whether the word is uttered in the middle of the sentence or the word is uttered independently. Compensation corresponding to the change in the accent position is therefore carried out at the accent information set up area 4-66.

Returning to FIG. 36, the text analyzer for control information extraction 4-37 is made up of a contents information extractor 4-38, abstract information extractor 4-39, diagram/equation reading information extractor 4-40 and a text search keyword information extractor 4-41. The contents, summary and image information for the document are extracted by the contents information extractor 4-38, abstract information extractor 4-39 and the diagram/equation reading information extractor 4-40, respectively, from the output from the sentence structure extractor.

If the data inputted to the sentence structure extractor 4-31 is in TEX form, the control information for the structure of the contents and the control information for the structure of the image information is extracted based on this TEX form at the contents information extractor 4-38 and the diagram/equation reading information extractor 4-40, respectively.

At the text search keyword information extractor 4-41, the frequency with which words appear in each text part are then added up from the output from the elementary conditions analyzer 4-32 i.e. the words which make up the text data and their text parts and the document keywords are then extracted based on the total value.

More specifically, if words such as, for example, nouns, proper nouns or independent words, for which the frequency of appearance is high, are extracted as the free words, information which indicates that these words are keywords is attached to them. It is also possible to have words other than these kinds of words as the keywords.

At the text analyzer for control information extraction 4-37, as described above, the contents, abstract, image information and keywords are extracted by the contents information extractor 4-38, abstract information extractor 4-39, the diagram/equation reading information extractor 4-40 and the text search keyword information extractor 4-41, respectively. The contents, abstract, image information and keywords can then be inputted as deemed necessary by operating the keyboard 4-7 (FIG. 34) while looking at the document data displayed on the display 4-6.

The contents, summary, image information and keywords extracted at the text analyzer for control information extraction 4-37 are then outputted to the fast-reading/text search information maker 4-4.

Figure 39:
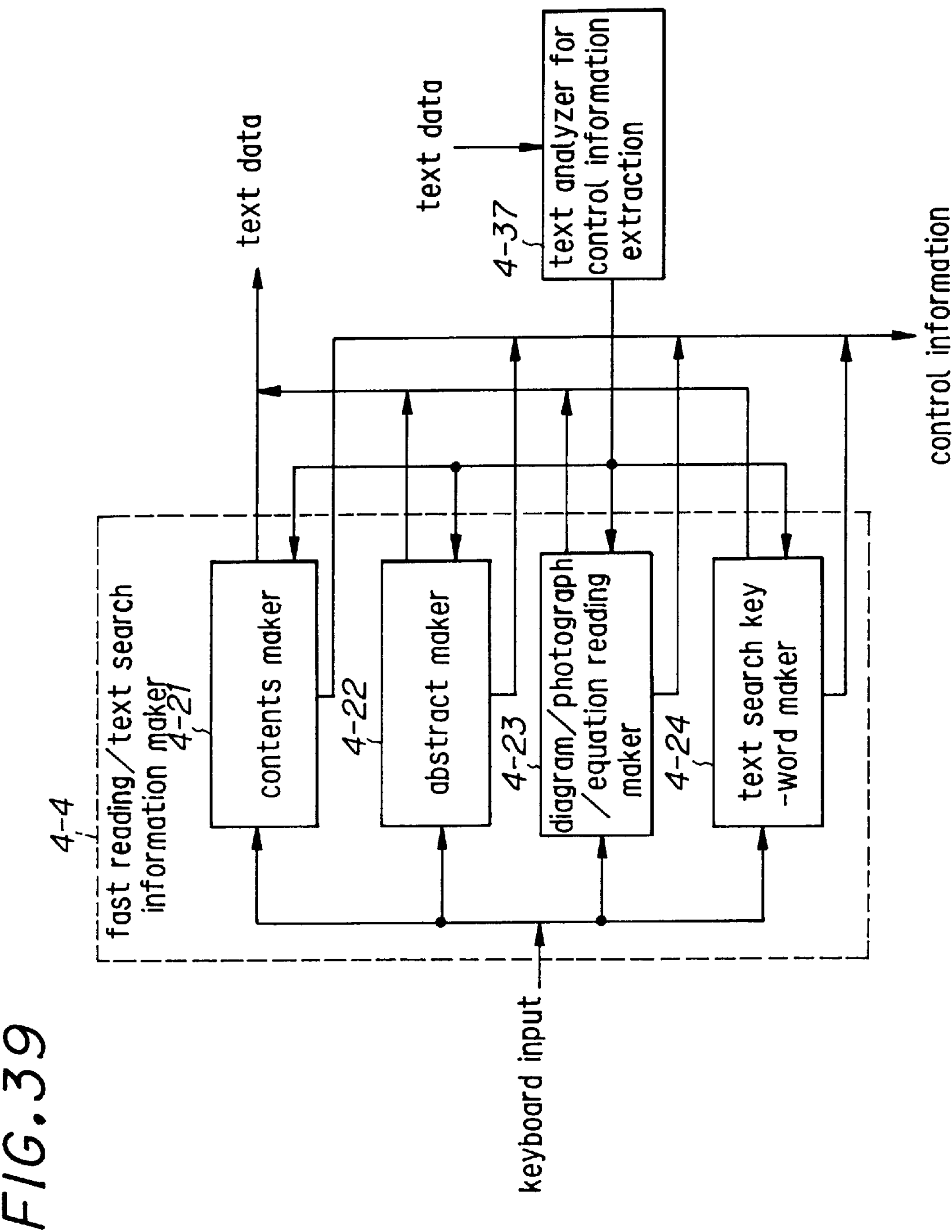
FIG. 39 is a view of the detailed structure of the fastreading/text search information maker 4-4 in FIG. 34.

FIG. 39 is a view of the detailed structure of the fast-reading/text search information maker 4-4 shown in FIG. 34. The fast-reading/text search information maker 4-4 consists of a contents maker 4-21, an abstract maker 4-22, a diagram/photograph/equation reading maker 4-23 and a text search keyword maker 4-24.

At the contents maker 4-21, abstract maker 4-22, diagram/photograph/equation reading maker 4-23 and text search keyword maker 4-24, the contents, abstract, image information and keywords outputted by the text analyzer for control information extraction 4-37 of the text analyzer 3-4 (FIG. 36) are changed into prescribed formats before being outputted to the book database 5 as control information, and these items are also converted into text data describing the contents which is then outputted to the text analyzer 4-3 via the text editor 4-2. The text data which respectively describes that which is contained in the contents, abstract, image information and keywords is then converted to phonetic signal information before being stored in the book database 5.

At the fast-reading/text search information maker 4-4, in the same way as at the text analyzer for control information extraction 4-37 for the text analyzer 4-3 (FIG. 36), with, for example, documents for which the contents, abstract, image information or keywords cannot be extracted or made, the keyboard 4-7 (FIG. 34) may be operated as necessary whilst looking at the display 4-6 so that text data and control information corresponding to the contents, summary, image information and keywords may be made.

According to the contents made in the above way, when these contents are displayed or recited at the terminal 2 (FIG. 1) a particular portion of the contents may be indicated and the recital or displaying of the document may then be carried out from this indicated portion. Also, the contents of the document can be understood by displaying or reciting the abstract. Also, depending on the keyword, just the keyword can be displayed or recited, so that an outline of the contents of the document may be understood. Further, by indicating a keyword, recital or display of the document may be carried out from this keyword.

Figure 40:
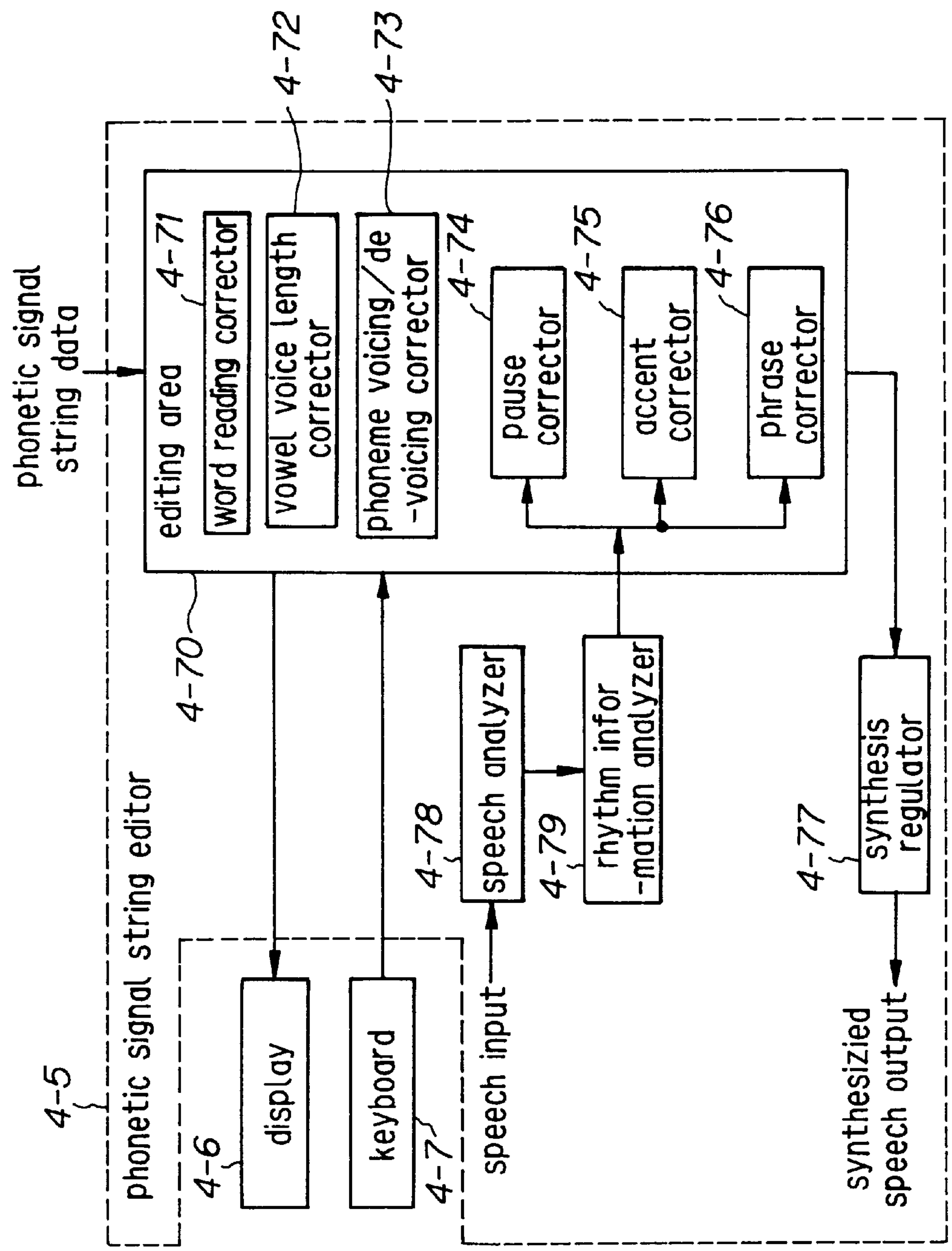
FIG. 40 is a view showing the detailed structure of the phonetic signal string editor 4-5 in FIG. 34.

FIG. 40 is a view of the detailed structure of the phonetic signal string editor 4-5 in FIG. 34. Mistakes in the phonetic signal information (phonetic signal string data) outputted from the text analyzer 4-3 can be corrected at the editing area 4-70 in the phonetic signal string editor 4-5 by operating the keyboard 4-7. Phonetic signal information outputted from the text analyzer 4-3 and phonetic signal information in which mistakes have been corrected outputted from the editing area 4-70 are displayed on the display 4-6, as are operations of the keyboard 4-6.

For example, the correcting of mistaken readings (for example, mistakes in extracting elementary conditions, mistakes in the reading of proper nouns or reading mistakes when the same language can have different ways of being read, etc.) etc. can be carried out by operating the keyboard 4-7 whilst looking at the display 4-6 so that the correct reading is inputted into the editing area 4-70.

At the text analyzer 4-3, when the text data analysis results cannot be pinpointed to one item, i.e. when the analysis results are ambiguous, information to the effect that the analysis results are ambiguous is outputted along with the analysis results. This information is displayed on the display 4-6 so that the operator of the authoring system 4 (the operator of the keyboard 4-7) can be warned.

Also, the phonetic signal information outputted from the text analyzer 4-3 and the phonetic signal information for which the mistakes have been corrected at the editing area 4-70 are outputted to a synthesis regulator 4-77 where they are outputted as regulatedly synthesized sounds. This can also be carried out by operating the keyboard 4-7 whilst listening to the synthesized sounds.

For example, mistakes in the de-voicing of vowels or the voicing of voiced consonants can be heard as the output from the synthesis regulator 4-77 and the unnatural portions can then be corrected.

It is also easy to input the correct items for the phoneme information from the keyboard 4-7 but it is difficult to input accent positions and phrasing correctly without actually speaking. The corrections in the phonetic signal information (phonetic signal string data) at the editing area 4-70 are therefore carried out via speech.

Speech which is uttered undergoes sound analysis at the sound analyzer 4-78 and these analysis results are outputted to the rhythm information analyzer 4-79. Rhythm information is then generated at the rhythm information analyzer from the sound analysis results and this is outputted to the editing area 4-70 (pause corrector 4-74, accent corrector 4-75 and phase corrector 4-76). Mistaken pausing, accenting or phrasing could then be corrected by, for example, rearranging the rhythm information from the rhythm information analyzer 4-79.

More specifically, the unnatural portions of the pauses, accenting and phrasing can be found by listening to the synthesized sounds outputted from the synthesis regulator 4-77. These portions are then correctly spoken by the person operating the authoring system 4. The correctly spoken speech then undergoes sound analysis at the sound analyzer 4-78. The pitch pattern is then obtained at the rhythm information analyzer 4-79 from the sound analyzation results and the phrase component and access component etc. are then extracted from this pitch pattern (pitch frequency pattern). Unnatural portions of the pauses, accenting and phrasing are then corrected at the editing area 4-70 using the phrase component and accent component etc.

The editing area 4-70 is made up of a word reading corrector 4-71, a vowel voice length corrector 4-72, a phoneme voicing/devoicing corrector 4-73, a pause corrector 4-74, an accent corrector 4-75 and a phrase corrector 4-76. These items correct word readings (kanji and alphabetic characters, numerals, abbreviations, etc.), vowel voice lengths, phoneme devoicing and voicing, pauses, accents and phrases respectively in accordance with operations of the keyboard 4-7 or speech inputted at a speech analyzer 4-78.

Next, the correction of the phonetic signal information carried out at the editing area 4-70 is described with reference to FIGS. 41 to 48. Phonetic signal information from the text analyzer 4-3 is displayed at the display 4-6 in the way, for example, shown in FIG. 41. In the diagram, the contents of the parentheses show the kanji readings and the slash mark "/" shows the accent. Also, the colon "-" shows the length of the vowel voicing: FIG. 41(*a*) shows the example of a text data. FIG. 41(*b*) shows an English translation corresponding to the example of FIG. 41(*a*). FIG. 41(*c*) shows the relation between FIGS. 41(*a*) and (*b*).

In FIG. 41, the area "(k/nnichi) is shaded because the analysis results at the text analyzer 4-3 were unclear, i.e. it was not clear whether the reading for the kanji "kyou" was "konnichi" or "kyou".

If the word "kyou" is then inputted by operating the keyboard 4-6, "k/nnichi" is corrected to "kyou" as shown in FIG. 42(*a*). The voice length of "kio" and the accent correction are then carried out at the vowel voice length corrector 4-72 and the accent corrector 4-75 respectively so that "kyou" is corrected to "kyo/:", as shown in FIG. 42(*b*).

Also, with the phonetic signal information from the text analyzer 4-3 shown in FIG. 41, the reading of the proper noun "hata" has not been read as "hata" but has instead been read as "haneda". In this case, the portion [hata"haneda"] is indicated by operating the keyboard 4-6 and the corrected reading "hata" is then inputted. The portion to be corrected is then shown as a shaded area on the display 4-6, as shown in FIG. 42(*b*).

FIG. 43 shows the situation when a mistake in the vowel voicing length occurring in the reading "beikoku" for kanji "be:koku" from within the phonetic signal information in FIG. 42(*b*) is corrected to "be:koku" at the vowel voice length corrector 4-72.

FIG. 44 shows the situation when the "i" from the vowel "shi" in "shita" in the phonetic signal information in FIG. 43, which is usually de-voiced, is de-voiced by the phoneme voicing/de-voicing corrector 4-73. In the diagram, "@" is the signal which indicates the de-voicing, with this being listed directly before the portion to be de-voiced.

The speech synthesis would be more natural if a pause were to be inputted directly after Kanji "hikoki (hiko/:ki)" in the phonetic signal information in FIG. 44. In FIG. 45, the situation is therefore shown where a pause is inputted at this position by a pause corrector 4-74. In the diagram, I×I is the signal indicating a pause and this is listed at the position where the pause is to be inserted. Also, a numeral corresponding to the length of the pause is inputted at "x".

In FIG. 46, at the accent corrector 4-75, the conditions in which the reading["hata"] for "hata" in the phonetic signal information in FIG. 45 for which there is, as of yet, no accent (a 0 type accent), has an accent attached to the "ha" portion so as to be corrected to become "ha/ta" (i.e. corrected to a 1 type accent) are shown.

Also, in FIG. 47 the conditions for where three phrases of the phonetic signal information in FIG. 46 are gathered together at a phrase corrector 4-76 so as to obtain synthesized sounds with a more natural phoneme pattern are shown. In this diagram, the signals for the shaded parentheses "[" and "]" represent signals indicating the beginning and the end of the respective phrases and are inserted at the start and the end of a phrase respectively.

In the above way, the phonetic signal information shown in FIG. 41 is corrected into the kind of phonetic signal information without mistakes shown in FIG. 48 which is then outputted to and stored in the book database 5 (FIG. 34).

In the above way, according to this information access system, the inputting of commands and other essential information at the terminal 2 (FIG. 5) can be carried out by operating the speech recognizer 2-2, keyboard 2-3, buttons 2-4 or the jog shuttle 2-5. Further, as the information is outputted via a speech synthesizer 2-6 or a display 2-7, the information can be easily handled even by somebody who is disabled in some way.

Also, as phonetic signal information for documents can be obtained from the central system 1, a document recital service can be easily provided for people with defective eyesight.

According to the present invention, the book database 5 stores at least phonetic signal information including phoneme information and rhythm information, the central system 1 transmits the phonetic signal information stored on the database 5 to the terminal 2, and the terminal 2 receives the phonetic signal information transmitted from the central system 1. In this way, information stored on the database 5 may be provided to the user via synthesized sounds for speech which is synthesized based on phonetic signal information. Also, as the phonetic signal information in this case is sent and received, the speech which is sent and received can be compared and the volume of data sent and received can be reduced, as can be the communications expenses.

The terminal 2 sends key words inputted to the microphone 2-21 to the central system 1. The controller 1 then searches on the database 5 for phonetic signal information relating to the publications corresponding to the keywords sent from the terminal 2 and this search result is then transmitted to the terminal 2. The user can then be provided with the searched information via synthesized sounds for which speech synthesis was carried out based on the phonetic signal information taken as the search results.

The keywords for the desired document may be inputted to the microphone 2-21 verbally and the central system 1 then recognizes the speech inputted to the microphone 2-21 and searches for phonetic signal information relating to the document on the database 5 using recognition results from the recognition part 3-4. The desired information can then be obtained simply by inputting the keywords via speech and without having to operate a keyboard etc.

When a number of the keywords are inputted verbally at the microphone 2-21, the recognition part 3-4 determines whether or not a combination of respective speech recognition results has been obtained for the number of keywords, and outputs respective speech recognition results for the number of keywords based on the speech recognition results. This reduces the number of mistaken recognitions.

A mark may be applied to a prescribed position of the synthesized sound outputted by the speech synthesizer 2-6. The speech synthesizer 2-6 then resynthesizes and outputs the synthesized sounds from the position of the applied mark. The synthesized sounds for the desired portion can therefore be obtained immediately.

Also, at the terminal 2, speech inputted via the microphone 2-21 undergoes sound analysis and these sound analysis results are then sent to the central system 1. Speech recognition at the central system 1 is then carried out based on these sound analysis results sent from the terminal 2 and prescribed processing corresponding to the speech recognition results is carried out. Speech deterioration is therefore removed when compared with that where the speech signal is actually sent to the central system 1 and the amount of communications involved is therefore reduced. As large scale speech recognition apparatus is not required on the terminal 2 side, the terminal 2 can be made to be more compact.

The central side control means sends the speech recognition results from the central side recognition part 3-4 to the terminal 2. The terminal 2 can therefore be operated and controlled via speech even without there being any speech recognition apparatus on the terminal 2 side.

Further, speech may be re-inputted to the speech inputting means when the speech recognition results are mistaken. Speech recognition is then carried out again taking the mistaken recognition results into account. The same speech will therefore not be repeatedly recognized in a mistaken manner.

The speech is synthesized in accordance with speech recognition results for the central side recognition part 3-4 transmitted from the system controller 3-3 to the terminal 2. In this way, people whose eyesight is in some way disabled are able to confirm the speech recognition results.

Also, the system controller 3-3 searches for and transmits to the terminal 2 information relating to the publications on the database 5 in accordance with speech recognition results from the recognition part 3-4. In this way, the desired information can be obtained via speech without operating a keyboard etc.

The terminal 2 synthesizes speech in accordance with information relating to the document transmitted by the system controller 3-3. In this way, the contents of the documents can be recognized even by people whose eyesight is disabled in some way.

Further, the speech synthesizer 2-6 performs compensation on the synthesized sounds in accordance with prescribed hearing characteristics. In this way, synthesized sounds can be provided which are easy for people who's hearing is in some way impeded to listen to.

The recording medium is capable of being recorded with phonetic signal information which includes phoneme information and rhythm information. Synthesized sounds can therefore be easily obtained.

Also, an authoring system produces phonetic signal information from information relating to the document and stores the phonetic signal information in the database 5. In this way, synthesized sounds are made from the phonetic signal information so that information for documents may be easily provided using speech.

The speech synthesizer 2-6 synthesizes speech from the phonetic signal information so that edited phonetic signal information made by the authoring system may be recognized.

Further, rhythm information for the speech inputted at the microphone 2-21 is extracted and mistakes in the results from the analyzer 2-23 are corrected based on this rhythm information. Mistakes in the analysis results can therefore be corrected using speech, so that there is no need to operate a keyboard etc.

Fast reading information for reading documents quickly is made by the fast-reading/text search information maker 4-4. The fast reading information is then stored in the database 5 together with the phonetic signal information relating to the document and the speech synthesizer 2-6 outputs quick reading synthesized sounds for the document based on the quick reading information. The contents of the documents can therefore be quickly understood.

Also, the keyword may be attribute data expressing the attributes of the document. A relationship table expressing the relationship between the attribute data and the document corresponding to the attribute data is stored on the database 5. The searcher 3-6 then carries out searches with reference to the relationship table. Searches can therefore be carried out quickly.

Unique document identity numbers or attribute identity numbers for identification are assigned respectively to the document or the attribute data and the relationship table describes the corresponding relationship using the document identity number and the attribute identity number. This enables searches to be carried out rapidly.

Further, a search memory 3-42 stores document identity numbers and attribute identity numbers which were searched in the past. The searcher 3-6 then searches by initially referring to this search memory 3-42.

The individual database 3-44 stores the scope of the search, so that the searcher 3-6 can then carry out the search within the search scope stored in the individual database 3-44. This means that the search can be carried out quickly.

A book usage table 3-43 stores the frequency with which the phonetic signal information relating to the document is searched for by the searcher 3-6. The searcher 3-6 then refers to the book usage table 3-43 and searches sequentially from the group of items of phonetic signal information relating to documents of a high search frequency. Documents which have been searched for a large number of times in the past can therefore be searched for immediately.

Also, the shuttle ring 2-21 performs control so as to output at the display 2-7 a prescribed number of characters from the keywords, starting from the front. The decide button 2-38 then selects the desired items from the keywords outputted at the display 2-7. The desired keyword can therefore be inputted easily.

Further, the database 5 may be connected to a further database via a network. The network controller 6 then controls the exchange of information with the further database. It is therefore possible for information to be shared between a number of central systems.

What is claimed is:

1. An information access system comprising:

a central system having a database in which information is stored, the central system including searching means for searching the database; and a terminal coupled to the central system which can access information on the database;

wherein the database stores at least phonetic signal information including phoneme information and rhythm information, the central system transmits phonetic signal information stored in the database to the terminal, and the terminal receives the phonetic signal information transmitted from the central system; and further wherein said phonetic signal information are items related to publications, and the searching means is configured to search the database for phonetic signal information relating to the publications corresponding to a keyword sent from the terminal.

2. An information access system according to claim 1 wherein said terminal further includes speech synthesizing means for synthesizing speech from the phonetic signal information.

3. An information access system according to claim 1 wherein said terminal further includes recording means for recording the phonetic signal information on a recording medium.

4. An information access system according to claim 3 wherein said terminal further includes playback means for playing back the phonetic signal information recorded on the recording medium.

5. An information access system according to claim 2 wherein the terminal further includes mark application means for applying a mark to a prescribed position of the synthesized sound outputted by the speech synthesizing means and further wherein the speech synthesizing means resynthesizes and outputs the synthesized sounds from the position of the applied mark.

6. An information access system comprising:

a central system including a database for storing information relating to publications; and a terminal coupled to the central system;

wherein said terminal includes:

speech inputting means for inputting speech information, and sound analyzing means for analyzing speech information inputted to the speech inputting means and sending sound analysis results to the central system, and further wherein said central system includes:

central speech recognition means for recognizing speech information using sound analyzing means sound analysis results sent from the terminal, and central control means for carrying out a prescribed processing in accordance with speech recognition results of the central speech recognition means the central control means configured to search for and transmit to the terminal information relating to publications on the database in accordance with speech recognition results.

7. An information access system according to claim 6 wherein said central control means sends the speech recognition results from the central speech recognition means to the terminal.

8. An information access system according to claim 7 wherein said terminal further includes speech recognition result correction means for correcting a mistakenly recognized portion of the central speech recognition means recognition results transmitted from the central control means, and further wherein the central speech recognition means confirms speech by dictation and correction results from the speech recognition result correction means are sent to the central system.

9. An information access system according to claim 8 wherein the speech recognition result correction means includes a shuttle ring jog dial.

10. An information access system according to claim 7 wherein the central speech recognition means confirms speech by dictation, the speech inputting means re-inputs speech when the speech recognition results from the central speech recognition means transmitted from the central control means are mistaken and the central speech recognition means recognizes speech which was re-inputted to the speech inputting means again, in accordance with the speech recognition results.

11. An information access system according to claim 7 wherein the terminal further includes speech synthesizing means for synthesizing speech in accordance with central speech recognition means speech recognition results transmitted from the central control means.

12. An information access system according to claim 7 wherein said terminal further includes terminal speech recognition means for recognizing speech based on sound analysis means sound analysis results and terminal side control means for carrying out prescribed processing corresponding to terminal speech recognition means speech recognition results.

13. An information access system according to claim 7 wherein the terminal further includes speech synthesizing means for synthesizing speech in accordance with information relating to the document transmitted by the central control means.

14. An information access system according to claim 7 wherein the terminal transmits the scope of vocabulary to become the speech recognition target to the central system and the central speech recognition means carries out speech recognition within the vocabulary scope transmitted by the terminal.

15. An information access system according to claim 7 wherein sound analysis means sound analysis results are compressed and sent the central system.

16. An information access system according to claim 7 wherein the terminal further includes a Braille display or Braille printer for outputting information relating to the document transmitted by the central control means.

17. An information access system according to claim 6 wherein the speech is uttered in word or syllable units.

18. An information access system according to claim 2 or 13 wherein the terminal further includes recording means for recording on the recording medium synthesized sounds composed by the speech synthesizing means.

19. An information access system according to claim 13 wherein the terminal further includes synthesized sound control means for controlling synthesized sounds composed and outputted by the speech synthesizing means.

20. An information access control system according to claim 19 wherein the synthesized sound control means controls the tonal quality of the synthesized sounds.

21. An information access system according to claim 19 wherein the synthesized sound control means controls the speed of utterance of the synthesized sounds.

22. An information access system according to claim 19 wherein the synthesized sound control means controls the amplitudes of the voices for the synthesized sounds.

23. An information access system according to claim 19 wherein the synthesized sound control means includes a jog dial or a shuttle ring.

24. An information access system according to claim 18 wherein the terminal further includes playback means for playing back synthesized sounds recorded on the recording medium.

25. An information access system according to claim 24 wherein the playback means plays back the synthesized sounds in reverse.

26. An information access system according to claim 13, wherein the speech synthesizing means further includes characteristic compensating means for compensating the synthesized sounds in accordance with prescribed hearing characteristics.

27. An information access system according to claim 26 wherein the prescribed hearing characteristics may be varied.

28. An information access system according to claim 26 wherein the characteristic compensating means is a filter.

29. An information access system according to claim 3 wherein the recording medium is capable of being recorded with phonetic signal information including phoneme information and rhythm information.

30. An information access system according to claim 1 wherein the central system further includes an authoring system which produces phonetic signal information from information relating to the document and stores the phonetic signal information at the database.

31. An information access system according to claim 30 wherein the authoring system further includes editing means for editing the phonetic signal information.

32. An information access system according to claim 31 wherein the authoring system further includes speech synthesizing means for synthesizing speech from the phonetic signal information.

33. An information access system according to claim 30 wherein the authoring system further includes analyzing means for analyzing the document text data and generating phonetic signal information based on the analysis results.

34. An information access system according to claim 33 wherein the authoring system further includes mistaken reading correction means for correcting words which have been read incorrectly from document text data in the analysis means analysis results.

35. An information access system according to claim 33 wherein the authoring system further includes speech input means for inputting speech, extracting means for extracting rhythm information for speech inputted by the speech input means and correction means for correcting mistaken analysis results from the analysis means based on rhythm information for the speech extracted by the extracting means.

36. An information system according to claim 33 wherein the authoring system further includes character reading means for reading characters from the document and generating the text data.

37. An information access system according to claim 36 wherein the authoring system further includes speech synthesizing means for synthesizing speech from the output from the character reading means and correction means for correcting errors made in reading characters from the document using the character reading means based on synthesized sounds outputted by the speech synthesizing means.

38. An information access system according to claim 33 wherein the authoring system changes graphics data for the document into text data which describes the graphics data and the analysis means analyzes the text data which describes the graphics data.

39. An information access system according to claim 33 wherein said document text data includes an abstract of the items recorded in the document.

40. An information access system according to claim 33 wherein the authoring system further includes abstract inputting means for taking the abstract of the recorded items of the document as text data for the document for inputting to the analysis means.

41. An information system according to claim 2 wherein said central system further includes fast reading information making means for making fast reading information for reading documents quickly, wherein the fast reading information is stored in the database together with phonetic signal information relating to the document and the speech synthesizing means outputs quick reading synthesized sounds for the document based on the quick reading information.

42. An information access system according to claim 41 wherein the fast reading information is a keyword extracted from the document.

43. An information access system according to claim 41 wherein the fast reading information is the contents information for the document.

44. An information access system according to claim 43 wherein the central system further includes contents producing means for producing contents information for the document.

45. An information access system according to claim 1 wherein said terminal further includes broadcast receiving means for receiving urgent broadcasts relating to urgent precautions and reporting means for bringing news of the urgent precautions.

46. An information access system according to claim 45 wherein the central system and the terminal carry out wireless communications.

47. An information access system according to claim 46 wherein the terminal is battery operated.

48. An information access system according to claim 47 wherein the central system is connected to a further central system via a network and is further equipped with a network control means for controlling the exchange of information with the further central system.

49. An information access system according to claim 48 wherein the central system is connected to a plurality of terminals.

50. An information access system according to claim 1 wherein the keyword is attribute data expressing the attributes of the document, a relationship table expressing the relationship between the attribute data and the document corresponding to the attribute data is stored on the database, and the search means executes searches with reference to the relationship table.

51. An information access system according to claim 50 wherein unique document identity numbers or attribute identity numbers for identification are assigned respectively to the document or the attribute data and the relationship table describes the corresponding relationship using the document identity number and the attribute identity number.

52. An information access system according to claim 51 wherein the central system is further equipped with past search information recording means for storing document identity numbers and attribute identity numbers which were searched in the past, wherein the search means searches by initially referring to the past search information recording means.

53. An information access system according to claim 50 wherein the attribute data is constituted by items for which speech has been recognized, and the search means carries out the search from the - phonetic signal information relating to the document corresponding to the attribute data for which the plausibility of the speech recognition results is highest.

54. An information access system according to claim 50, said attribute data being the document title, name of publisher, name of the author, day of issue, page number or field.

55. An information access system according to claim 1, the central system being further equipped with search scope storage means for storing the scope of the search, wherein the search means carries out the search within the search scope stored in the search scope storage means.

56. An information access system according to claim 1, said central system being further equipped with search frequency storage means for storing the frequency with which the phonetic signal information relating to the document is searched for by the search means, wherein the search means refers to the search frequency storage means and searches sequentially from the group of items of phonetic signal information relating to documents of a high search frequency.

57. An information access system according to claim 1 wherein the input means is further equipped with keyword output means for outputting from the keywords a prescribed number of characters, starting from the front, output control means for controlling the outputting of the keywords from the keyword output means, and selecting means for selecting the desired items from the keywords outputted from the keyword output means.

* * * * *